(12) United States Patent
Schluessler et al.

(10) Patent No.: US 11,688,366 B2
(45) Date of Patent: *Jun. 27, 2023

(54) LIGHT FIELD DISPLAYS HAVING SYNERGISTIC DATA FORMATTING, RE-PROJECTION, FOVEATION, TILE BINNING AND IMAGE WARPING TECHNOLOGY

(71) Applicant: Intel Corporation, Santa Clara, CA (US)

(72) Inventors: Travis Schluessler, Berthoud, CO (US); Abhishek Venkatesh, Hillsboro, OR (US); John Gierach, Portland, OR (US); Tomer Bar-On, Petah Tikva (IL); Devan Burke, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,228

(22) Filed: Aug. 30, 2021

(65) Prior Publication Data

US 2022/0059054 A1    Feb. 24, 2022

Related U.S. Application Data

(63) Continuation of application No. 16/723,337, filed on Dec. 20, 2019, now Pat. No. 11,107,444, which is a (Continued)

(51) Int. Cl.
*G06T 15/40* (2011.01)
*G09G 5/36* (2006.01)
(Continued)

(52) U.S. Cl.
CPC .............. *G09G 5/363* (2013.01); *G06T 1/20* (2013.01); *G06T 7/70* (2017.01); *G06T 15/005* (2013.01); *G06T 15/20* (2013.01); *G06T 15/405* (2013.01); *G09G 3/003* (2013.01); *G09G 5/001* (2013.01); *G09G 5/391* (2013.01); *G06F 3/1446* (2013.01); *G06T 1/60* (2013.01); *G06T 3/0093* (2013.01); *G06T 2210/08* (2013.01); *G06T 2210/36* (2013.01); *G06T 2210/52* (2013.01);
(Continued)

(58) Field of Classification Search
CPC .. G06T 1/60; G06T 15/005; G06T 15/30–405
See application file for complete search history.

(56) References Cited

U.S. PATENT DOCUMENTS 6,768,493 B1    7/2004  Donovan
9,626,735 B2    4/2017  Koker et al.
(Continued)

OTHER PUBLICATIONS

Huang et al., "The light field stereoscope immersive computer graphics via factored near-eye light field displays with focus cues", Stanford University, Aug. 2015, 12 pages.
(Continued)

*Primary Examiner* — Charles Tseng
(74) *Attorney, Agent, or Firm* — Jordan IP Law, LLC

(57) ABSTRACT

Systems, methods and apparatuses may provide for technology to reduce rendering overhead associated with light field displays. The technology may conduct data formatting, re-projection, foveation, tile binning and/or image warping operations with respect to a plurality of display planes in a light field display.

20 Claims, 54 Drawing Sheets

Related U.S. Application Data continuation of application No. 15/858,486, filed on Dec. 29, 2017, now Pat. No. 10,522,113.

(51) Int. Cl.

| | |
|---|---|
| *G09G 5/391* | (2006.01) |
| *G06T 15/20* | (2011.01) |
| *G06T 7/70* | (2017.01) |
| *G06T 15/00* | (2011.01) |
| *G09G 3/00* | (2006.01) |
| *G06T 1/20* | (2006.01) |
| *G09G 5/00* | (2006.01) |
| *G06T 3/00* | (2006.01) |
| *G09G 5/397* | (2006.01) |
| *G06T 1/60* | (2006.01) |
| *G09G 5/377* | (2006.01) |
| *G06F 3/14* | (2006.01) |

(52) U.S. Cl.
CPC ............ *G09G 5/377* (2013.01); *G09G 5/397* (2013.01); *G09G 2300/026* (2013.01); *G09G 2320/0252* (2013.01); *G09G 2330/023* (2013.01); *G09G 2340/0407* (2013.01); *G09G 2340/0428* (2013.01); *G09G 2352/00* (2013.01); *G09G 2354/00* (2013.01); *G09G 2360/06* (2013.01); *G09G 2360/08* (2013.01); *G09G 2360/121* (2013.01); *G09G 2360/122* (2013.01)

(56) References Cited

U.S. PATENT DOCUMENTS

| | | |
|---|---|---|
| 2001/0028352 A1 | 10/2001 | Naegle et al. |
| 2004/0125103 A1 | 7/2004 | Kaufman et al. |
| 2005/0219253 A1 | 10/2005 | Piazza et al. |
| 2010/0328428 A1 | 12/2010 | Booth et al. |
| 2013/0141442 A1 | 6/2013 | Brothers et al. |
| 2014/0035942 A1 | 2/2014 | Yun et al. |
| 2014/0146201 A1 | 5/2014 | Knight et al. |
| 2014/0320487 A1 | 10/2014 | Akenine-Moller et al. |
| 2015/0379664 A1 | 12/2015 | Bhiravabhatla et al. |
| 2016/0165215 A1 | 6/2016 | Gu et al. |
| 2016/0217760 A1 | 7/2016 | Chu et al. |
| 2016/0343164 A1 | 11/2016 | Urbach et al. |
| 2017/0054987 A1 | 2/2017 | Rangarajan et al. |
| 2018/0114290 A1 | 4/2018 | Paltashev et al. |
| 2018/0196509 A1 | 7/2018 | Trail |
| 2018/0292895 A1 | 10/2018 | Schlussler et al. |
| 2018/0300951 A1 | 10/2018 | Surti et al. |
| 2018/0308266 A1 | 10/2018 | Surti et al. |

OTHER PUBLICATIONS

Levoy et al., "Light field rendering", Stanford University, Jul. 1996, 12 pages.

Peek et al., "Image warping for enhancing consumer applications of head-mounted displays", The University of Auckland, 2014, 9 pages.

Wetzstein "Synthetic light field archive", web.media.mit.edu/~gordonw/SyntheticLightFields/, retrieved on Dec. 6, 2017, 6 pages.

Office Action for U.S. Appl. No. 15/858,486, dated Apr. 8, 2019, 87 pages.

Notice of Allowance for U.S. Appl. No. 15/858,486, dated Aug. 13, 2019, 13 pages.

Lanman et al., "Polarization Fields: Dynamic Light Field Display Using Multi-Layer LCDs," ACM Transactions on Graphics, vol. 30, No. 6, Article 186, Dec. 2011, 10 pages.

Office Action for U.S. Appl. No. 16/723,337, dated Jan. 8, 2021, 26 pages.

Notice of Allowance for U.S. Appl. No. 16/723,337, dated Apr. 30, 2021, 14 pages.

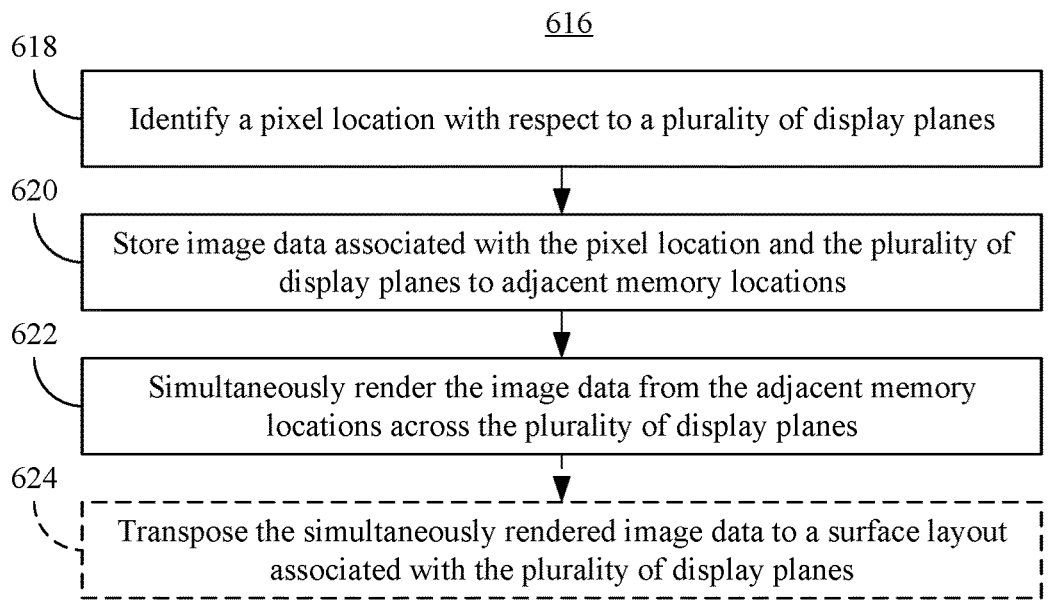
FIG. 6D
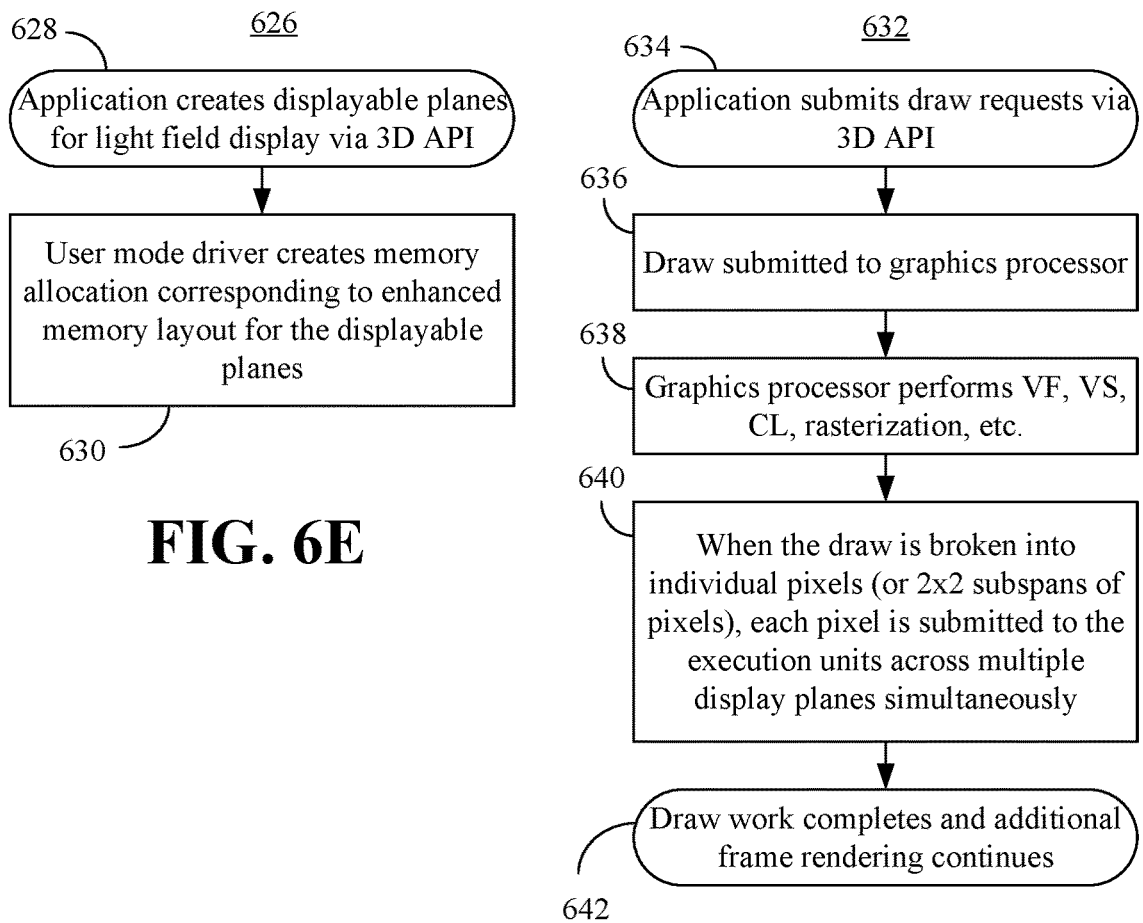
FIG. 6E
FIG. 6F

824

GRAPHICS PROCESSOR COMMAND FORMAT
2400

| CLIENT 2402 | OPCODE 2404 | SUB-OPCODE 2405 | DATA 2406 | COMMAND SIZE 2408 |

LIGHT FIELD DISPLAYS HAVING SYNERGISTIC DATA FORMATTING, RE-PROJECTION, FOVEATION, TILE BINNING AND IMAGE WARPING TECHNOLOGY

CROSS-REFERENCE TO RELATED APPLICATIONS

The present application is a continuation of and claims the benefit of priority to U.S. Non-Provisional patent application Ser. No. 16/723,337 filed on Dec. 20, 2019 which is a continuation of and claims the benefit of priority to U.S. Non-Provisional patent application Ser. No. 15/858,486 filed Dec. 29, 2017.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNICAL FIELD

Embodiments generally relate to graphics systems. More particularly, embodiments relate to light field displays having synergistic data formatting, re-projection, foveation, tile binning and/or image warping technology.

BACKGROUND OF THE DESCRIPTION

Virtual reality (VR) head mounted display (HMD) technology may use a single two-dimensional (2D) display plane to present three-dimensional (3D) scenes to the wearer of the HMD. The wearer may experience, however, visual discomfort when attempting to focus on items at different depths in the 3D scene due to a lack of focus cues in the scene. While light field displays may reduce the visual discomfort by composing the 3D scene as a light field that is rendered to multiple display planes, there remains considerable room for improvement. For example, rendering the scene to multiple display planes may increase latency, reduce performance, increase power consumption and/or reduce battery life.

BRIEF DESCRIPTION OF THE DRAWINGS

The various advantages of the embodiments will become apparent to one skilled in the art by reading the following specification and appended claims, and by referencing the following drawings, in which:

FIG. 6D is a flowchart of an example of a method of managing image data to be rendered across a plurality of display planes according to an embodiment;

FIG. 6E is a flowchart of an example of a method of conducting a memory setup procedure according to an embodiment;

FIG. 6F is a flowchart of an example of a more detailed method of managing image data to be rendered across a plurality of display planes according to an embodiment;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the embodiments.

System Overview

Figure 1:
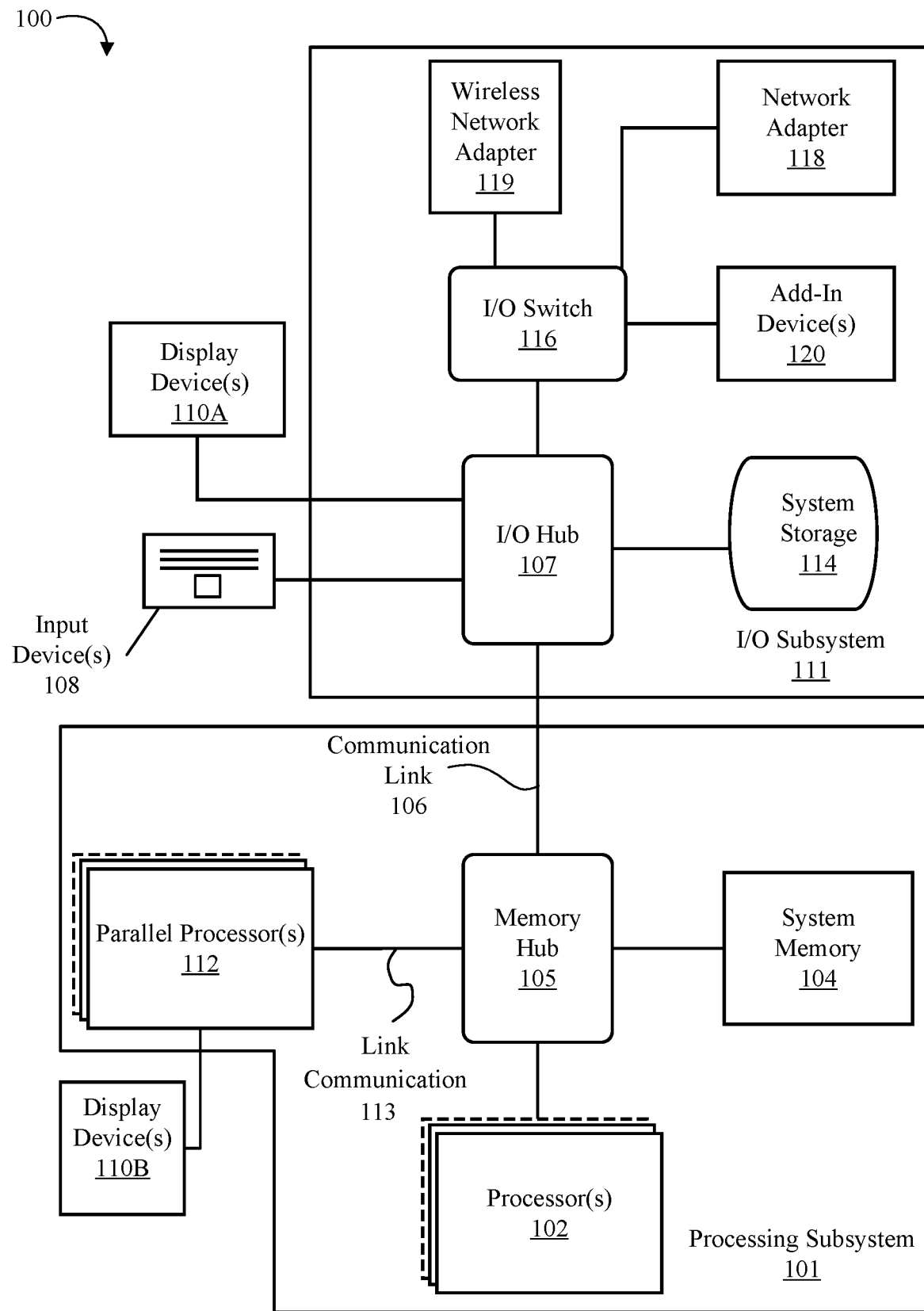
FIG. 1 is a block diagram illustrating a computer system configured to implement one or more aspects of the embodiments described herein.

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards based communication link technologies or protocols, such as, but not limited to PCI Express, or may be a vendor specific communications interface or communications fabric. In one embodiment the one or more parallel processor(s) 112 form a computationally focused parallel or vector processing system that an include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O Hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including Universal Serial Bus (USB) or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general purpose processing, while preserving the underlying computational architecture, described in greater detail herein. In yet another embodiment, components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Some embodiments may include two or more sets of processor(s) 102 attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

Figure 2A:
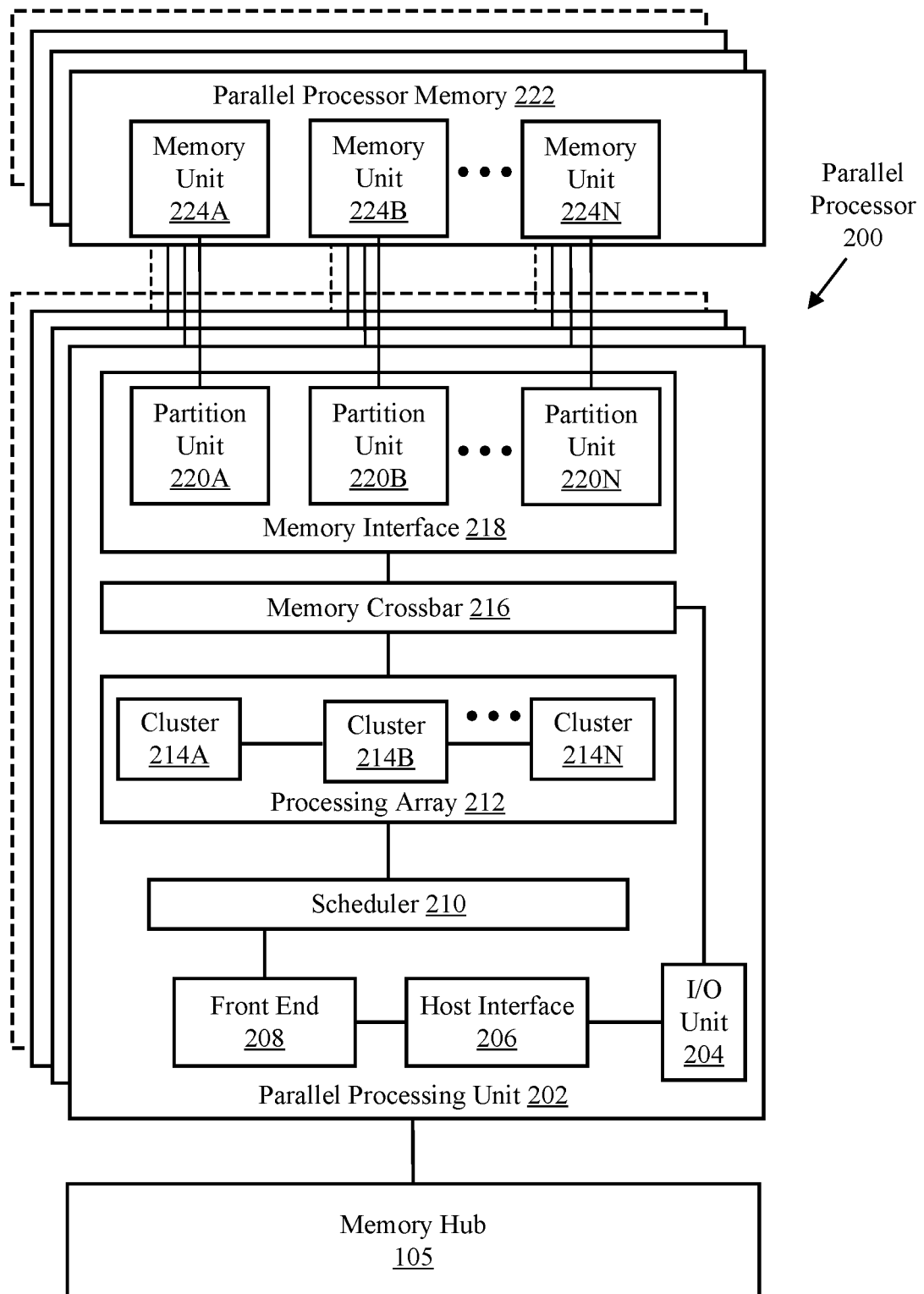
FIG. 2A-2D illustrate parallel processor components, according to an embodiment.

FIG. 2A illustrates a parallel processor 200, according to an embodiment. The various components of the parallel processor 200 may be implemented using one or more integrated circuit devices, such as programmable processors, application specific integrated circuits (ASICs), or field programmable gate arrays (FPGAs). The illustrated parallel processor 200 is a variant of the one or more parallel processor(s) 112 shown in FIG. 1, according to an embodiment.

In one embodiment, the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment, the I/O unit 204 connects with other devices via the use of a hub or switch interface, such as memory hub 105. The connections between the memory hub 105 and the I/O unit 204 form a communication link 113. Within the parallel processing unit 202, the/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment, the front end 208 couples with a scheduler 210, which is configured to distribute commands or other work items to a processing cluster array 212. In one embodiment, the scheduler 210 ensures that the processing cluster array 212 is properly configured and in a valid state before tasks are distributed to the processing clusters of the processing cluster array 212. In one embodiment, the scheduler 210 is implemented via firmware logic executing on a microcontroller. The microcontroller implemented scheduler 210 is configurable to perform complex scheduling and work distribution operations at coarse and fine granularity, enabling rapid preemption and context switching of threads executing on the processing array 212. In one embodiment, the host software can provide workloads for scheduling on the processing array 212 via one of multiple graphics processing doorbells. The workloads can then be automatically distributed across the processing array 212 by the scheduler 210 logic within the scheduler microcontroller.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212. In one embodiment, different clusters 214A-214N of the processing cluster array 212 can be allocated for processing different types of programs or for performing different types of computations.

The processing cluster array 212 can be configured to perform various types of parallel processing operations. In one embodiment, the processing cluster array 212 is configured to perform general-purpose parallel compute operations. For example, the processing cluster array 212 can include logic to execute processing tasks including filtering of video and/or audio data, performing modeling operations, including physics operations, and performing data transformations.

In one embodiment, the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing, the transferred data can be stored to on-chip memory (e.g., parallel processor memory 222), then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. In one implementation, the number of partition units 220A-220N is configured to be equal to the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not be equal to the number of memory devices.

In various embodiments, the memory units 224A-224N can include various types of memory devices, including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one embodiment, the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment, the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example and in one embodiment, some instances of the parallel processing unit 202 can include higher precision floating point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 2B:
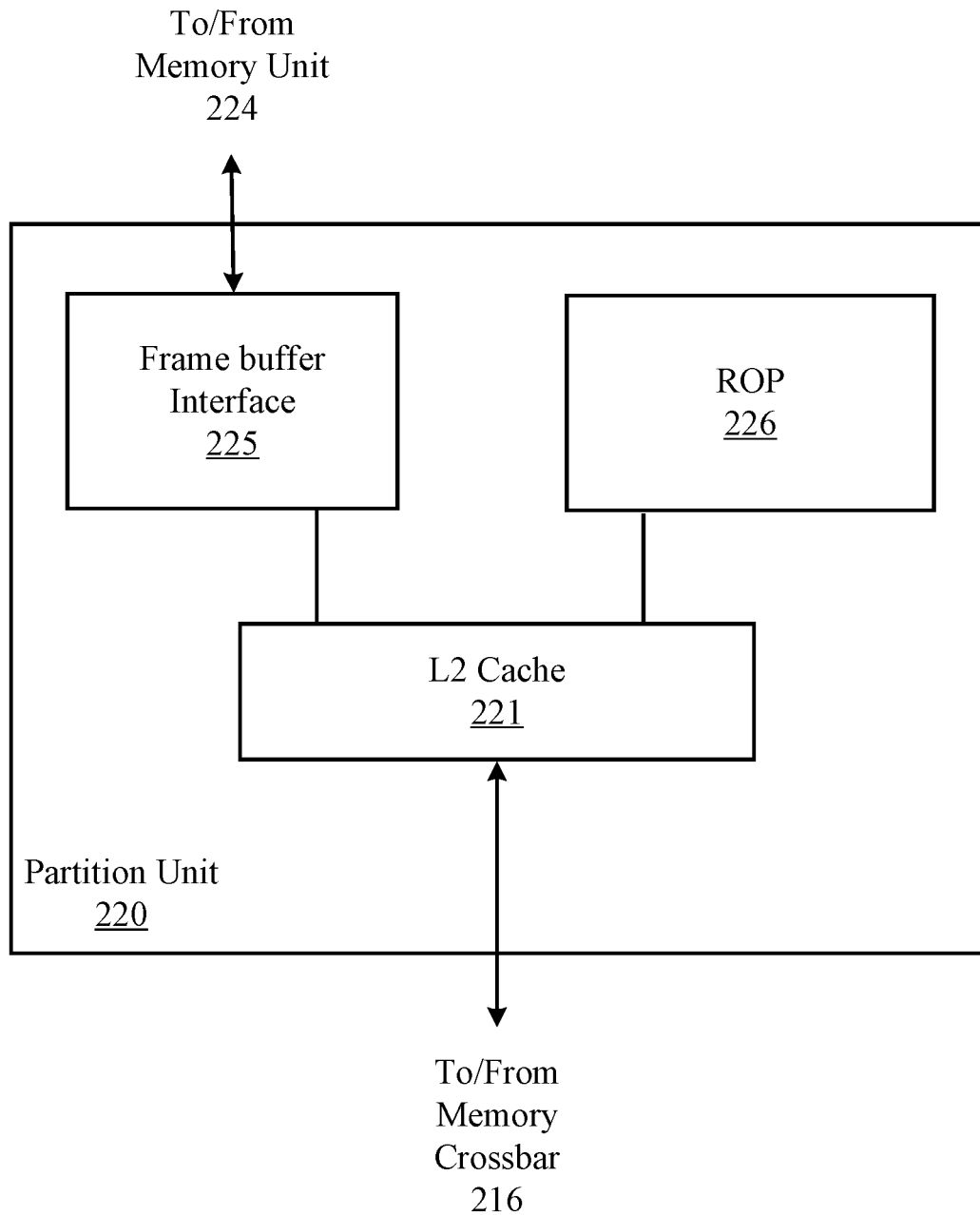

FIG. 2B is a block diagram of a partition unit 220, according to an embodiment. In one embodiment, the partition unit 220 is an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment, the frame buffer interface 225 interfaces with one of the memory units in parallel processor memory, such as the memory units 224A-224N of FIG. 2 (e.g., within parallel processor memory 222).

In graphics applications, the ROP 226 is a processing unit that performs raster operations such as stencil, z test, blending, and the like. The ROP 226 then outputs processed graphics data that is stored in graphics memory. In some embodiments the ROP 226 includes compression logic to compress depth or color data that is written to memory and decompress depth or color data that is read from memory. The compression logic can be lossless compression logic that makes use of one or more of multiple compression algorithms. The type of compression that is performed by the ROP 226 can vary based on the statistical characteristics of the data to be compressed. For example, in one embodiment, delta color compression is performed on depth and color data on a per-tile basis.

In some embodiments, the ROP 226 is included within each processing cluster (e.g., cluster 214A-214N of FIG. 2) instead of within the partition unit 220. In such embodiment, read and write requests for pixel data are transmitted over the memory crossbar 216 instead of pixel fragment data. The processed graphics data may be displayed on a display device, such as one of the one or more display device(s) 110 of FIG. 1, routed for further processing by the processor(s) 102, or routed for further processing by one of the processing entities within the parallel processor 200 of FIG. 2A.

Figure 2C:
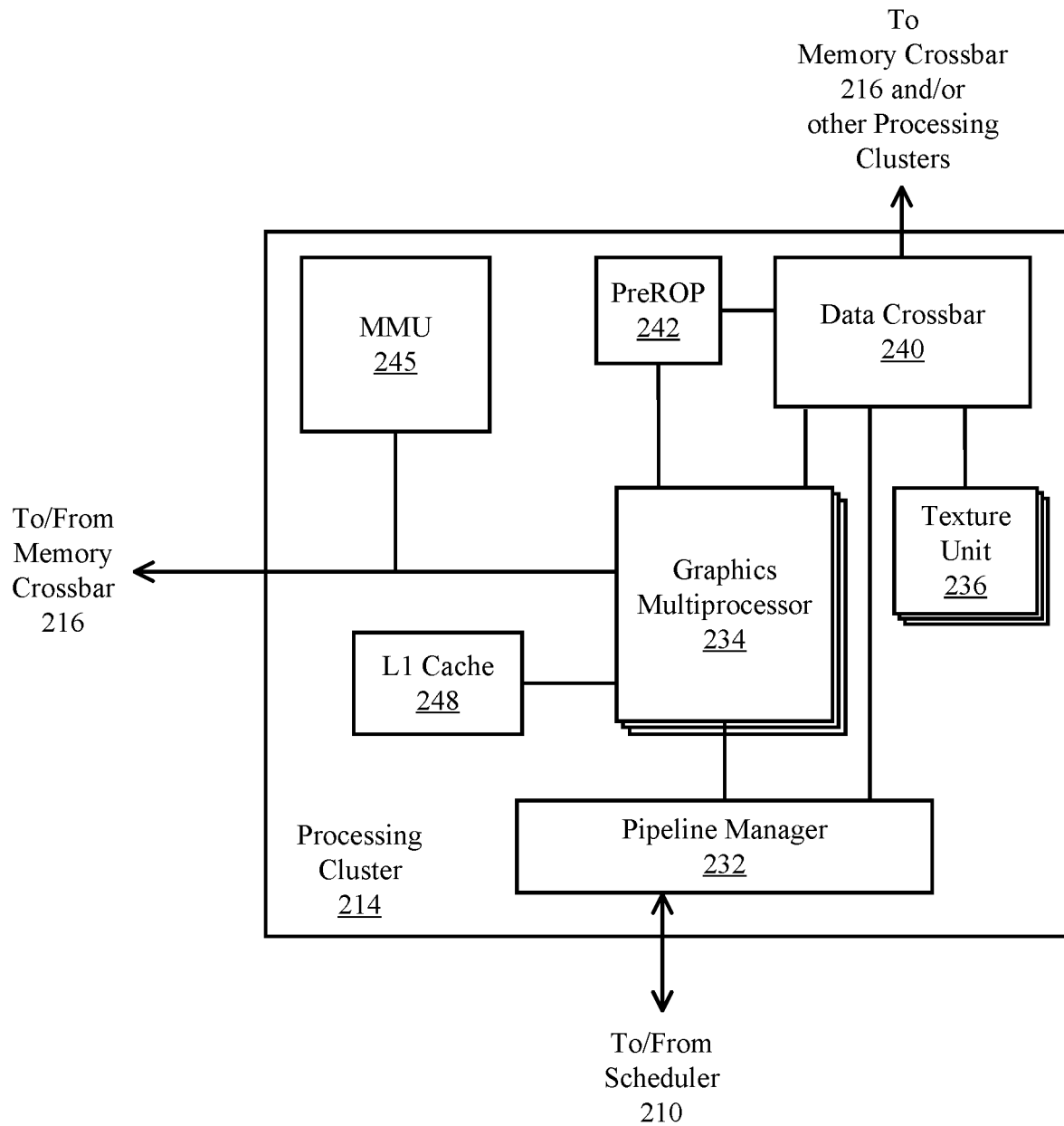

FIG. 2C is a block diagram of a processing cluster 214 within a parallel processing unit, according to an embodiment. In one embodiment, the processing cluster is an instance of one of the processing clusters 214A-214N of FIG. 2. The processing cluster 214 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2A and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed via the data crossbar 240.

Each graphics multiprocessor 234 within the processing cluster 214 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating point arithmetic, comparison operations, Boolean operations, bit-shifting, and computation of various algebraic functions. In one embodiment, the same functional-unit hardware can be leveraged to perform different operations and any combination of functional units may be present.

The instructions transmitted to the processing cluster 214 constitutes a thread. A set of threads executing across the set of parallel processing engines is a thread group. A thread group executes the same program on different input data. Each thread within a thread group can be assigned to a different processing engine within a graphics multiprocessor 234. A thread group may include fewer threads than the number of processing engines within the graphics multiprocessor 234. When a thread group includes fewer threads than the number of processing engines, one or more of the processing engines may be idle during cycles in which that thread group is being processed. A thread group may also include more threads than the number of processing engines within the graphics multiprocessor 234. When the thread group includes more threads than the number of processing engines within the graphics multiprocessor 234, processing can be performed over consecutive clock cycles. In one embodiment, multiple thread groups can be executed concurrently on a graphics multiprocessor 234.

In one embodiment, the graphics multiprocessor 234 includes an internal cache memory to perform load and store operations. In one embodiment, the graphics multiprocessor 234 can forego an internal cache and use a cache memory (e.g., L1 cache 248) within the processing cluster 214. Each graphics multiprocessor 234 also has access to L2 caches within the partition units (e.g., partition units 220A-220N of FIG. 2) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 248.

Each processing cluster 214 may include an MMU 245 (memory management unit) that is configured to map virtual addresses into physical addresses. In other embodiments, one or more instances of the MMU 245 may reside within the memory interface 218 of FIG. 2A. The MMU 245 includes a set of page table entries (PTEs) used to map a virtual address to a physical address of a tile (talk more about tiling) and optionally a cache line index. The MMU 245 may include address translation lookaside buffers (TLB) or caches that may reside within the graphics multiprocessor 234 or the L1 cache 248 or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. In one embodiment, each processing cluster 214 can be configured to operate independently of other processing clusters 214 using separate and distinct processing units, L1 caches, etc.

Figure 2D:
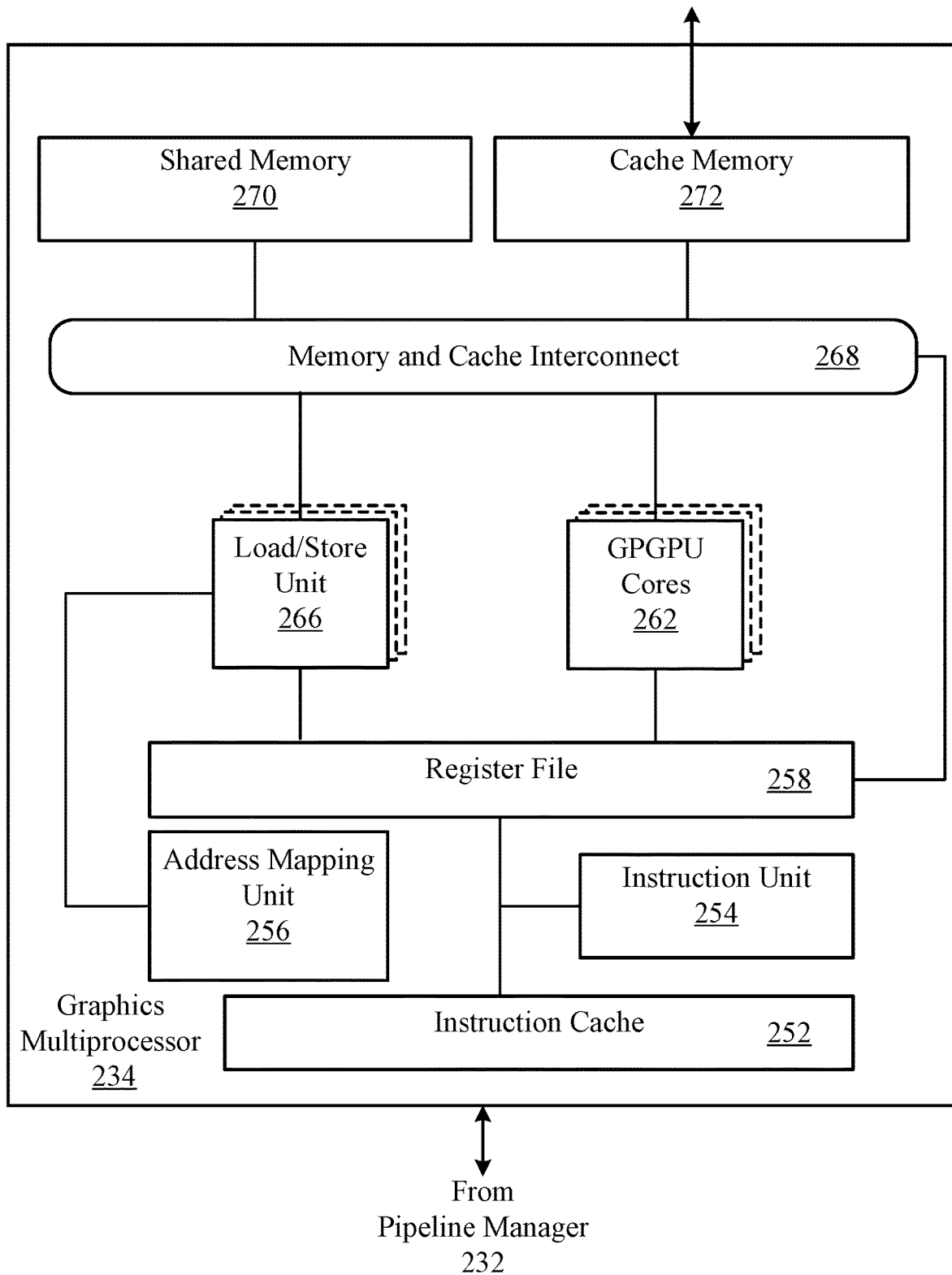

FIG. 2D shows a graphics multiprocessor 234, according to one embodiment. In such embodiment the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general purpose graphics processing unit (GPGPU) cores 262, and one or more load/store units 266. The GPGPU cores 262 and load/store units 266 are coupled with cache memory 272 and shared memory 270 via a memory and cache interconnect 268.

In one embodiment, the instruction cache 252 receives a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 324. The register file 258 provides temporary storage for operands connected to the data paths of the functional units (e.g., GPGPU cores 262, load/store units 266) of the graphics multiprocessor 324. In one embodiment, the register file 258 is divided between each of the functional units such that each functional unit is allocated a dedicated portion of the register file 258. In one embodiment, the register file 258 is divided between the different warps being executed by the graphics multiprocessor 324.

The GPGPU cores 262 can each include floating point units (FPUs) and/or integer arithmetic logic units (ALUs) that are used to execute instructions of the graphics multiprocessor 324. The GPGPU cores 262 can be similar in architecture or can differ in architecture, according to embodiments. For example and in one embodiment, a first portion of the GPGPU cores 262 include a single precision FPU and an integer ALU while a second portion of the GPGPU cores include a double precision FPU. In one embodiment, the FPUs can implement the IEEE 754-2008 standard for floating point arithmetic or enable variable precision floating point arithmetic. The graphics multiprocessor 234 can additionally include one or more fixed function or special function units to perform specific functions such as copy rectangle or pixel blending operations. In one embodiment, one or more of the GPGPU cores can also include fixed or special function logic.

In one embodiment, the GPGPU cores 262 include SIMD logic capable of performing a single instruction on multiple sets of data. In one embodiment, GPGPU cores 262 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can be executed via a single SIMD instruction. For example and in one embodiment, eight SIMT threads that perform the same or similar operations can be executed in parallel via a single SIMD8 logic unit.

The memory and cache interconnect 268 is an interconnect network that connects each of the functional units of the graphics multiprocessor 234 to the register file 258 and to the shared memory 270. In one embodiment, the memory and cache interconnect 268 is a crossbar interconnect that allows the load/store unit 266 to implement load and store operations between the shared memory 270 and the register file 258. The register file 258 can operate at the same frequency as the GPGPU cores 262, thus data transfer between the GPGPU cores 262 and the register file 258 is very low latency. The shared memory 270 can be used to enable communication between threads that execute on the functional units within the graphics multiprocessor 234. The cache memory 272 can be used as a data cache for example, to cache texture data communicated between the functional units and the texture unit 236. The shared memory 270 can also be used as a program managed cache. Threads executing on the GPGPU cores 262 can programmatically store data within the shared memory in addition to the automatically cached data that is stored within the cache memory 272.

Figure 3A:
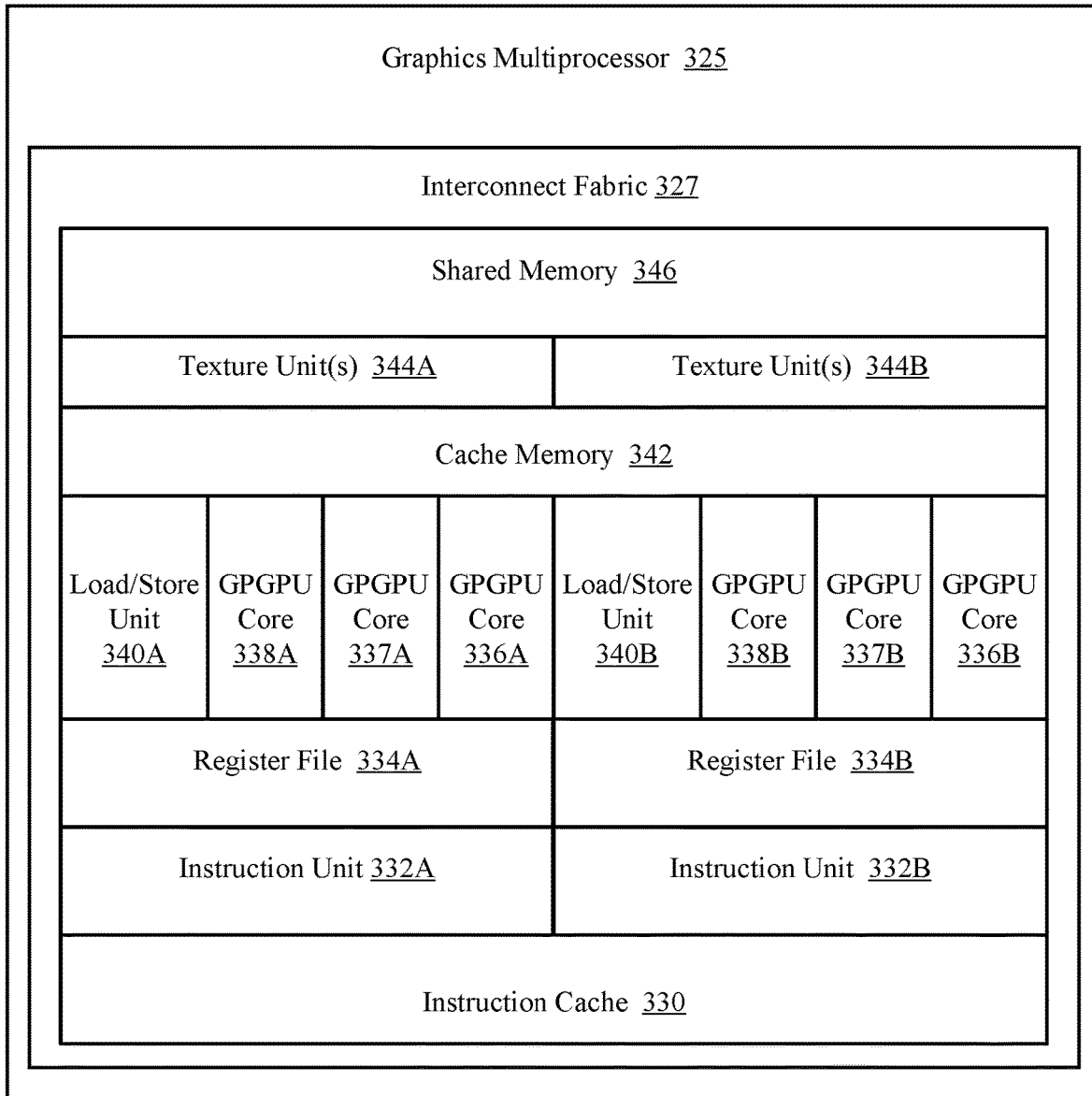
FIGS. 3A-3B are block diagrams of graphics multiprocessors, according to embodiments.
Figure 3B:
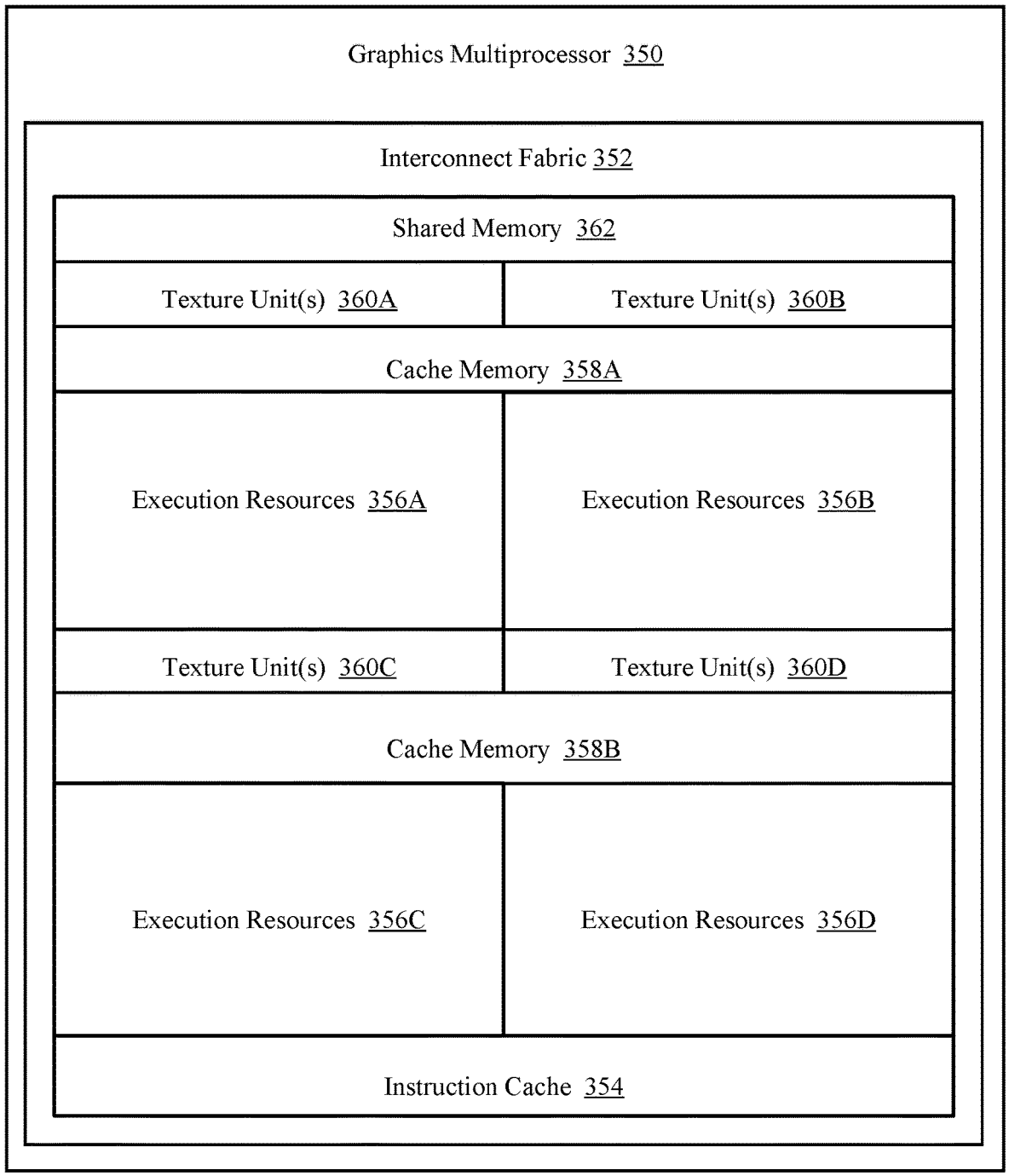

FIGS. 3A-3B illustrate additional graphics multiprocessors, according to embodiments. The illustrated graphics multiprocessors 325, 350 are variants of the graphics multiprocessor 234 of FIG. 2C. The illustrated graphics multiprocessors 325, 350 can be configured as a streaming multiprocessor (SM) capable of simultaneous execution of a large number of execution threads.

FIG. 3A shows a graphics multiprocessor 325 according to an additional embodiment. The graphics multiprocessor 325 includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, GPGPU core 337A-337B, GPGPU core 338A-338B) and multiple sets of load/store units 340A-340B. In one embodiment, the execution resource units have a common instruction cache 330, texture and/or data cache memory 342, and shared memory 346.

The various components can communicate via an interconnect fabric 327. In one embodiment, the interconnect fabric 327 includes one or more crossbar switches to enable communication between the various components of the graphics multiprocessor 325. In one embodiment, the interconnect fabric 327 is a separate, high-speed network fabric layer upon which each component of the graphics multiprocessor 325 is stacked. The components of the graphics multiprocessor 325 communicate with remote components via the interconnect fabric 327. For example, the GPGPU cores 336A-336B, 337A-337B, and 3378A-338B can each communicate with shared memory 346 via the interconnect fabric 327. The interconnect fabric 327 can arbitrate communication within the graphics multiprocessor 325 to ensure a fair bandwidth allocation between components.

FIG. 3B shows a graphics multiprocessor 350 according to an additional embodiment. The graphics processor includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 362. In one embodiment, the execution resources 356A-356D can share an instruction cache 354 and shared memory 362, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2A, as well as one or more graphics processors or special purpose processing units, without departure from the scope of the embodiments described herein.

In some embodiments, a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 4A:
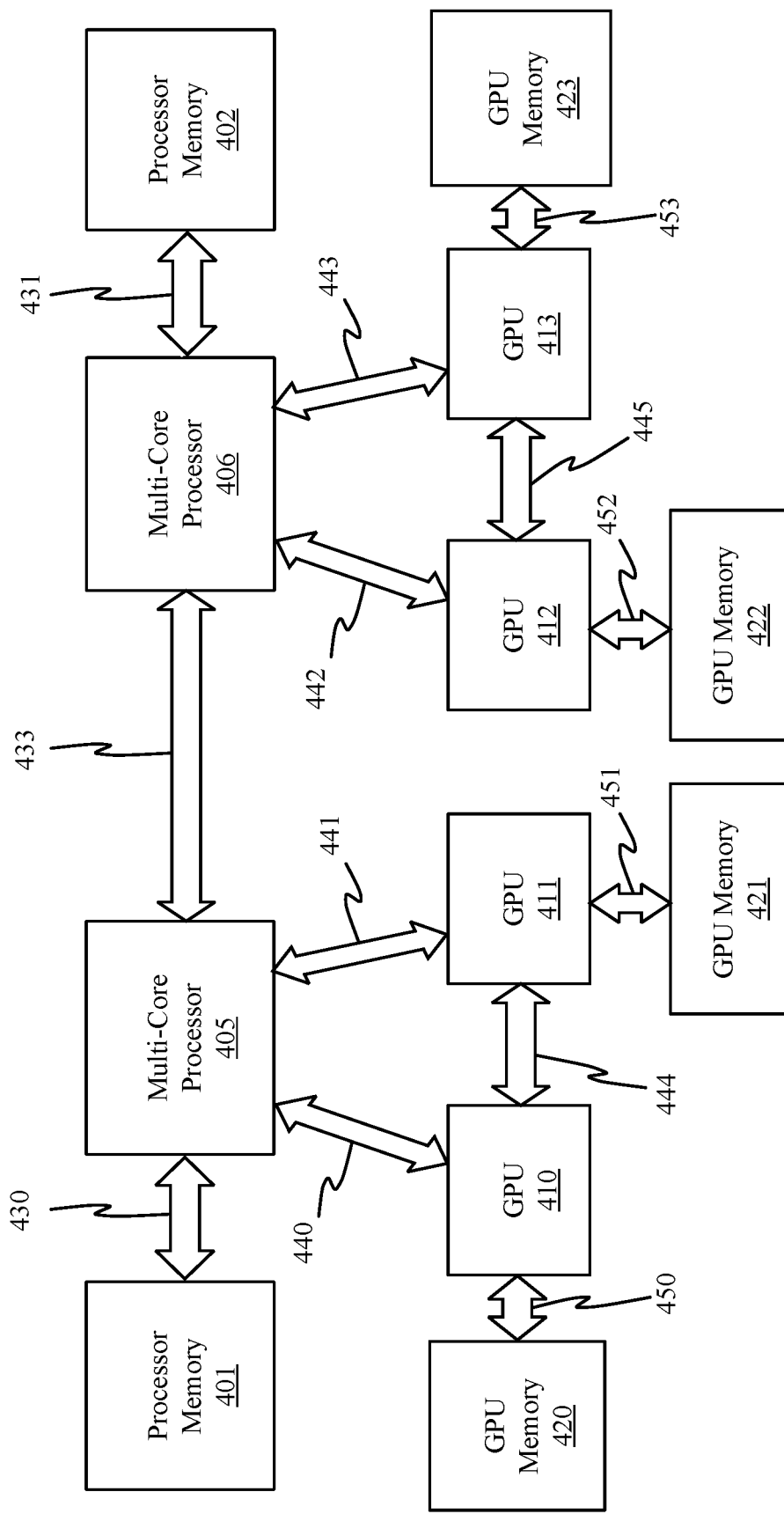
FIG. 4A-4F illustrate an exemplary architecture in which a plurality of GPUs are communicatively coupled to a plurality of multi-core processors.

FIG. 4A illustrates an exemplary architecture in which a plurality of GPUs 410-413 are communicatively coupled to a plurality of multi-core processors 405-406 over high-speed links 440-443 (e.g., buses, point-to-point interconnects, etc.). In one embodiment, the high-speed links 440-443 support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 410-413 are interconnected over high-speed links 444-445, which may be implemented using the same or different protocols/links than those used for high-speed links 440-443. Similarly, two or more of the multi-core processors 405-406 may be connected over high speed link 433 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles of the invention are not limited to any particular type of interconnect technology.

In one embodiment, each multi-core processor 405-406 is communicatively coupled to a processor memory 401-402, via memory interconnects 430-431, respectively, and each GPU 410-413 is communicatively coupled to GPU memory 420-423 over GPU memory interconnects 450-453, respectively. The memory interconnects 430-431 and 450-453 may utilize the same or different memory access technologies. By way of example, and not limitation, the processor memories 401-402 and GPU memories 420-423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
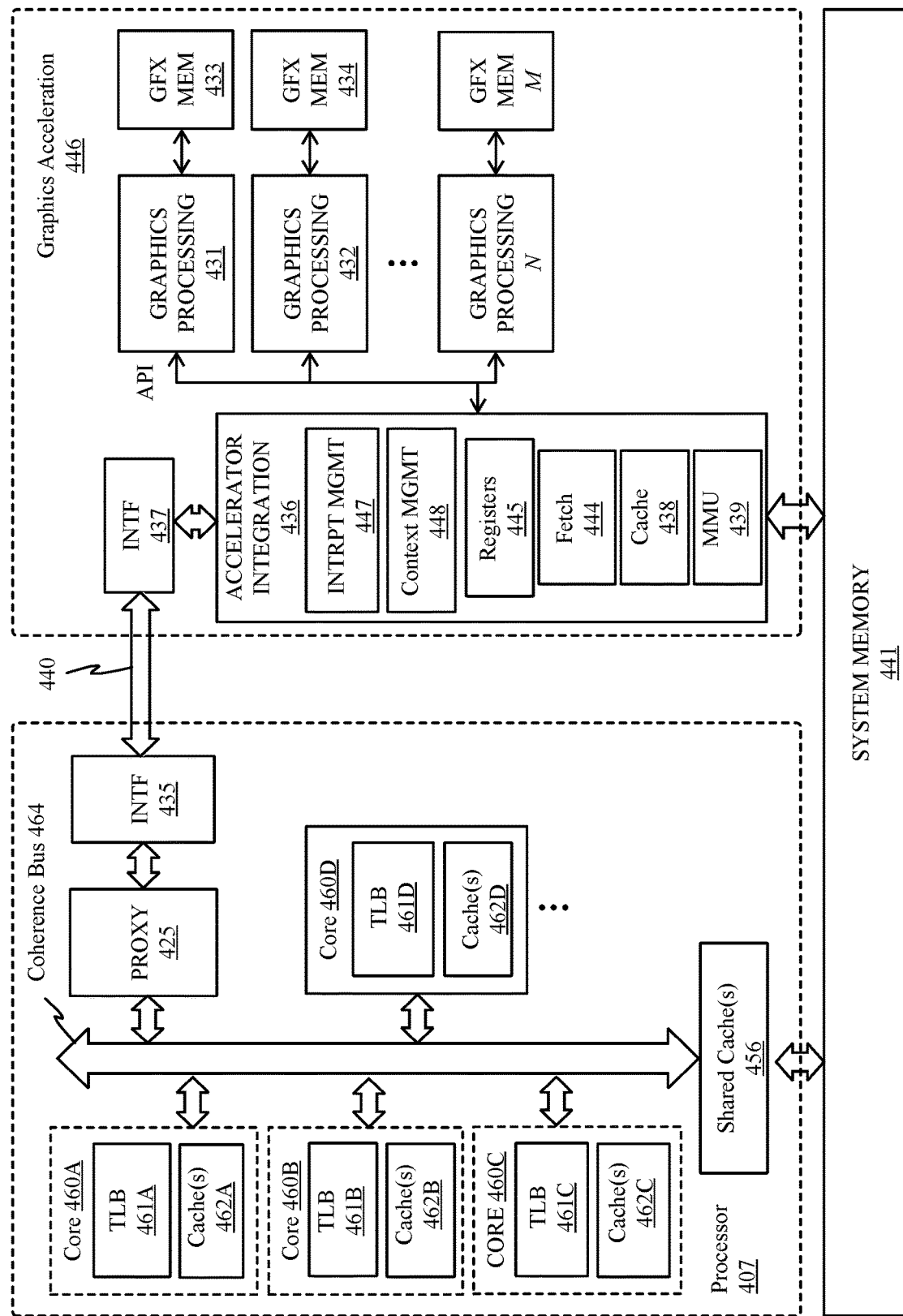

FIG. 4B illustrates additional details for an interconnection between a multi-core processor 407 and a graphics acceleration module 446 in accordance with one embodiment. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the invention (e.g., instruction fetch units, branch prediction units, decoders, execution units, reorder buffers, etc.). The caches 462A-462D may comprise level 1 (L1) and level 2 (L2) caches. In addition, one or more shared caches 456 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402.

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles of the invention.

In one embodiment, a proxy circuit 425 communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the link 440.

In one implementation, an accelerator integration circuit 436 provides cache management, memory access, context management, and interrupt management services on behalf of a plurality of graphics processing engines 431, 432N, of the graphics acceleration module 446. The graphics processing engines 431, 432N, may each comprise a separate graphics processing unit (GPU). Alternatively, the graphics processing engines 431,432N, may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432N, or the graphics processing engines 431-432N, may be individual GPUs integrated on a common package, line card, or chip.

In one embodiment, the accelerator integration circuit 436 includes a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one implementation, a cache 438 stores commands and data for efficient access by the graphics processing engines 431-432N. In one embodiment, the data stored in cache 438 and graphics memories 433-434N, is kept coherent with the core caches 462A-462D, 456 and system memory 411. As mentioned, this may be accomplished via proxy circuit 425, which takes part in the cache coherency mechanism on behalf of cache 438 and memories 433-434N, (e.g., sending updates to the cache 438 related to modifications/accesses of cache lines on processor caches 462A-462D, 456 and receiving updates from the cache 438).

A set of registers 445 store context data for threads executed by the graphics processing engines 431-432N, and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. In one embodiment, an interrupt management circuit 447 receives and processes interrupts received from system devices.

In one implementation, virtual/effective addresses from a graphics processing engine 431 are translated to real/physical addresses in system memory 411 by the MMU 439. One embodiment of the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. In one embodiment, a virtualized graphics execution environment is presented in which the resources of the graphics processing engines 431-432N, are shared with multiple applications or virtual machines (VMs). The resources may be subdivided into "slices", which are allocated to different VMs and/or applications based on the processing requirements and priorities associated with the VMs and/or applications.

Thus, the accelerator integration circuit acts as a bridge to the system for the graphics acceleration module 446 and provides address translation and system memory cache services. In addition, the accelerator integration circuit 436 may provide virtualization facilities for the host processor to manage virtualization of the graphics processing engines, interrupts, and memory management.

Because hardware resources of the graphics processing engines 431-432N, are mapped explicitly to the real address space seen by the host processor 407, any host processor can address these resources directly using an effective address value. One function of the accelerator integration circuit 436, in one embodiment, is the physical separation of the graphics processing engines 431-432N, so that they appear to the system as independent units.

As mentioned, in the illustrated embodiment, one or more graphics memories 433-434M, are coupled to each of the graphics processing engines 431-432N, respectively. The graphics memories 433-434M, store instructions and data being processed by each of the graphics processing engines 431-432N. The graphics memories 433-434M, may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 440, biasing techniques are used to ensure that the data stored in graphics memories 433-434M, is data which will be used most frequently by the graphics processing engines 431-432N, and preferably not used by the cores 460A-460D (at least not frequently). Similarly, the biasing mechanism attempts to keep data needed by the cores (and preferably not the graphics processing engines 431-432N) within the caches 462A-462D, 456 of the cores and system memory 411.

Figure 4C:
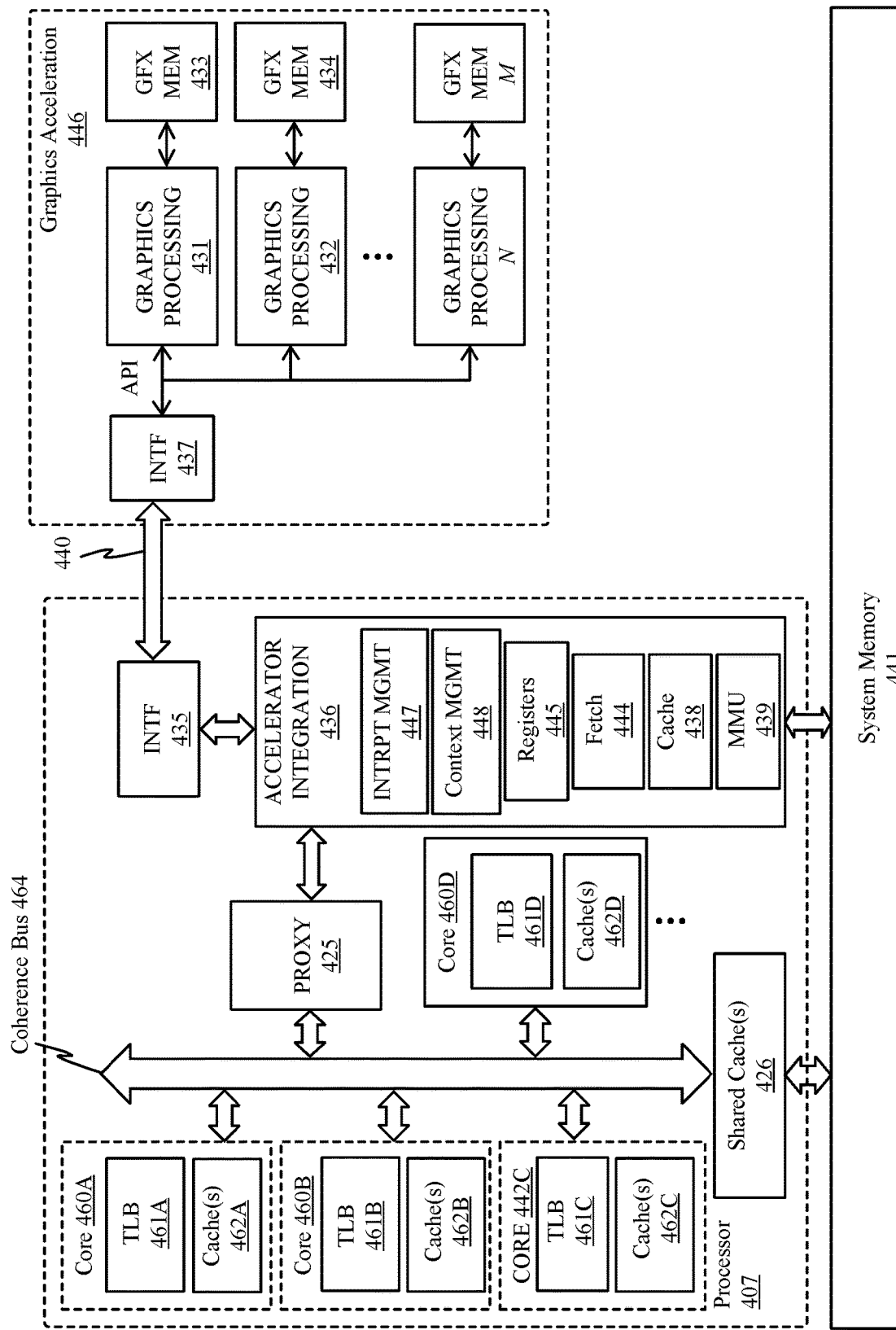

FIG. 4C illustrates another embodiment in which the accelerator integration circuit 436 is integrated within the processor 407. In this embodiment, the graphics processing engines 431-432N, communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherency bus 462 and caches 462A-462D, 426.

One embodiment supports different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In one embodiment of the dedicated process model, graphics processing engines 431-432N, are dedicated to a single application or process under a single operating system. The single application can funnel other application requests to the graphics engines 431-432N, providing virtualization within a virtual machine (VM)/partition.

In the dedicated-process programming models, the graphics processing engines 431-432N, may be shared by multiple VM/application partitions. The shared models require a system hypervisor to virtualize the graphics processing engines 431-432N, to allow access by each operating system. For single-partition systems without a hypervisor, the graphics processing engines 431-432N, are owned by the operating system. In both cases, the operating system can virtualize the graphics processing engines 431-432N, to provide access to each process or application.

For the shared programming model, the graphics acceleration module 446 or an individual graphics processing engine 431-432N, selects a process element using a process handle. In one embodiment, process elements are stored in system memory and are addressable using the effective address to real address translation techniques described herein. The process handle may be an implementation-specific value provided to the host process when registering its context with the graphics processing engine 431-432N, (that is, calling system software to add the process element to the process element linked list). The lower 16-bits of the process handle may be the offset of the process element within the process element linked list.

Figure 4D:
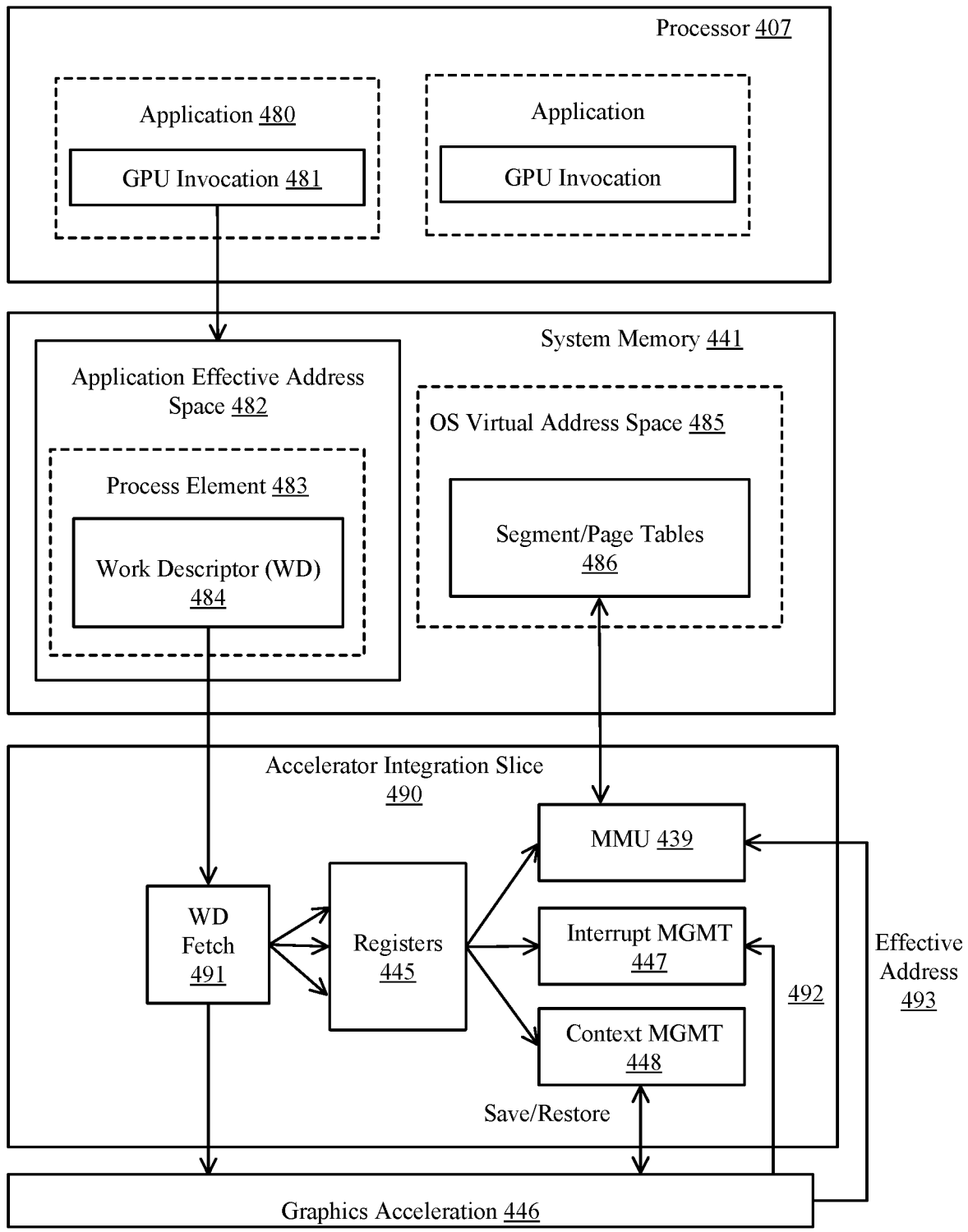

FIG. 4D illustrates an exemplary accelerator integration slice 490. As used herein, a "slice" comprises a specified portion of the processing resources of the accelerator integration circuit 436. Application effective address space 482 within system memory 411 stores process elements 483. In one embodiment, the process elements 483 are stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432N, can be shared by all or a subset of the processes in the system. Embodiments of the invention include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484, which includes an indication of the work to be done by one of the graphics processing engines of the graphics acceleration module 446. Data from the WD 484 may be stored in registers 445 and used by the MMU 439, interrupt management circuit 447 and/or context management circuit 448 as illustrated. For example, one embodiment of the MMU 439 includes segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432N, is translated to a real address by the MMU 439.

In one embodiment, the same set of registers 445 are duplicated for each graphics processing engine 431-432N, and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 2.

TABLE 2

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 484 is specific to a particular graphics acceleration module 446 and/or graphics processing engine 431-432N. It contains all the information a graphics processing engine 431-432N, requires to do its work or it can be a pointer to a memory location where the application has set up a command queue of work to be completed.

Figure 4E:
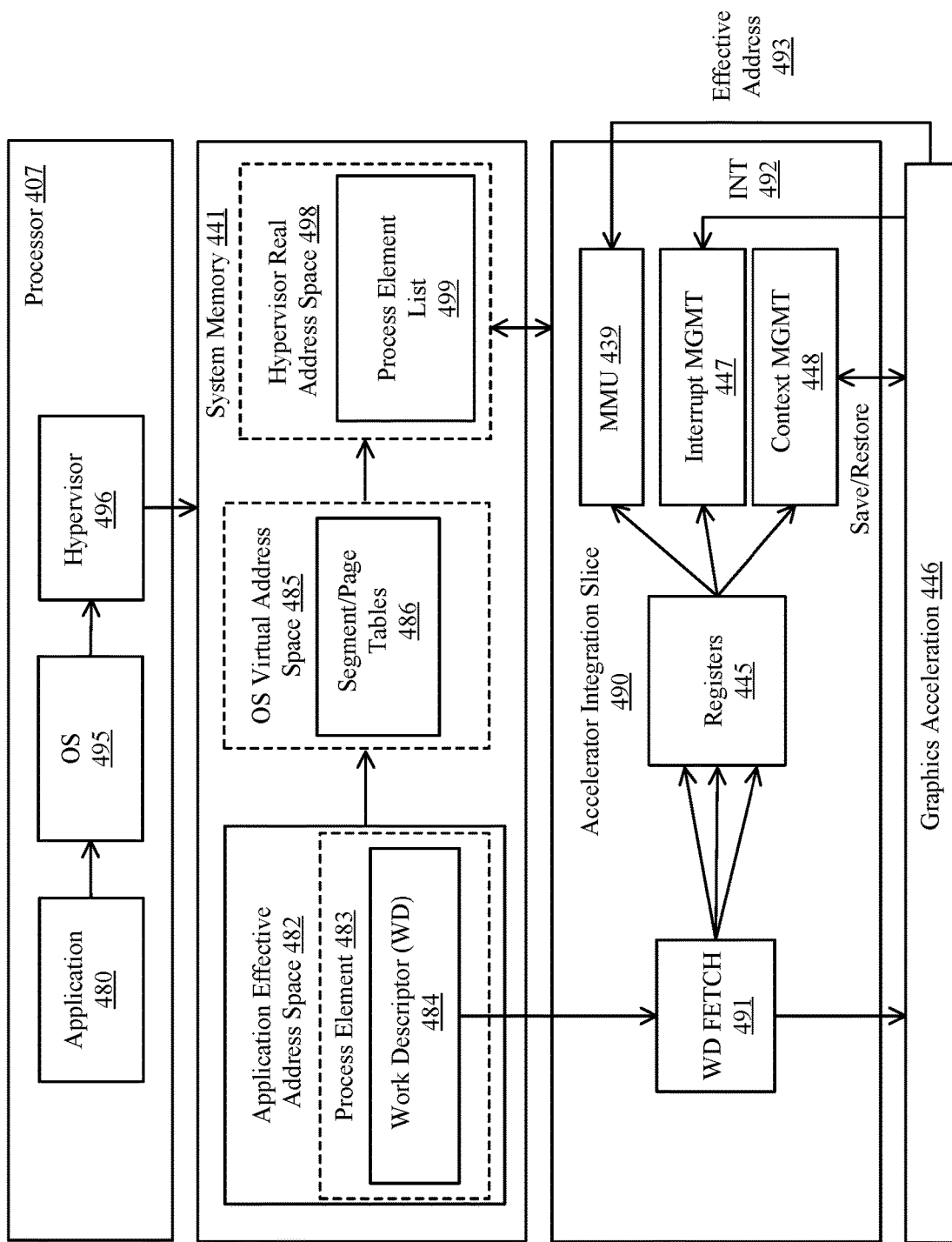

FIG. 4E illustrates additional details for one embodiment of a shared model. This embodiment includes a hypervisor real address space 498 in which a process element list 499 is stored. The hypervisor real address space 498 is accessible via a hypervisor 496, which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

In one embodiment, for the shared model, the application 480 is required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. In one embodiment, the CSRP is one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

1  A work descriptor (WD)
2  An Authority Mask Register (AMR) value (potentially masked).
3  An effective address (EA) Context Save/Restore Area Pointer (CSRP)
4  A process ID (PID) and optional thread ID (TID)
5  A virtual address (VA) accelerator utilization record pointer (AURP)
6  The virtual address of the storage segment table pointer (SSTP)
7  A logical interrupt service number (LISN)

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

1  A work descriptor (WD)
2  An Authority Mask Register (AMR) value (potentially masked).

TABLE 4-continued

Process Element Information

3  An effective address (EA) Context Save/Restore Area Pointer (CSRP)
4  A process ID (PID) and optional thread ID (TID)
5  A virtual address (VA) accelerator utilization record pointer (AURP)
6  The virtual address of the storage segment table pointer (SSTP)
7  A logical interrupt service number (LISN)
8  Interrupt vector table, derived from the hypervisor call parameters.
9  A state register (SR) value
10 A logical partition ID (LPID)
11 A real address (RA) hypervisor accelerator utilization record pointer
12 The Storage Descriptor Register (SDR)

In one embodiment, the hypervisor initializes a plurality of accelerator integration slice 490 registers 445.

Figure 4F:
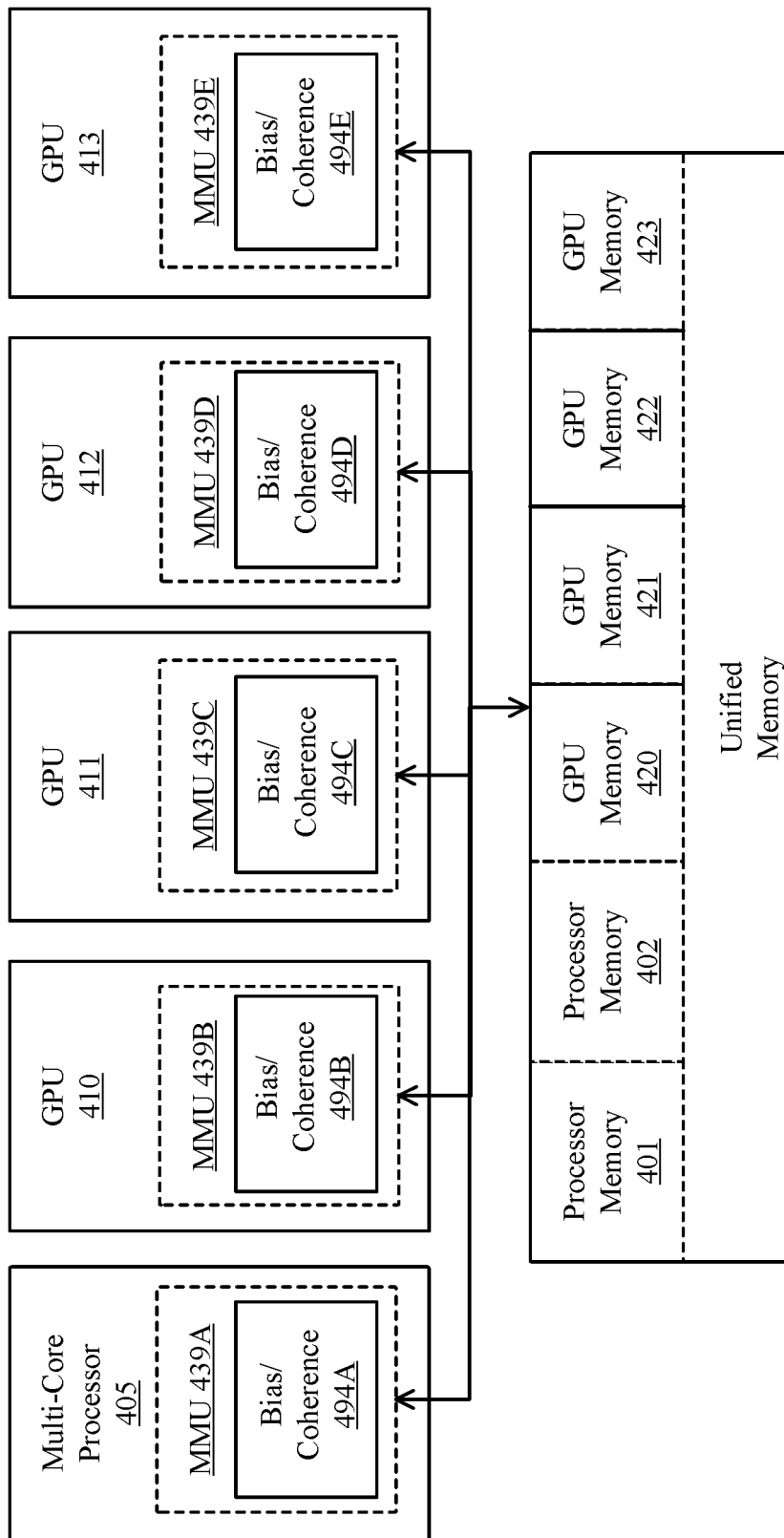

As illustrated in FIG. 4F, one embodiment of the invention employs a unified memory addressable via a common virtual memory address space used to access the physical processor memories 401-402 and GPU memories 420-423. In this implementation, operations executed on the GPUs 410-413 utilize the same virtual/effective memory address space to access the processors memories 401-402 and vice versa, thereby simplifying programmability. In one embodiment, a first portion of the virtual/effective address space is allocated to the processor memory 401, a second portion to the second processor memory 402, a third portion to the GPU memory 420, and so on. The entire virtual/effective memory space (sometimes referred to as the effective address space) is thereby distributed across each of the processor memories 401-402 and GPU memories 420-423, allowing any processor or GPU to access any physical memory with a virtual address mapped to that memory.

In one embodiment, bias/coherence management circuitry 494A-494E within one or more of the MMUs 439A-439E ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

One embodiment allows GPU-attached memory 420-423 to be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

In one implementation, the selection between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). In one embodiment, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g., OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

In one embodiment, cache coherency is maintained by temporarily rendering GPU-biased pages uncacheable by the host processor 405. To access these pages, the processor 405 may request access from the GPU 410 which may or may not grant access right away, depending on the implementation. Thus, to reduce communication between the processor 405 and GPU 410 it is beneficial to ensure that GPU-biased pages are those which are required by the GPU but not the host processor 405 and vice versa.

Graphics Processing Pipeline

Figure 5:
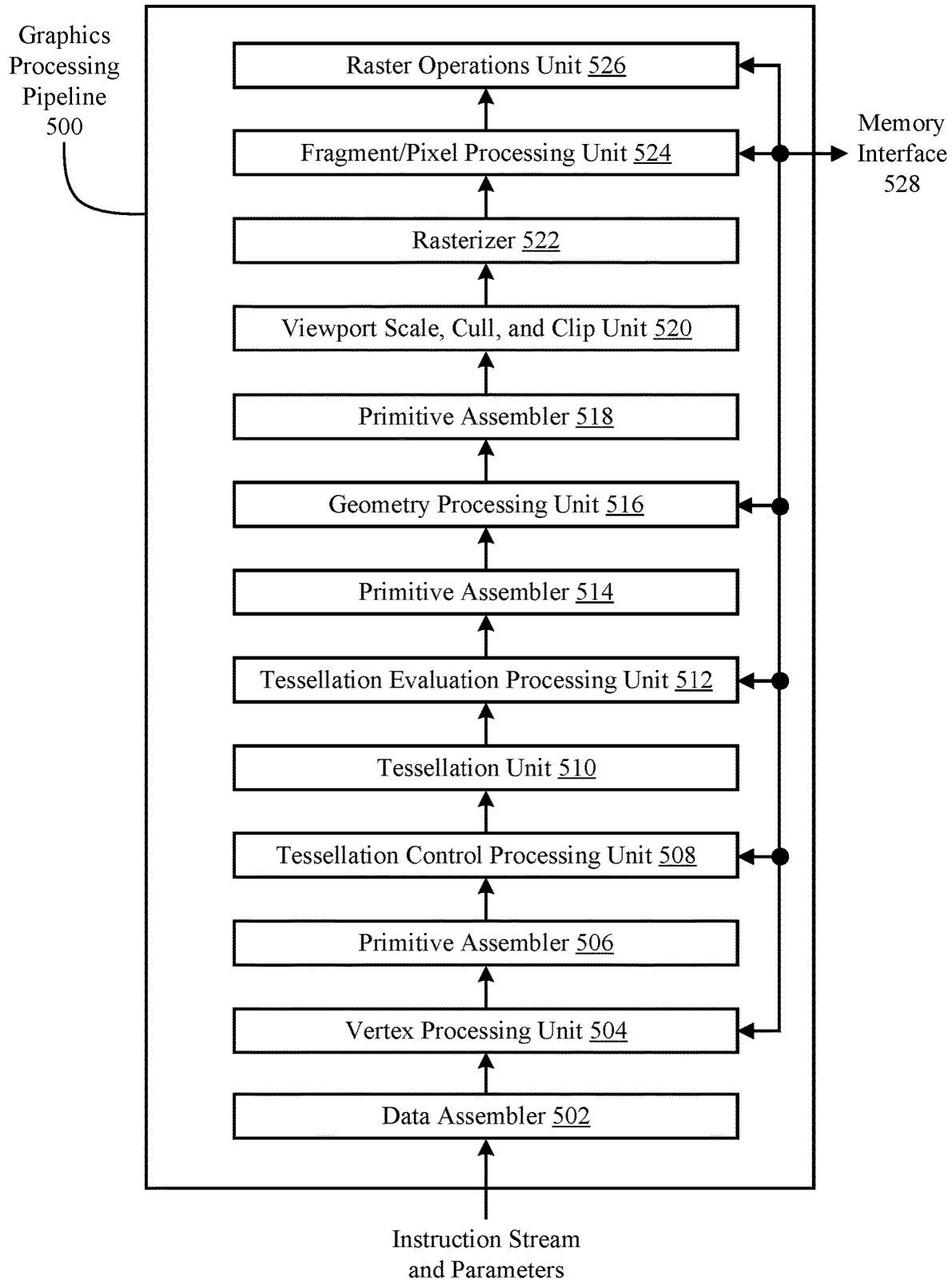
FIG. 5 illustrates a graphics processing pipeline, according to an embodiment.

FIG. 5 illustrates a graphics processing pipeline 500, according to an embodiment. In one embodiment, a graphics processor can implement the illustrated graphics processing pipeline 500. The graphics processor can be included within the parallel processing subsystems as described herein, such as the parallel processor 200 of FIG. 2A, which, in one embodiment, is a variant of the parallel processor(s) 112 of FIG. 1. The various parallel processing systems can implement the graphics processing pipeline 500 via one or more instances of the parallel processing unit (e.g., parallel processing unit 202 of FIG. 2A) as described herein. For example, a shader unit (e.g., graphics multiprocessor 325 of FIG. 3A) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 2A) and a corresponding partition unit (e.g., partition unit 220A-220N of FIG. 2A). The graphics processing pipeline 500 may also be implemented using dedicated processing units for one or more functions. In one embodiment, one or more portions of the graphics processing pipeline 500 can be performed by parallel processing logic within a general purpose processor (e.g., CPU). In one embodiment, one or more portions of the graphics processing pipeline 500 can access on-chip memory (e.g., parallel processor memory 222 as in FIG. 2A) via a memory interface 528, which may be an instance of the memory interface 218 of FIG. 2A.

In one embodiment, the data assembler 502 is a processing unit that collects vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 504. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. In one embodiment, the geometry processing unit 516 is programmed to subdivide the graphics primitives into one or more new graphics primitives and calculate parameters used to rasterize the new graphics primitives.

In some embodiments the geometry processing unit 516 can add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z test, blending, and the like, and outputs pixel data as processed graphics data to be stored in graphics memory (e.g., parallel processor memory 222 as in FIG. 2, and/or system memory 104 as in FIG. 1, to be displayed on the one or more display device(s) 110 or for further processing by one of the one or more processor(s) 102 or parallel processor(s) 112. In some embodiments the raster operations unit 526 is configured to compress z or color data that is written to memory and decompress z or color data that is read from memory.

Light Field Displays

Figure 6A:
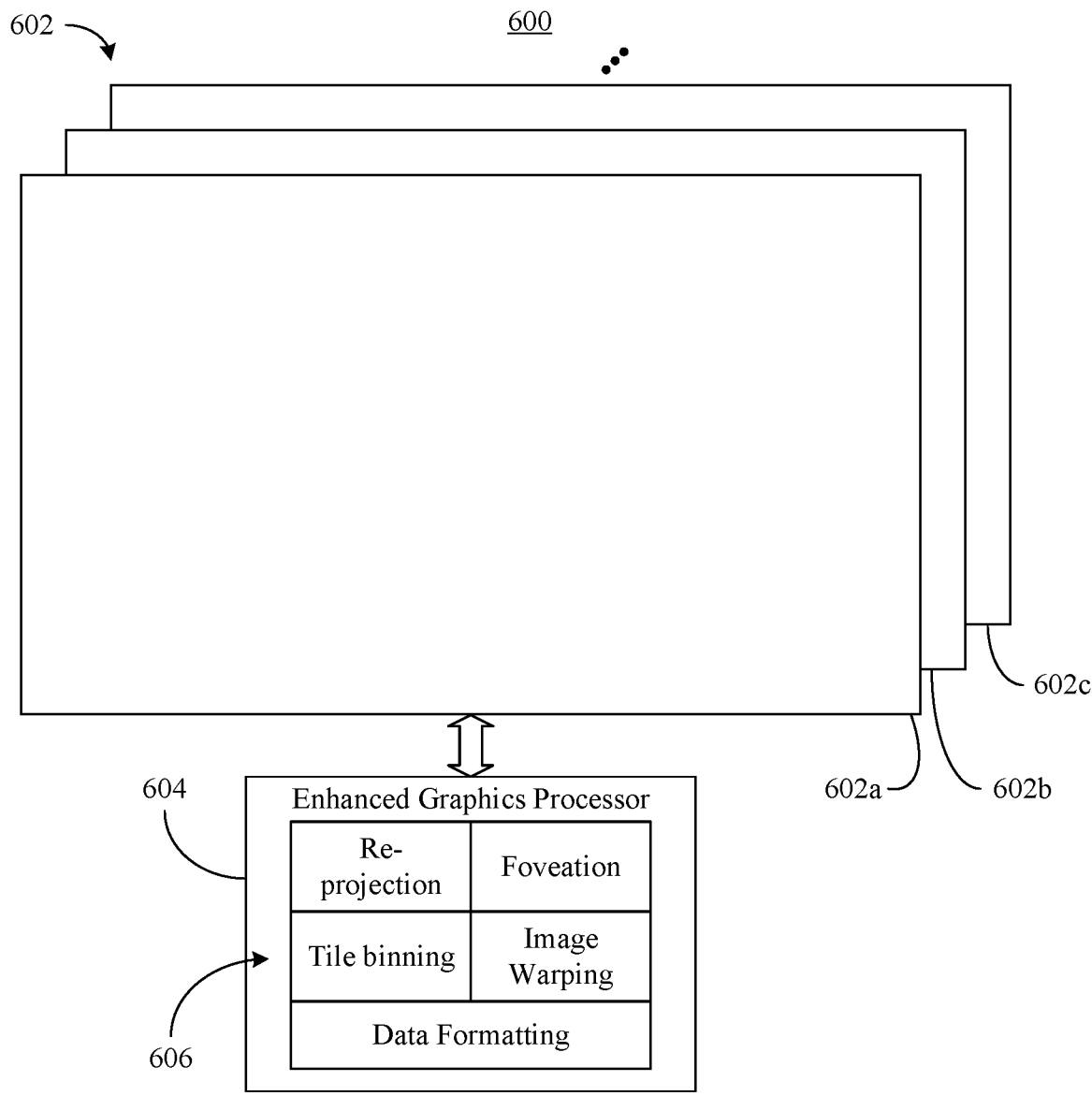
FIG. 6A is an illustration of an example of a light field display system according to an embodiment.

Turning now to FIG. 6A, a light field display system 600 is shown in which a plurality of display planes 602 (602a-602c) are arranged in a stacked configuration. Each display plane 602 may correspond to, for example, a liquid crystal display (LCD) panel in a stacked arrangement of LCD panels. The light field display system 600 may be incorporated into a near-eye device such as, for example, a head mounted display (HMD) device (not shown) that presents three-dimensional (3D) virtual reality (VR) and/or augmented reality (AR) content to a wearer (e.g., user) of the HMD device. The 3D content may be simulated (e.g., resulting from execution of a multi-player game application), cinematic (e.g., resulting from a video/image capture), or any combination thereof. An enhanced graphics processor 604 (e.g., graphics processing unit/GPU) may compose the 3D content as a light field that, when rendered to the display planes 602, provides focus cues that reduce visual discomfort to the wearer. More particularly, the display planes 602 may modulate a uniform backlight in a multiplicative fashion so that, when observed through lenses, the display planes 602 provide focus cues in addition to binocular disparity.

The illustrated graphics processor 604 includes logic 606 (e.g., logic instructions, configurable logic, fixed-functionality hardware logic, etc., or any combination thereof) to perform re-projection, foveation, tile binning, image warping and more efficient data formatting. As will be discussed in greater detail, the graphics processor 604 may be considered to be enhanced to the extent that operation of the logic 604 reduces latency, improves performance, reduces power consumption and/or extends battery life.

Figure 6B:
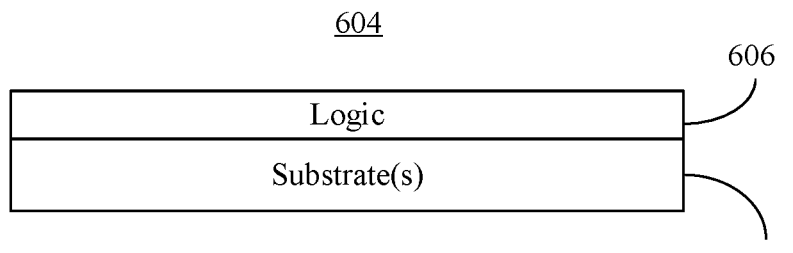
FIG. 6B is an illustration of an example of a semiconductor package apparatus according to an embodiment.

FIG. 6B demonstrates that the enhanced graphics processor 604 may be a semiconductor package apparatus that includes one or more substrates 608 (e.g., silicon, sapphire, gallium arsenide) coupled to the logic 606 (e.g., transistor array and other integrated circuit/IC components). As already noted, the logic 606 may be implemented at least partly in configurable logic or fixed-functionality logic hardware.

Data Formatting

Figure 6C:
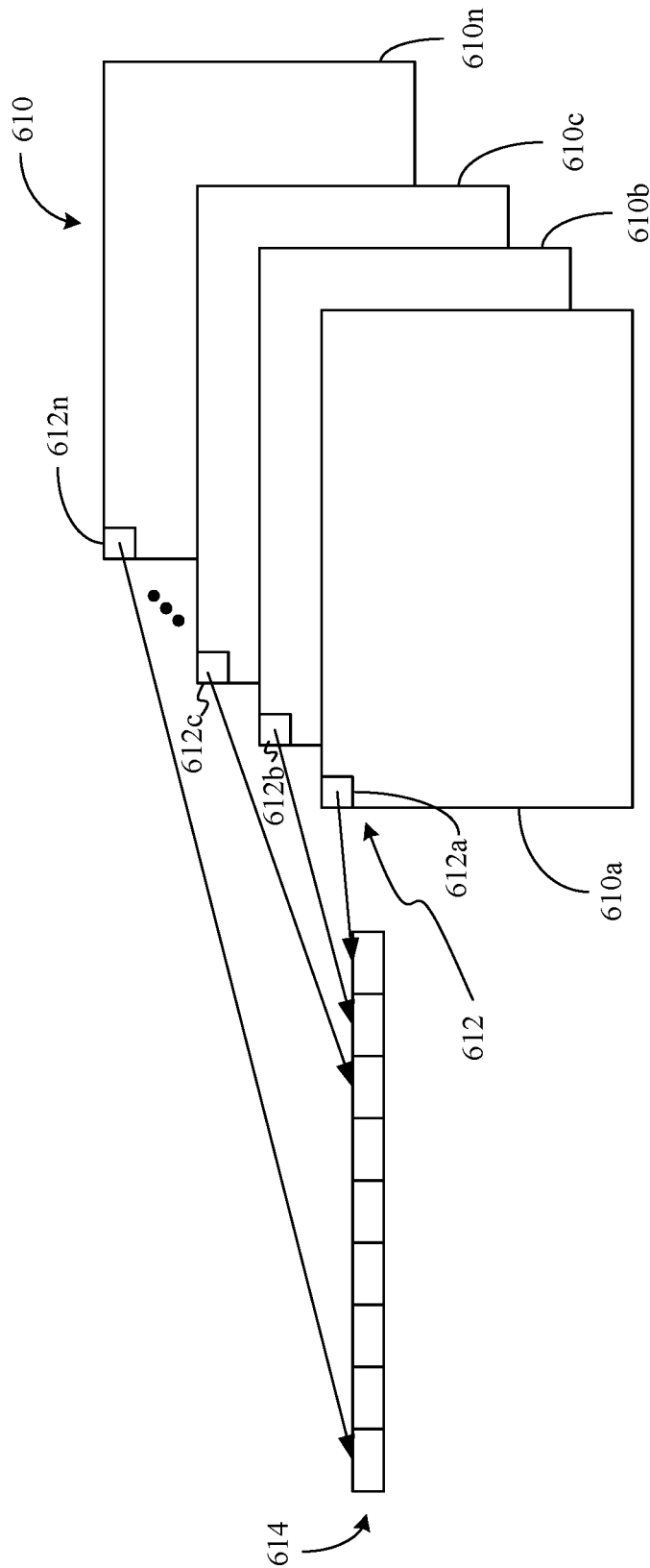
FIG. 6C is an illustration of an example of image data being stored to adjacent memory locations according to an embodiment.

Turning now to FIG. 6C, a plurality of display planes 610 (610a-610n) is shown. In general, content presented at a common pixel location 612 (612a-612n) may be similar. In the illustrated example, image data (e.g., primitives/polygons, vertices, textures, colors, depth information) associated with the common pixel location 612 is stored to adjacent memory locations 614 (e.g., a single cache line). By simultaneously rendering the image data from the adjacent memory locations 614 across the plurality of display planes 610, significant latency reductions may be achieved. For example, if 3D content to be presented on the display planes 610 includes a nature scene containing a bird, the bird may be in approximately the same x, y coordinate location in each of the display planes 610. Thus, the same image data may be retrieved only once and re-used across the plurality of display planes 610, rather than evicting the image data from memory (e.g., cache) and retrieving it again each time the scene is processed for a different display plane 610.

Indeed, a single instruction multiple data (SIMD) instruction may be dispatched to a plurality of graphics execution units to simultaneously render the image data. Moreover, the image data may be associated with a pixel subspan (e.g., 2×2 pixel neighborhood) containing the common pixel location 112, depending on the memory layout (e.g., cache line size) and/or SIMD instruction width.

FIG. 6D shows a method 616 of managing image data. The method 616 may generally be implemented in logic such as, for example, the logic 606 (FIGS. 6A and 6B), already discussed. More particularly, the method 616 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 616 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 618 provides for identifying a pixel location with respect to a plurality of display planes. Image data associated with the pixel location and the plurality of display planes may be stored to adjacent memory locations at block 620. In one example, the adjacent memory locations are contained within a single cache line. Additionally, the image data may be associated with a pixel subspan containing the pixel location. Illustrated block 622 simultaneously renders the image data from the adjacent memory locations across the plurality of display planes. Block 622 may include dispatching a SIMD instruction to a plurality of graphics execution units. Block 624 may optionally transpose the simultaneously rendered image data to a surface layout associated with the plurality of display planes. For example, if the interface to the display panels calls for display scanout operations to retrieve all data for a given display plane before retrieving data for the next display plane, block 624 might include re-arranging the rendered image data in memory to align with the expectations of the interface.

FIG. 6E shows a method 626 of conducting a memory setup procedure. The method 626 may generally be implemented in logic such as, for example, the logic 606 (FIGS. 6A and 6B), already discussed. More particularly, the method 626 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. In the illustrated example, an application creates displayable planes for light field display at processing block 628 via a 3D application programming interface (API). Additionally, a user mode driver (UMD) may create a memory allocation for the displayable planes at block 630. In the illustrated example, the memory allocation corresponds to the enhanced memory layout (e.g., data format) described herein.

FIG. 6F shows a more detailed method 632 of managing image data. The method 632 may generally be implemented in logic such as, for example, the logic 606 (FIGS. 6A and 6B), already discussed. More particularly, the method 632 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

In the illustrated example, an application submits draw requests at processing block 634 via a 3D API. Block 636 may submit a draw to a graphics processor, wherein the graphics processor may perform pipeline operations such as, for example, vertex fetching (VF), vertex shading (VS), clipping (CL), rasterization, etc., at block 638. Additionally, when the draw is broken into individual pixels (or 2×2 subspans of pixels), illustrated block 640 may submit each pixel to the parallel execution units across multiple display planes simultaneously. For example, if the execution units support SIMD8 dispatch, block 640 may submit eight pixels from eight different display planes in a single thread dispatch. At illustrated block 642, the draw work may complete and additional frame rendering may continue.

Thus, FIGS. 6C-6F demonstrate that enhanced data formatting technology may use more efficient data storage and thread dispatches to achieve reduced latency, increased performance in systems containing light field displays. Moreover, the increased performance may lead to less power consumption and longer battery life.

Re-Projection

Figure 7A:
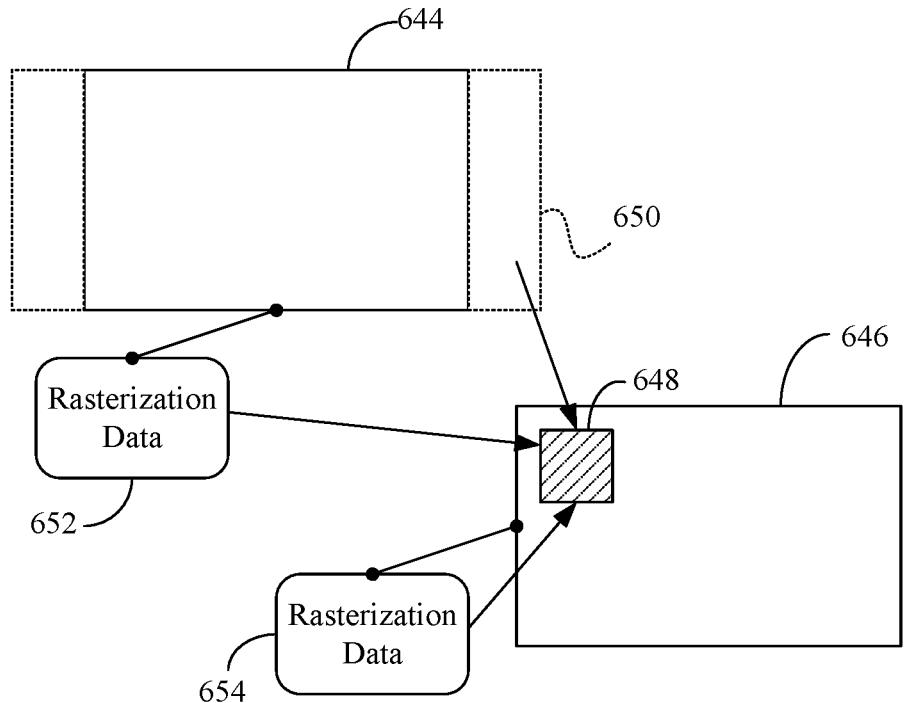
FIG. 7A is an illustration of an example of a source view and a re-projected view according to an embodiment.

Turning now to FIG. 7A, a source view 644 (e.g., viewport, render target) and a re-projected view 646 are shown. The source view 644 may be associated with a first display plane in a plurality of display planes, whereas the re-projected view 646 may be associated with a second (e.g., different) display plane in the plurality of display planes. The re-projected view 646 may generally be generated from the source view 644 rather than rendering the re-projected view 646 from "scratch". In the illustrated example, the re-projected view 646 includes a "hole" 648 (e.g., region missing color, texture or other image data). The hole 648 may be the result of a slight difference between the position of 3D content presented on the first display plane and the position of the same 3D content presented on the second display plane. As will be discussed in greater detail, a number of enhanced re-projection techniques may be used to "fill" (e.g., determine image data for) the hole 648. For example, the hole 648 may be filled in based on extended field of view data 650 corresponding to the source view 644, rasterization data 652 corresponding to the source view 644, rasterization data 654 associated with the re-projected view 646, or any combination thereof.

Figure 7B:
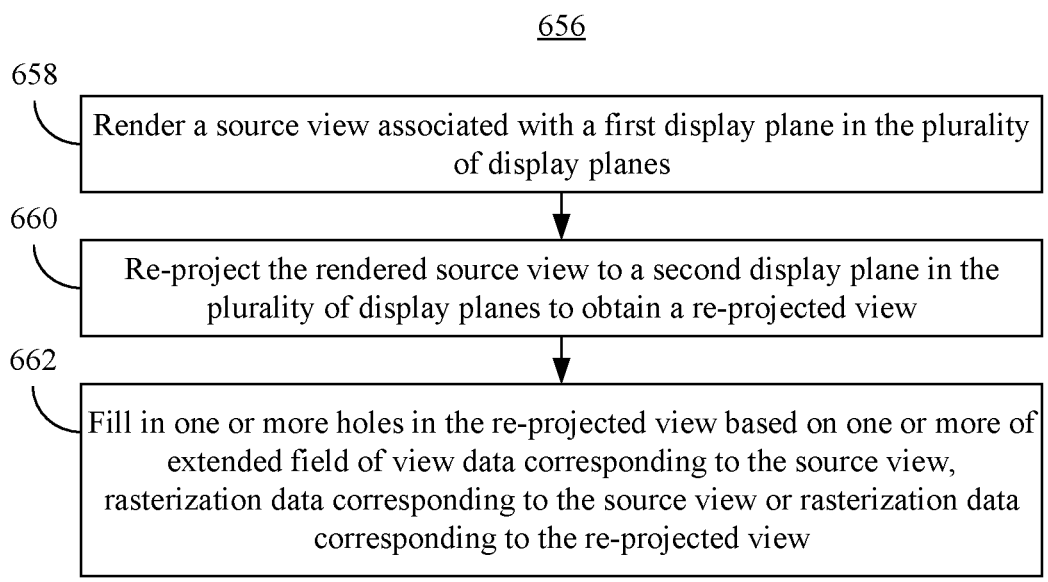
FIG. 7B is a flowchart of an example of a method of enhancing re-projected views according to an embodiment.

FIG. 7B shows a method 656 of enhancing re-projected views. The method 656 may generally be implemented in logic such as, for example, the logic 606 (FIGS. 6A and 6B), already discussed. More particularly, the method 656 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 658 provides for rendering a source view associated with a first display plane in a plurality of display planes, wherein the rendered source view may be re-projected to a second display plane in the plurality of display planes at block 660. The result of block 660 may be a re-projected view such as, for example, the re-projected view 646 (FIG. 7A), already discussed.

One or more holes in the re-projected view may be filled in at block 662 based on one or more of extended field of view data corresponding to the source view, rasterization data corresponding to the source view or rasterization data corresponding to the re-projected view. As will be discussed in greater detail, when the hole(s) are filled based on extended field of view data, the re-projected view may have a non-extended (e.g., standard) field of view. Moreover, when the hole(s) are filled based on rasterization data corresponding to the source view, a depth test may be disabled during rendering of the source view, with the depth test being conducted during filling of the hole(s) in the re-projected view. Additionally, when the hole(s) are filled based on the rasterization data corresponding to the re-projected view, a depth buffer may be pre-populated during re-projection of the rendered source view, wherein a depth test may be conducted during filling of the hole(s) based on data in the depth buffer.

Figure 7C:
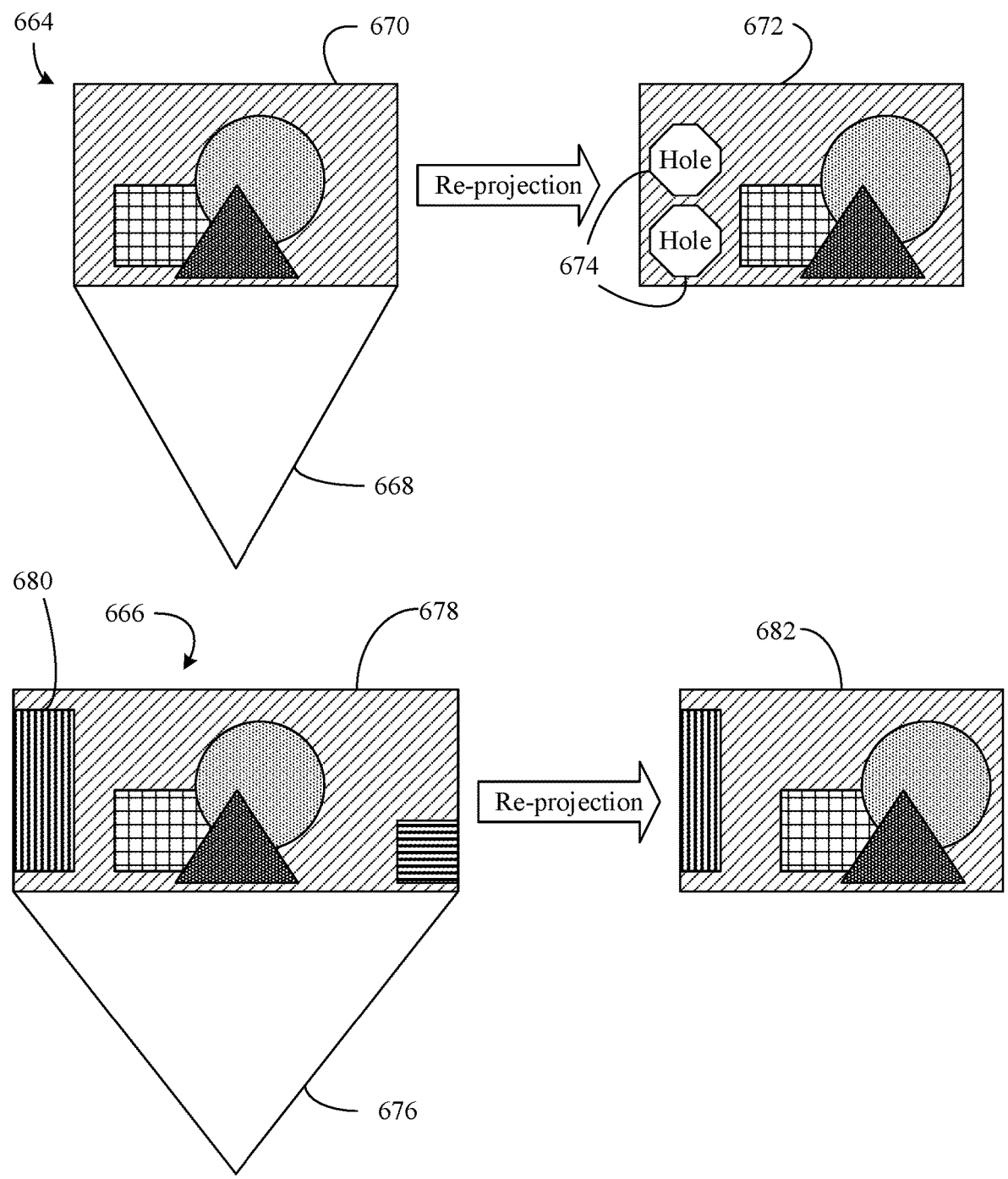
FIG. 7C is a comparative illustration of an example of a non-extended field of view and an extended field of view according to an embodiment.

FIG. 7C shows a conventional re-projection 664 in comparison with an enhanced re-projection 666. In the illustrated example, a view frustum 668 in the conventional re-projection 664 defines a standard field of view for a source view 670. Accordingly, a re-projected view 672 in the conventional re-projection 664 may contain one or more holes 674. By contrast, a view frustum 676 in the enhanced re-projection 666 may define an extended (e.g., substantially wider) field of view for a source view 678. Using image data 680 from the extended field of view to fill in the one or more holes 674 may therefore enable a re-projected view 682 to be generated from the source view 678. The illustrated re-projected view 682 has a non-extended field of view.

Figure 7D:
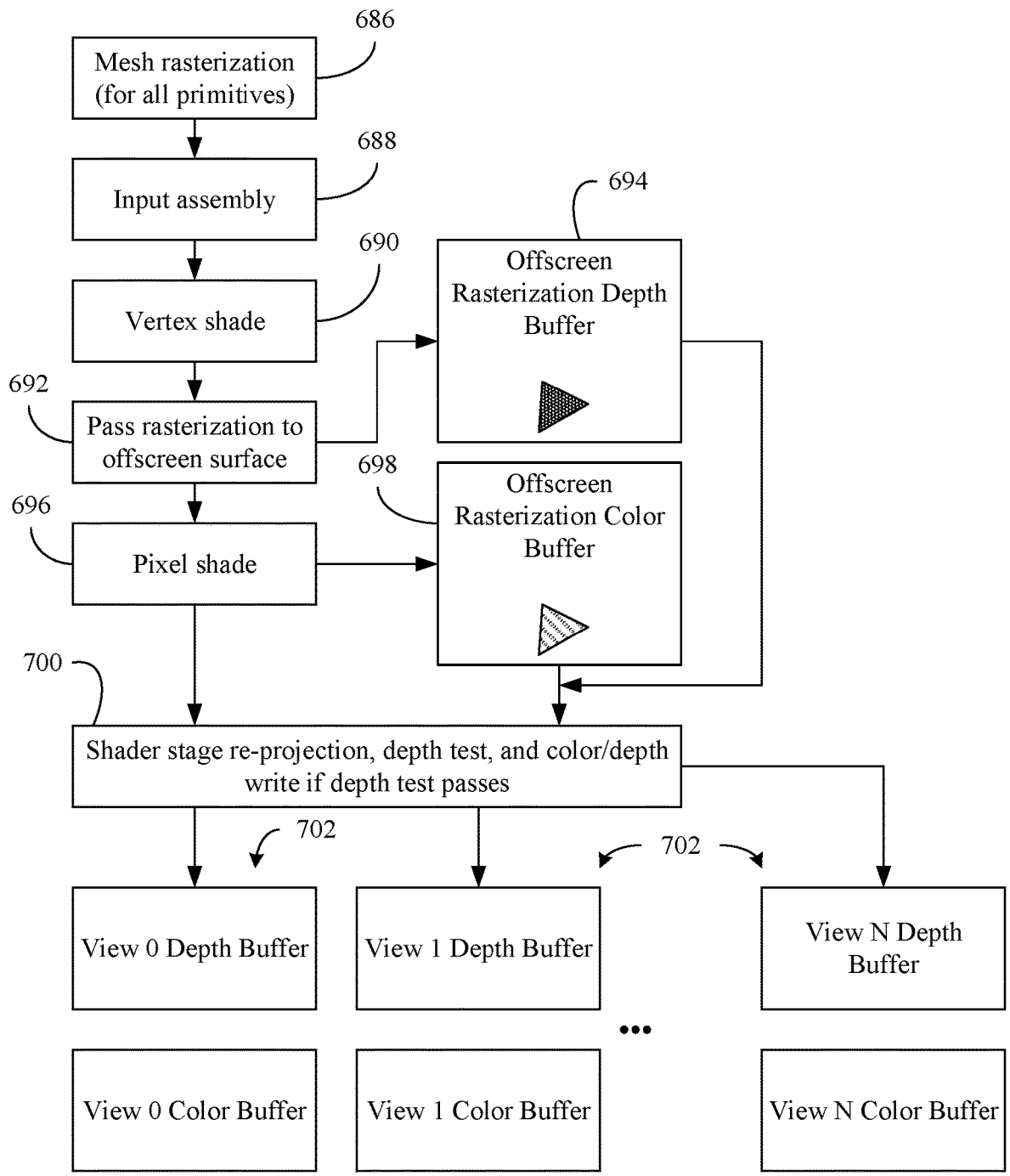
FIG. 7D is a flowchart of an example of a method of filling view holes based on rasterization data corresponding to a source view according to an embodiment.

FIG. 7D shows a method 684 of filling view holes based on rasterization data corresponding to a source view. The method 684 generally demonstrates that a depth test may be disabled during rendering of the source view, wherein the depth test may be conducting during the filling in of the holes in a re-projected view. Thus, every primitive in the source view may be fully shaded in the illustrated solution. The method 684 may generally be implemented in logic such as, for example, the logic 606 (FIGS. 6A and 6B), already discussed. More particularly, the method 684 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 686 conducts a mesh rasterization for all primitives associated with a source view. An input assembly may be conducted at block 688, wherein illustrated block 690 conducts vertex shading operations. Rasterization may be passed to an offscreen surface at block 692. Accordingly, depth information for each pixel may be stored to an offscreen rasterization depth buffer 694. Additionally, illustrated block 696 conducts pixel shading operations. In the illustrated example, color information for each pixel may be stored to an offscreen rasterization color buffer 698. Block 700 may conduct shader stage re-projection and depth testing operations, wherein color and depth writes to additional view buffers 702 may be conducted when the depth test passes (e.g., the vertex is visible).

Figure 7E:
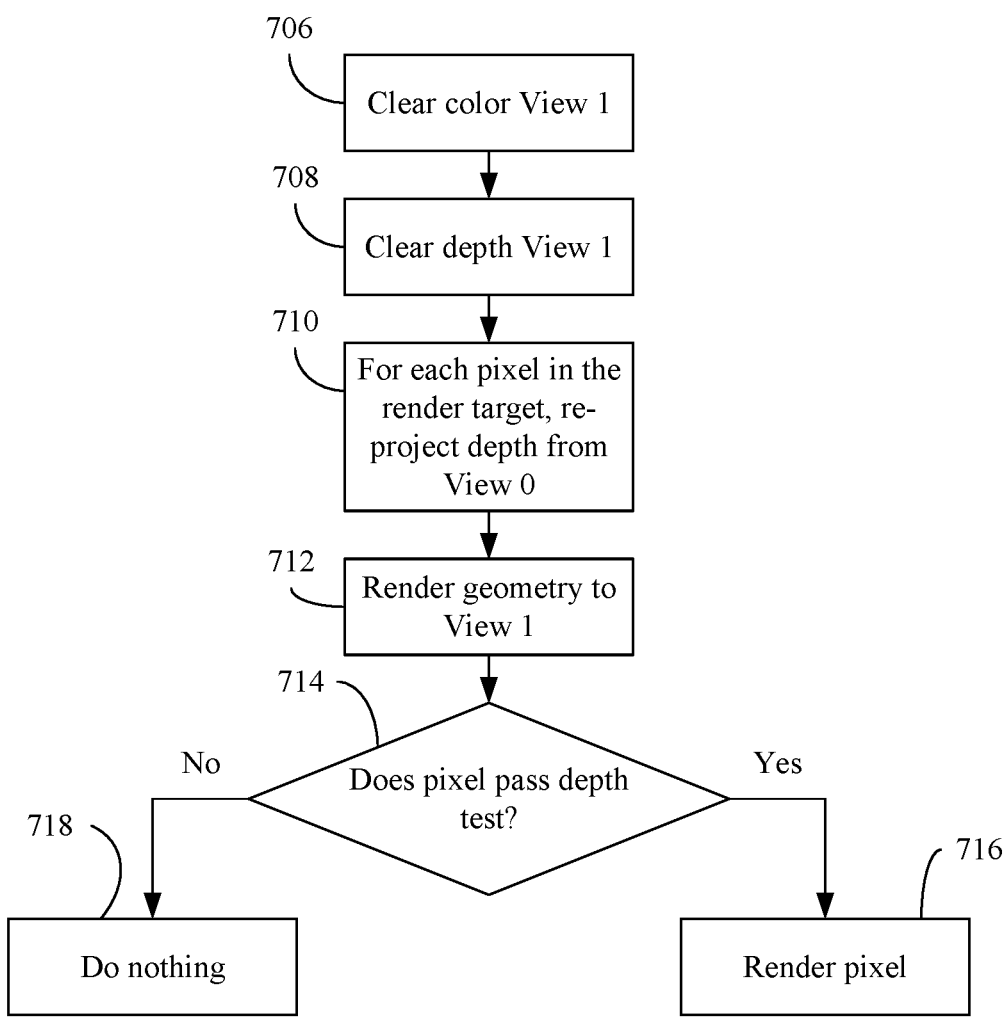
FIG. 7E is a flowchart of an example of a method of filling view holes based on rasterization data corresponding to a re-projected view according to an embodiment.

FIG. 7E shows a method 704 of filling view holes based on rasterization data corresponding to a re-projected view. The method 704 generally demonstrates that a depth buffer may be pre-populated during re-projection of a rendered source view, with a depth test being conducting during filling of the hole(s) based on data in the depth buffer. The method 704 may generally be implemented in logic such as, for example, the logic 606 (FIGS. 6A and 6B), already discussed. More particularly, the method 704 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 706 provides for clearing the color of a re-projected (e.g., "View 1"). Additionally, the depth of the re-projected view may be cleared at block 708. Block 710 may re-project, for each pixel in the render target, depth information from a source view (e.g., "View 0"). Additionally, geometry may be rendered to View 1 at block 712, wherein a determination may be made at block 714 as to whether each pixel passes the depth test. If the pixel passes the depth test, illustrated block 716 renders the pixel. Otherwise, block 718 may do nothing.

Thus, FIGS. 7A-7E demonstrate that enhanced re-projection technology may use pre-existing image data to eliminate visual artifacts in systems containing light field displays while maintaining high performance. Indeed, the enhanced re-projection technology may be combined with the data formatting technology described with respect to FIGS. 6C-6F to achieve synergistic improvements with regard to latency, performance, power consumption and/or battery life. For example, the image data corresponding to source views may be stored more efficiently and used to optimize thread dispatches.

Foveation

Fovea may refer to a small depression in the retina of the eye where visual acuity may be highest. The center of the field of vision may be focused in this region, where retinal cones may be particularly concentrated. In the context of some graphics applications, a fovea or a foveated region may correspond to an area of focus in an image or display.

Figure 8A:
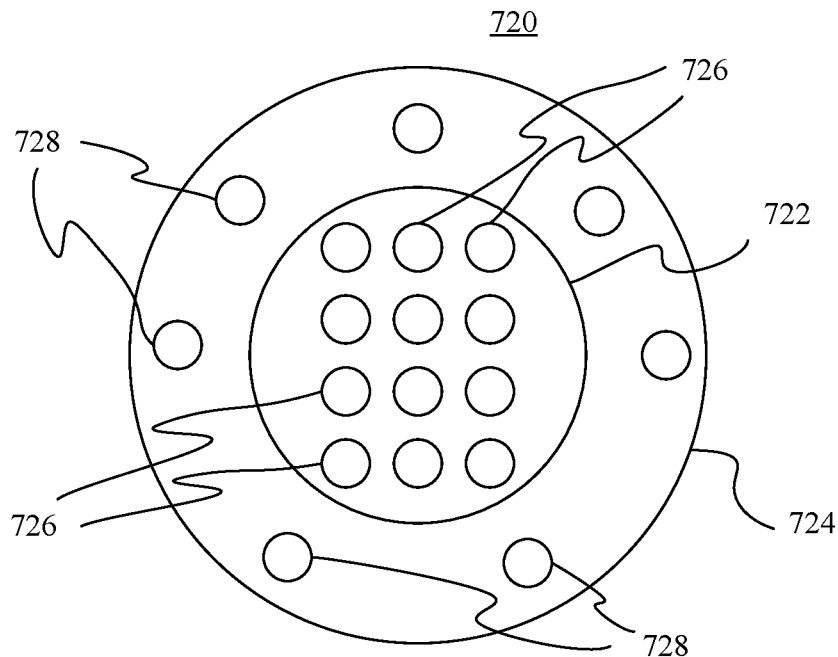
FIG. 8A is an illustration of an example of a foveated view layout according to an embodiment.

FIG. 8A shows a foveated view layout 720 in which a foveated region 722 in the field of view of a user corresponds to a focus point of the user. The illustrated foveated region 722 is surrounded by a peripheral (e.g., out-of-focus) region 724. As will be described in greater detail, scene content presented on a plurality of display planes may be varied on a per display plane basis using the focus point. For example, the image resolution of one or more fovea views 726 (e.g., cameras) in the foveated region 722 may be set to relatively high values, wherein the image resolution values are established independently for each display plane. By contrast, the image resolution of one or more peripheral views 728 (e.g., cameras) in the peripheral region 724 may be set to relatively low resolution values, wherein the image resolution values are also established independently for each display plane. The lower image resolution in the peripheral region 724 may reduce processing overhead (e.g., rendering effort) without negatively impacting the perceived image quality because the human eye visual system is less sensitive in the peripheral region 724.

In another example, the view density (e.g., number of views per square area) of the fovea views 726 in the foveated region 722 may be set to a relatively high value, wherein the view density is established independently for each display plane. By contrast, the view density of the illustrated peripheral views 728 in the peripheral region 724 is set to a relatively low value, wherein the view density may be established independently for each display plane. The lower view density in the peripheral region 724 may further reduce processing overhead without negatively impacting the perceived image quality because of less eye sensitivity in the peripheral region 724.

Moreover, the view update frequency of the fovea views 726 in the foveated region 722 may be set (e.g., independently for each display plane) to a relatively high value, whereas the view update frequency of the peripheral views 728 in the peripheral region 724 might be set (e.g., independently for each display plane) to a relatively low value. Again, the lower view update frequency in the peripheral region 724 may further reduce processing overhead without negatively impacting the perceived image quality.

Figure 8B:
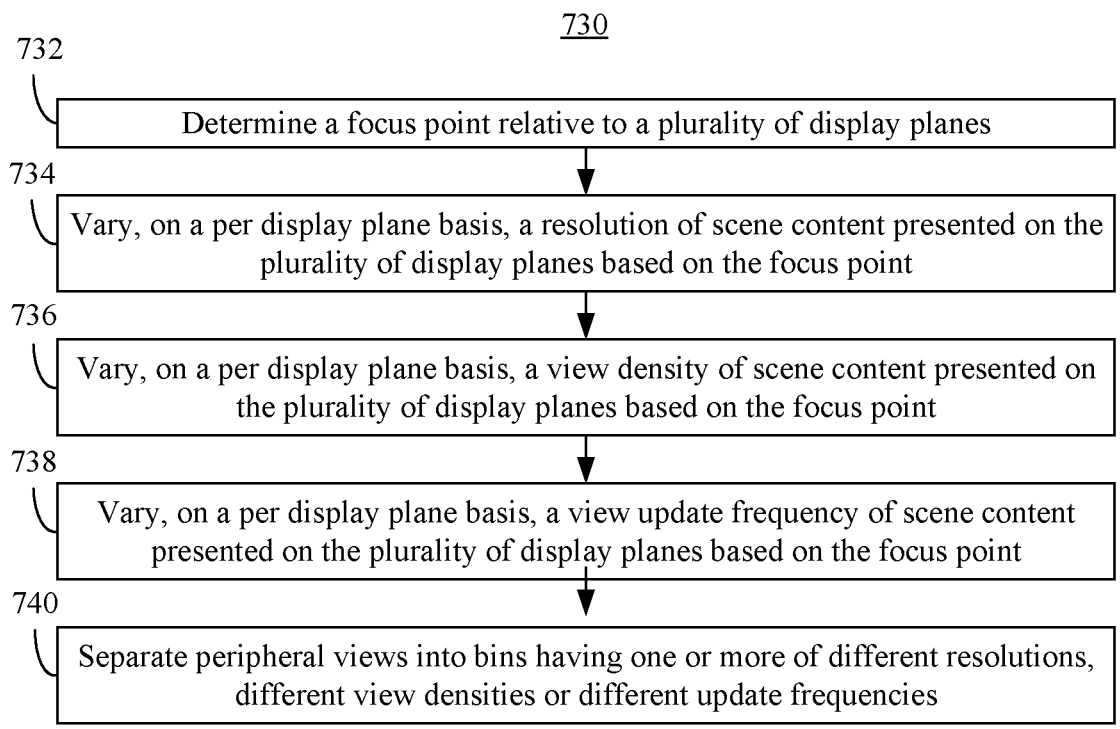
FIG. 8B is a flowchart of an example of a method of foveating scene content presented on a plurality of display planes according to an embodiment.

FIG. 8B shows a method 730 of foveating scene content presented on a plurality of display planes. The method 730 may generally be implemented in logic such as, for example, the logic 606 (FIGS. 6A and 6B), already discussed. More particularly, the method 730 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 732 provides for determining a focus point relative to a plurality of display planes. Block 732 may include obtaining eye position information from an eye tracker (e.g., camera capturing the eyes of the user). The eye tracker may use information from a sensor hub, motion monitor and/or other sources to provide focus information. The focus information may include, for example, the focus point, a focus area, an eye position, eye motion, pupil size, pupil dilation, depth of focus (DOF), a content focal point, a content focus object, a content focus area, etc. The focus information may also include prior focus information, determined future focus information, and/or predicted focus information (e.g., a predicted focal point, a predicted focus area, a predicted eye position, predicted eye motion, predicted pupil size, predicted pupil dilation, predicted DOF, determined future content focal point, determined future content focus object, determined future content focus area, predicted content focal point, predicted content focus object, predicted content focus area, etc.).

Block 734 may vary, on a per display plane basis, the resolution of scene content presented on the plurality of display planes based on the focus point. Block 734 may include, for example, increasing the resolution in a foveated region and decreasing the resolution in a peripheral region. Additionally, illustrated block 736 varies, on the per display plane basis, the view density of scene content presented on the plurality of display planes based on the focus point. Block 736 may therefore include increasing the view density in the foveated region and decreasing the view density in the peripheral region. The view update frequency of scene content presented on the plurality of display planes may be varied at block 738, on the per display plane basis, based on the focus point. Block 738 may include increasing the view update frequency in the foveated region and decreasing the view update frequency in the peripheral region.

Figure 8C:
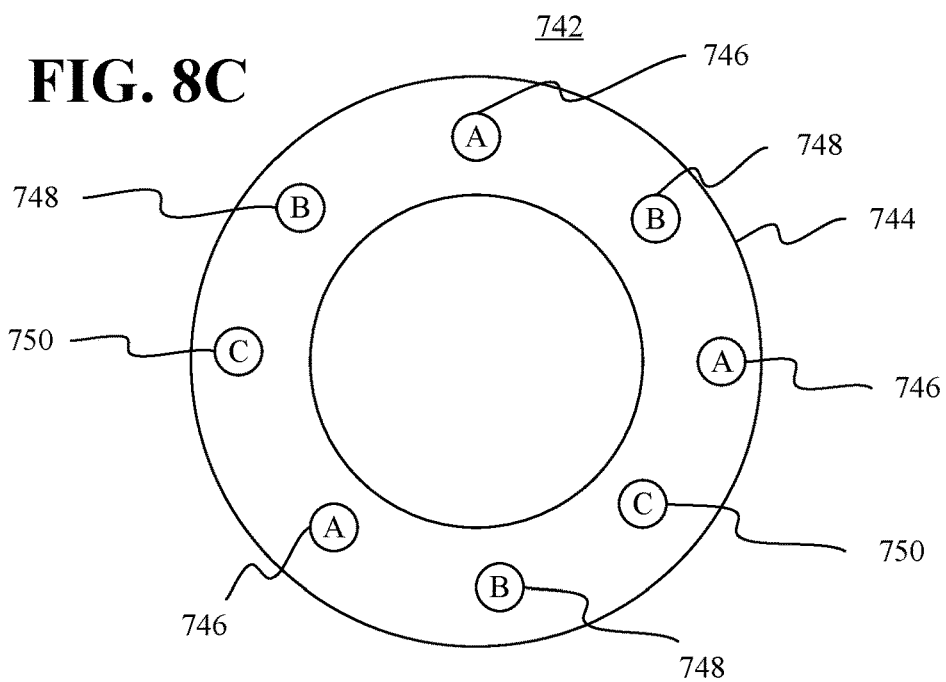
FIG. 8C is an illustration of an example of a peripheral view bin layout according to an embodiment.

Illustrated block 740 separates peripheral views into bins having one or more of different resolutions, different view densities or different update frequencies. With continuing reference to FIGS. 8B and 8C, a foveated view layout 742 is shown in which a peripheral region 744 contains a first bin 746 (bin "A"), a second bin 748 (bin "B") and a third bin 750 (bin "C"). The bins 746, 748, 750 may be associated with peripheral views having different resolutions, view densities and/or update frequencies. For example, peripheral views having a relatively high image resolution may be assigned to the first bin 746, peripheral views having a relatively low image resolution may assigned to the third bin 750, and peripheral views having an intermediate image resolution may be assigned to the second bin 748. Because the light field display may present a large number of peripheral views that are updated on different frames (e.g., some views may be updated on frame n other views may be updated on frame n+1, and still other views might be updated on frame n+2), even if there is a slight change in the focus point, there is a high likelihood that at least one of the views will capture any content change that results.

The peripheral views may be similarly separated into bins having different view densities. For example, the first bin 746 might be provided with more locations in the peripheral region 744 than the second bin 748, which may in turn be provided with more locations in the peripheral region 744 than the third bin 750. In yet another example, peripheral views having a relatively high update frequency may assigned to the first bin 746, peripheral views having a relatively low update frequency may be assigned to the third bin 750, and peripheral views having an intermediate resolution may be assigned to the second bin 748.

Alternatively, a view warping technique may be used for views that are not to be fully updated within a frame. For example, for some N number of frames, a view V may be fully updated. During some or all of the non-full-update frames, the view V may be created by re-using image data (e.g., warping) from either adjacent views or the previous full-update frame.

Moreover, using knowledge of the layout of the multiple views, a tile renderer may be further optimized for geometry binning. For example, finer grained checks may be used earlier in concentrated regions such as the foveated region 722 (FIG. 8A). As another example, the frustum shape may be modified based on which views are being updated during a particular frame.

FIGS. 8A-8C therefore demonstrate that enhanced foveation technology may reduce rendering effort in light field displays on a per display plane basis without negatively impacting the perceived image quality. Moreover, the enhanced foveation technology may be combined with the data formatting technology described with respect to FIGS. 6C-6F and/or the enhanced re-projection technology described with respect to FIGS. 7A-7E to achieve additional synergistic improvements with regard to latency, performance, power consumption and/or battery life. For example, the image data associated with the foveated region views and/or the peripheral region views may be stored more efficiently and used to optimize thread dispatches. Additionally, the re-projection techniques described herein may be readily applied to the foveated region views and/or the peripheral region views.

Tile Binning

In light field displays, the number of views (e.g., viewports, render targets) may be much greater than in conventional displays. Accordingly, determining which geometry (e.g., primitives, polygons) from the views to accept and rasterize or reject and discard may present a rendering bottleneck challenge. Technology described herein may use hierarchical culling operations and tile bins to reduce and/or eliminate rendering bottlenecks in light field displays.

Figure 9A:
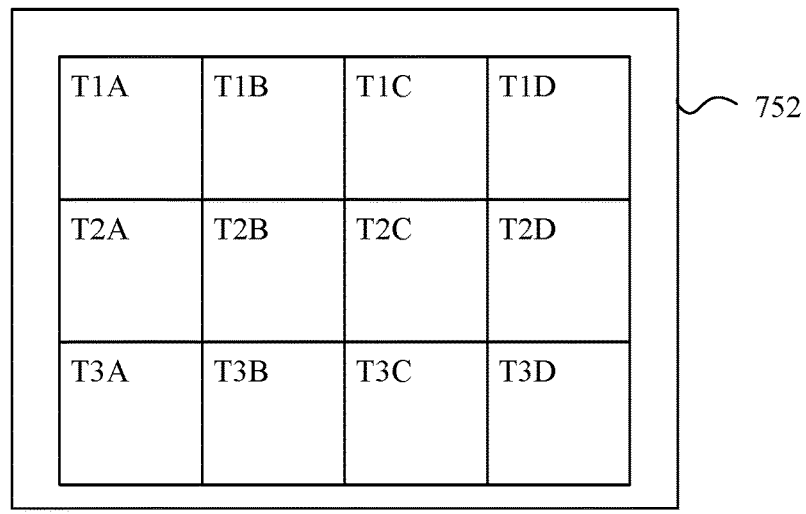
FIG. 9A is an illustration of an example of a view frustum tile layout according to an embodiment.
Figure 9A:
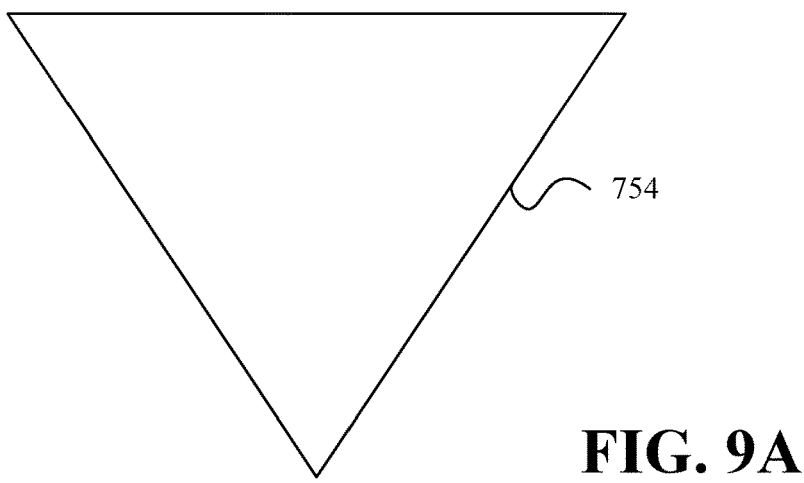

FIG. 9A shows a view layout 752 that is organized into a plurality of tiles (tile "T1A" to tile "T3D"). The illustrated view layout 752, which is merely an example, may vary in resolution, viewport count, tile size, etc., depending on the circumstances. Each tile may have a size of, for example, 256×256 pixels. Accordingly, the 4×3 array of tiles may result in a view size of, for example, 1024×768 pixels. A plan (e.g., top) view of a view frustum 754 demonstrates the relationship of the view layout 752 to the eye of the user.

Figure 9B:
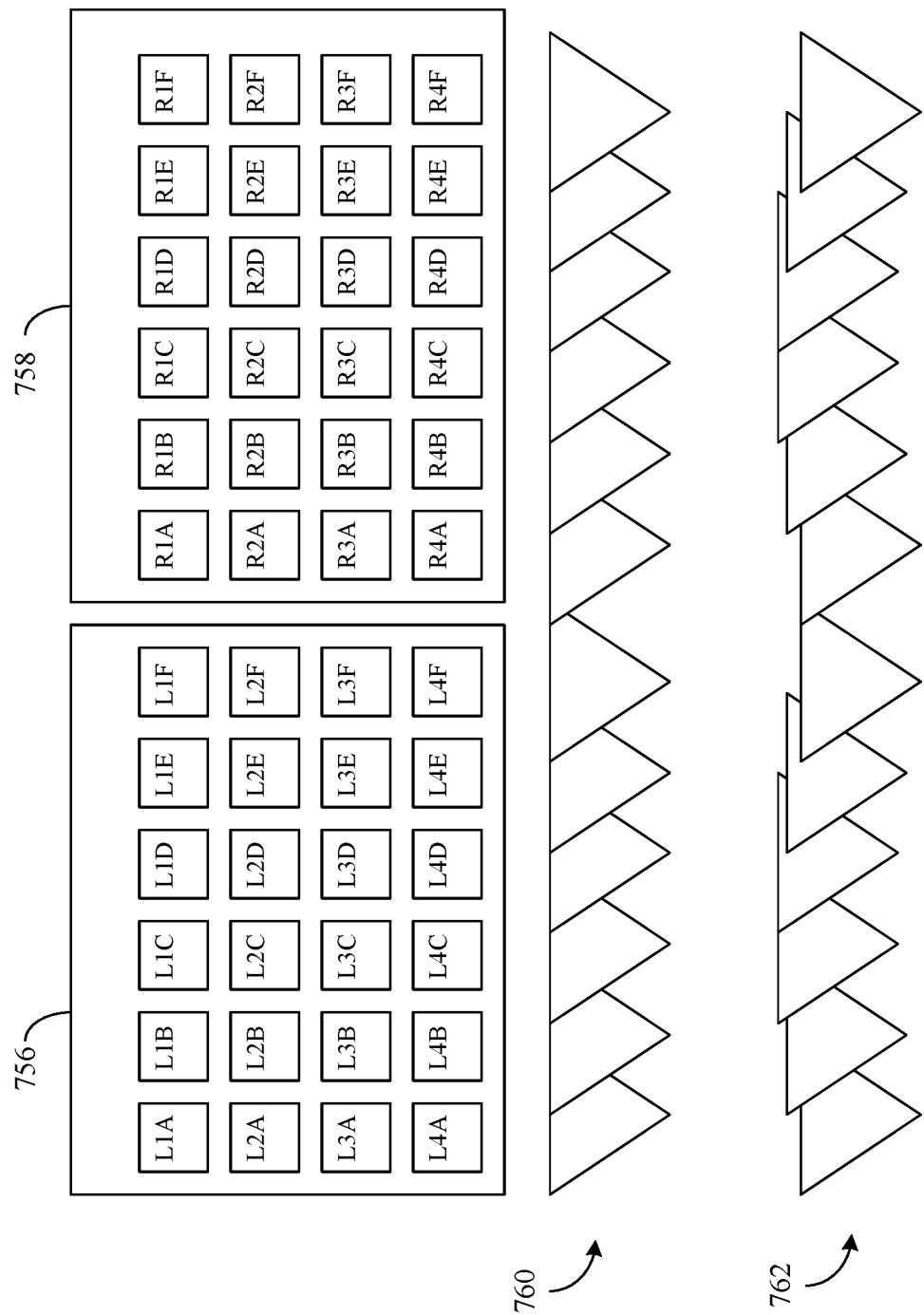
FIG. 9B is an illustration of an example of a light field display view frustum layout according to an embodiment.

FIG. 9B shows a left eye collection 756 of 8×6 views (view "L1A" to view "L4F") and a right eye collection 758 of 8×6 views. (view "R1A" to view "R4F"). The views may be organized into either an aligned array 760 of display plane frustums or a non-aligned (e.g., curved) array 762 of display plane frustums. The collections 756, 758 demonstrate that a light field display may involve processing primitives for a large number of views. Rather than processing each primitive for all views (e.g., 48 views*12 tiles per view), hierarchical culling operations and tile bins may be used as described herein.

Figure 9C:
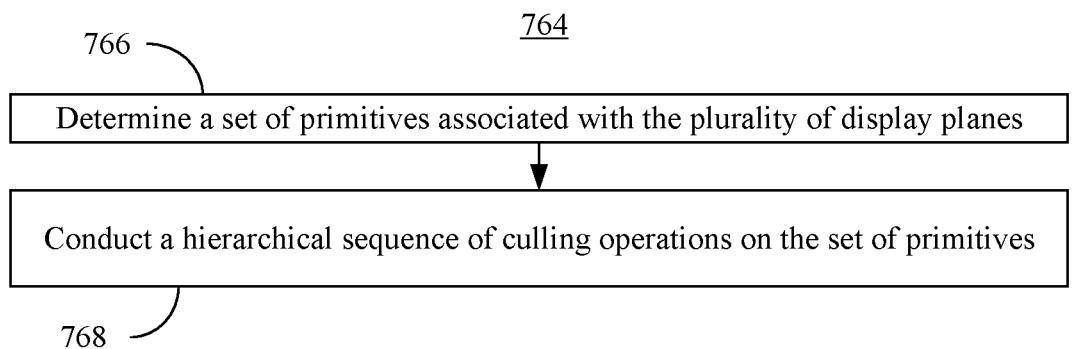
FIG. 9C is a flowchart of an example of a method of managing primitives associated with a plurality of display planes according to an embodiment.

Turning now FIG. 9C, a method 764 of managing primitives associated with a plurality of display planes is shown. The method 764 may generally be implemented in logic such as, for example, the logic 606 (FIGS. 6A and 6B), already discussed. More particularly, the method 764 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. Illustrated processing block 766 provides for determining a set of primitives associated with a plurality of display planes. Additionally, a hierarchical sequence of culling operations may be conducted on the set of primitives at block 768.

Figure 9D:
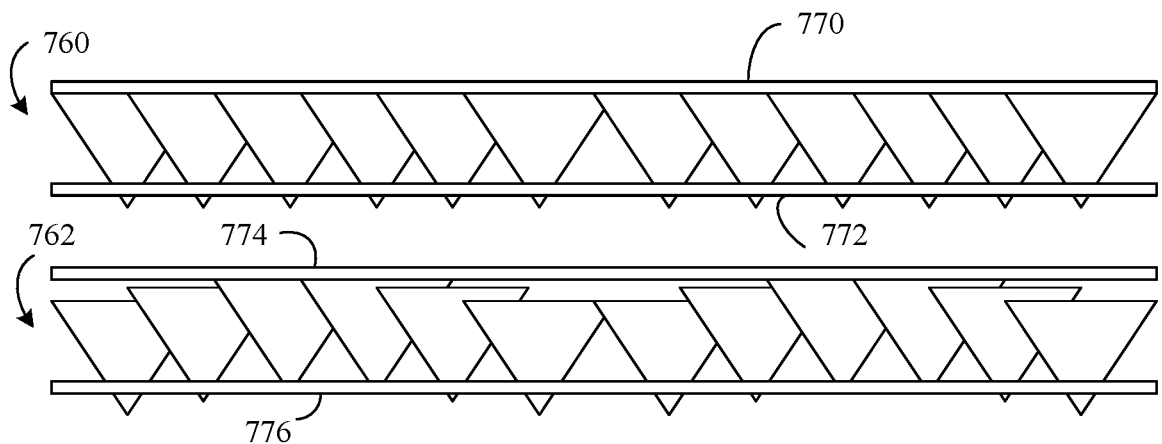
FIG. 9D is an illustration of an example of a near plane-far plane determination according to an embodiment.

FIG. 9D demonstrates that the hierarchical sequence may begin with a near plane-far plane culling operation. Thus, with regard to the aligned array 760, the near plane-far plane culling operation may reject primitives behind a farthest display plane 770 and reject primitives in front of a nearest display plane 772. Similarly, with regard to the non-aligned array 762, the near plane-far plane culling operation may reject primitives behind a farthest display plane 774 and reject primitives in front of a nearest display plane 776.

Figure 9E:
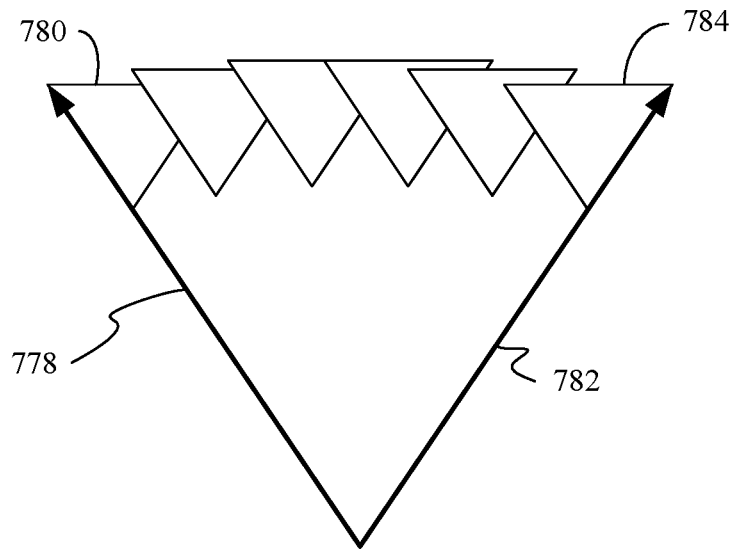
FIG. 9E is an illustration of an example of a coarse frustum culling determination according to an embodiment.

FIG. 9E demonstrates that after the near plane-far plane culling operation, a coarse frustum culling operation may be conducted on a per eye basis. More particularly, the coarse frustum culling operation might involve selecting an eye (e.g., left eye), determining a left frustum plane 778 of a leftmost viewport 780 (e.g., view) and determining a right frustum plane 782 of a rightmost viewport 784. The illustrated coarse frustum culling operation involves determining a top frustum plane of a topmost viewport (not shown), determining a bottom frustum plane of a bottommost viewport, and rejecting primitives outside the top frustum plane, the bottom frustum plane, the left frustum plane 778 and the right frustum plane 782. In one example, the rejection test calculates a distance between the vertices of each primitive and each frustum plane to determine the relative position of the primitive to the plane in question. The illustrated approach may be repeated for the right eye.

Figure 9F:
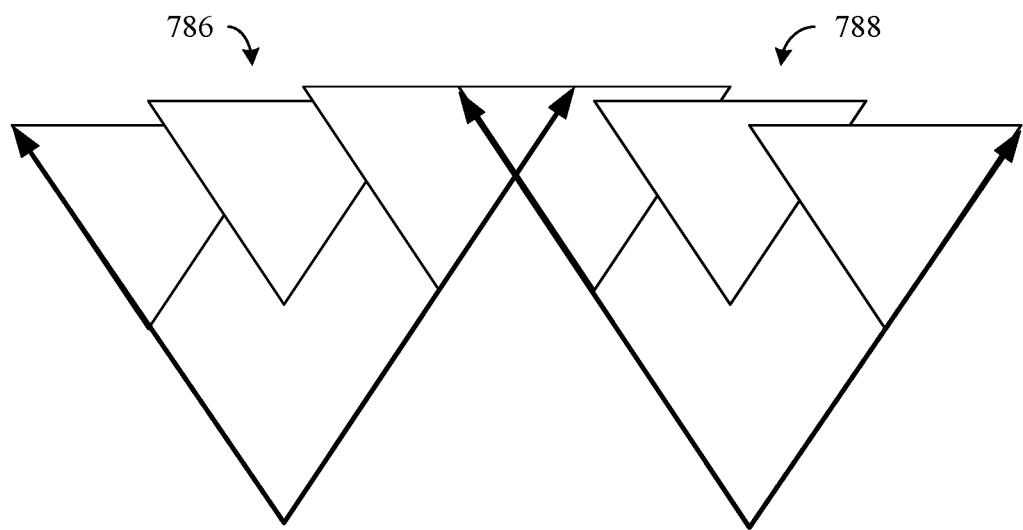
FIGS. 9F and 9G are illustrations of examples of fine frustum culling determinations according to an embodiment.
Figure 9G:
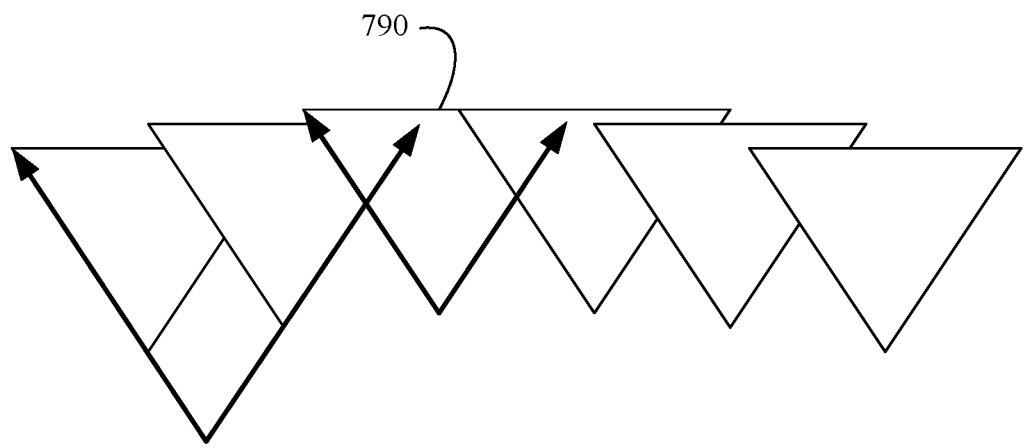

Turning now to FIGS. 9F and 9G, fine frustum culling determinations are illustrated in which the primitives are assigned to tile bins. In the illustrated example, a binary reject operation determines whether a primitive is within a left set 786 of frustums or a right set 788 of frustums. If, for example, a primitive is found to be within the left set 786 of frustums, a further check may be performed to determine if the primitive is within a rightmost frustum 790 of the left set 786. If the primitive is found to be within the rightmost frustum 790, the tile bins associated with the rightmost frustum 790 may be populated with the primitive in question. While the left set 786 and the right set 788 and are shown in the illustrated example, the fine frustum culling determinations may also include similar checks that are performed for a top set (not shown) of frustums and a bottom set (not shown) of frustums.

Figure 9H:
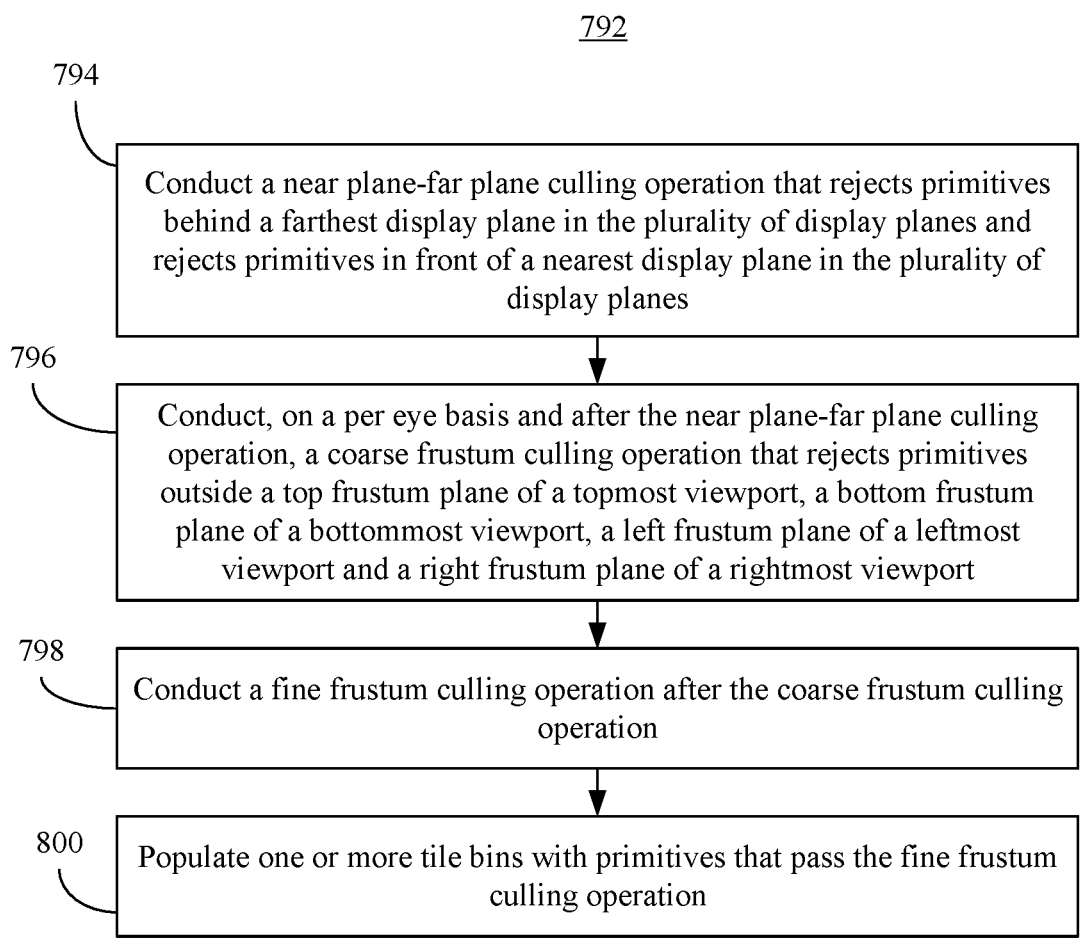
FIG. 9H is a flowchart of an example of a method of conducting a hierarchical sequence of culling operations according to an embodiment.

FIG. 9H shows a method 792 of conducting a hierarchical sequence of culling operations. The method 792 may generally be implemented in logic such as, for example, the logic 606 (FIGS. 6A and 6B), already discussed. More particularly, the method 792 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 794 provides for conducting a near plane-far plane culling operation that rejects primitives behind a farthest display plane in the plurality of display planes and rejects primitives in front of a nearest display plane in the plurality of display planes. Additionally, block 796 may conduct, on a per eye basis and after the near plane-far plane culling operation, a coarse frustum culling operation that rejects primitives outside a top frustum plane of a topmost viewpoint, a bottom frustum plane of a bottommost viewport, a left frustum plane of a leftmost viewport and a right frustum plane of a rightmost viewport. In one example, a fine frustum culling operation is conducted at block 798 after the coarse frustum culling operation and block 800 may populate one or more tile bins with primitives that pass the fine frustum culling operation.

An alternative simple approach may be done for all viewport frustum plane sets that are parallel. Hardware may implement a plane equation for the left, right, top, and bottom planes of the view frustums. This approach can be done for the frustum planes of the viewports representing the same relative bin offsets (e.g., the planes are parallel, and only differ by an offset from the origin). Each view frustum may be represented with a different distance from the origin. When primitives are tested for inclusion the following check may be performed:

Bool PlaneCheck(Polygon, Plane)
For (each point in polygon):
If(dot(Plane.Normal, point)<Plane.Distance)
Return TRUE;
Return FALSE;

Using the left eye planes of FIG. 9B as an example, the planes may all share the normal, and may only differ by an offset. For example, the left planes for viewports L1A, L2A, L1B, . . . L2B may have the following plane properties:

LeftPlaneL1A=LeftPlane.Normal, LeftPlaneL1A_Offset
LeftPlaneL2A=LeftPlane.Normal, LeftPlaneL2A_Offset
LeftPlaneL1B=LeftPlane.Normal, LeftPlaneL1B_Offset
. . .
LeftPlaneL2B=LeftPlane.Normal, LeftPlaneL1B_Offset This pattern may apply to all viewports for both eyes.

The same may be true for tiles within the same viewports (e.g., each tile within a viewport will have a different plane Normal, but all tiles may be uniform across all render targets). For example, with reference to FIGS. 9A and 9B, the plane equation for tile T1A in L1A, L2A, L1B, . . . L2B may be:

LeftPlaneL1A_T1A=T1A_LeftPlane.Normal, LeftPlaneL1A_T1A_Offset
LeftPlaneL2A_T1A=T1A_LeftPlane.Normal, LeftPlaneL2A_T1A_Offset
LeftPlaneL1B_TIA=T1A_LeftPlane.Normal, LeftPlaneL1B_T1A_Offset
. . .
LeftPlaneL2B_T1A=T1A_LeftPlane.Normal, LeftPlaneL1B_T1A_Offset In the end for inclusion, a dot product may be performed between all vertices in a primitive and the Normal of each left, right, top, and bottom planes. Individual viewport checks may be performed with only the plane offset comparisons.

To perform frustum checks for all T1A tiles in all viewports in the left eye using this approach, the following may be used:

```
//define a function pointer type use different comparator: > (for left and bottom
), > (for right and top)
    typedef bool (CompareOperator*)(float, float);
    //define the compartor functions
    bool    CompareOperatorGreaterThan(float    offsetFromOrigin,    float
planeOffsetFromOrigin)    { return offsetFromOrigin > planeOffsetFromOrigin; }
    bool    CompareOperatorLessThan(float    offsetFromOrigin,    float
planeOffsetFromOrigin)    { return offsetFromOrigin < planeOffsetFromOrigin; }
    //helper function to see if any point in a polygon passes the plane check
    bool   AnyPointPassesPlaneCheck(FloatVector   polygonOffsets,   Float3
planeNormal, float planeOffset, CompareOperator compareOp)
    {
    bool anyPointsPass = false;
    for (pointOffset all offsets in polygonOffsets)
    {
    if (compareOp(pointOffset, planeOffset))
    {
a.  anyPointsPass = true;
b.  break;
    }
    }
    return anyPointsPass;
    }
    //define the planes
    enum Plane{ Left, Right, Top, Bottom, PlaneCount = 4 }
    Void MultiFrustumCheck(Polygon polygon, BOOL passResults[6][4], Float3
planesNormalsPerTile[PlaneCount],    Float3Vector<    PlaneCount    >
offsetsPerViewport[6][4], CompareOperator compareFuns[PlaneCount])
    {
    FloatVector polygonOffsets[PlaneCount];
    //collect offsets per polygon per plane
    for (all points in Polygon)
    {
    polygonOffsets[Left].Append(dot(point, planesNormalsPerTile[Left]));
    polygonOffsets[Right].Append(dot(point, planesNormalsPerTile[Right]));
    polygonOffsets[Top].Append(dot(point, planesNormalsPerTile[Top]));
    polygonOffsets[Bottom].Append(dot(point, planesNormalsPerTile[Bottom]));
    }
    //
    for (int x = 0; x < 6; ++x)
    {
    for (int y = 0; y < 4; ++y)
    {
a.  //in order to fail the test there has to be one plane where all points fail the plane
check
b.  passResults[x][y]  =  AnyPointPassesPlaneCheck(polygonOffsets[Left],
planesNormalsPerTile[Left],                          offsetsPerViewport[x][y].Left,
CompareOperatorGreaterThan) &&
i.AnyPointPassesPlaneCheck(polygonOffsets[Right],         planesNormalsPerTile[Right],
    offsetsPerViewport[x][y].Right, CompareOperatorLessThan) &&
ii.AnyPointPassesPlaneCheck(polygonOffsets[Top],              planesNormalsPerTile[Top],
    offsetsPerViewport[x][y].Top, CompareOperatorLessThan) &&
iii.AnyPointPassesPlaneCheck(polygonOffsets[Bottom],     planesNormalsPerTile[Bottom],
    offsetsPerViewport[x][y].Bottom, CompareOperatorGreaterThan);
    }
    }
    }
```

It may be advantageous to cull primitives down to groups of tiles. If most of the geometry is the same per tile in nearby viewports/render targets, the geometry may be sorted prior to rendering to avoid redundant pixel shader work. After the sort phase is done, the geometry may be passed to the bin for each tile to be rasterized. The primitive rasterizer may still have the ability to early cull primitives that will not result in rasterization work.

Figure 9I:
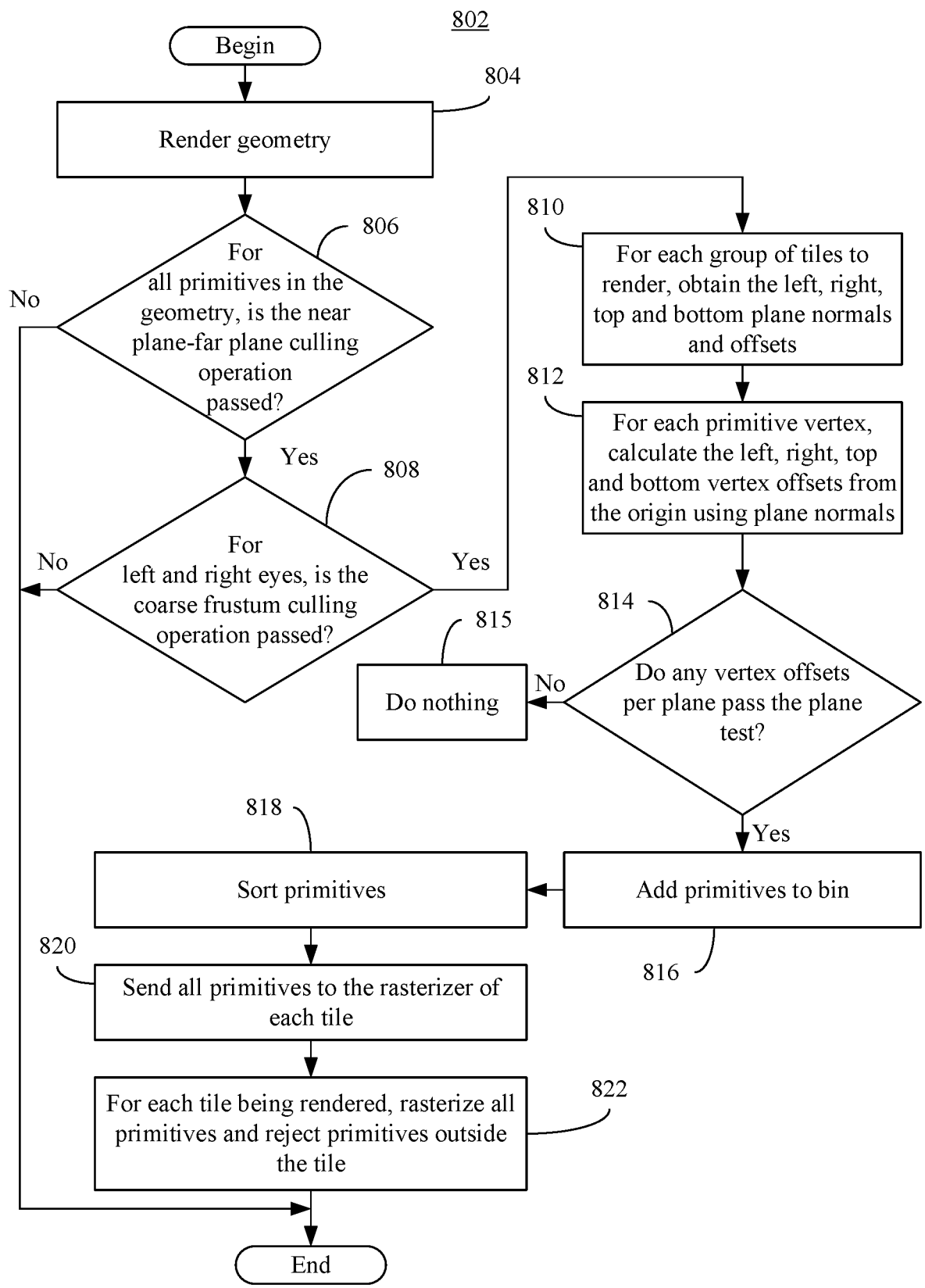
FIG. 9I is a flowchart of an example of a more detailed method of conducting a hierarchical sequence of culling operations according to an embodiment.

For example, an attempt might be made to rasterize work for tile T1D in viewports R1E-R4E and viewports R1F-R4F. FIG. 9I demonstrates a method 802 that may represent the rendering process. The method 802 may generally be implemented in logic such as, for example, the logic 606 (FIGS. 6A and 6B), already discussed. More particularly, the method 802 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

The rendering pipeline may proceed at blocks 804, 806 and 808 by processing primitives (e.g., geometry, polygons) with a series of trivial checks: near/far plane checks, and right eye coarse frustum checks. Once the trivial checks are performed the range of tiles may provide plane equations at block 810 for left (from R1E), right (from R1F), top (from R1E) and bottom (from R4E). These planes may have offsets and normals. Primitives may be tested at block 812 per vertex against these plane checks. If it is determined at block 814 that at least one vertex per polygon passes, the primitive may be binned at block 816. Otherwise, nothing is done at illustrated block 815. The method 802 may optionally sort the primitives at block 818 after they are all binned. The primitives may then be passed to each tile's rasterizer at block 820. Illustrated block 822 rasterizes, for each tile being rendered, all primitives and rejects primitives outside the tile.

Another optimization may be to cull work as early as possible by adding a bounding sphere check through the pipeline to determine which viewports might actually rasterize the object. The bounding sphere may be trivially checked using the same near/far checks, coarse frustum checks, and more detailed plane checks per range of tile. If the bounding sphere passes the check, then the entire mesh contained in the bounding sphere may be rendered.

FIGS. 9A-9I therefore demonstrate that enhanced tile binning technology may enable a balance to be made between culling overhead and possibly starving the rasterizer units. Moreover, the enhanced tile binning technology may be combined with the data formatting technology described with respect to FIGS. 6C-6F, the enhanced re-projection technology described with respect to FIGS. 7A-7E and/or the enhanced foveation technology described with respect to FIGS. 8A-8C to achieve additional synergistic improvements with regard to latency, performance, power consumption and/or battery life.

Image Warping

Figure 10A:
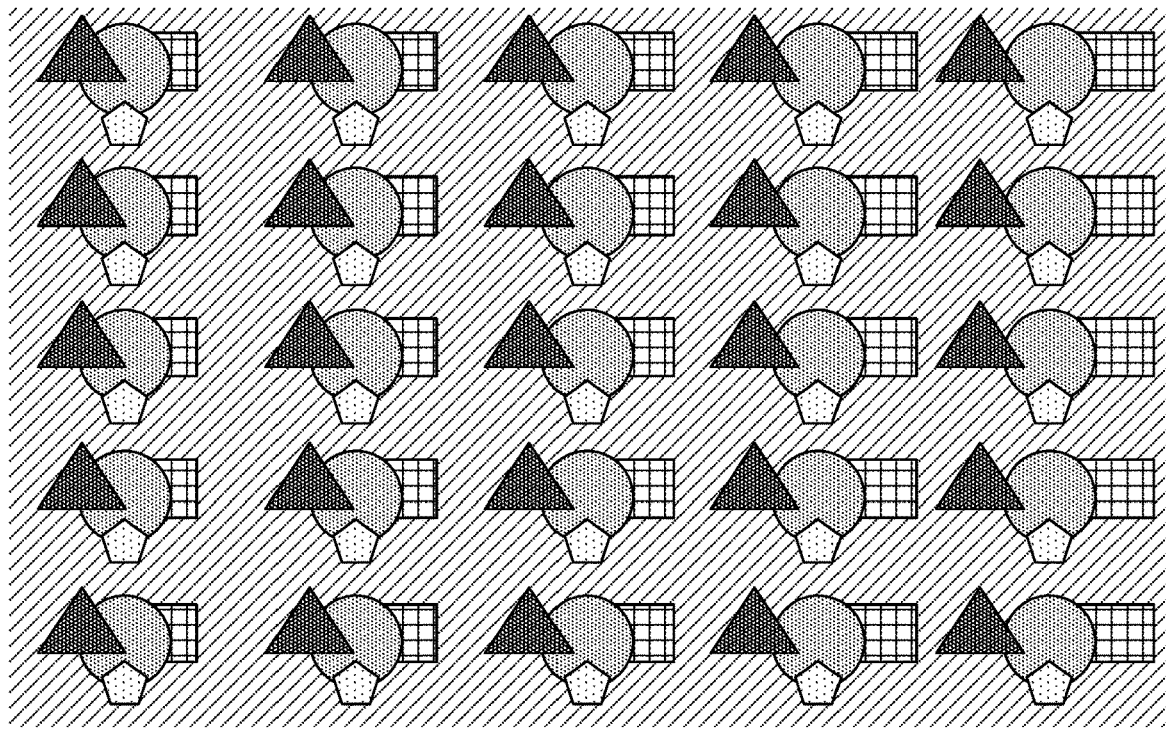
FIG. 10A is an illustration of an example of scene content that is warped across a plurality of display planes according to an embodiment.

FIG. 10A shows scene content 824 that may be warped across a plurality of display planes. In general, position changes between the scene content 824 on different display planes may be used to approximate image data across the display planes.

Figure 10B:
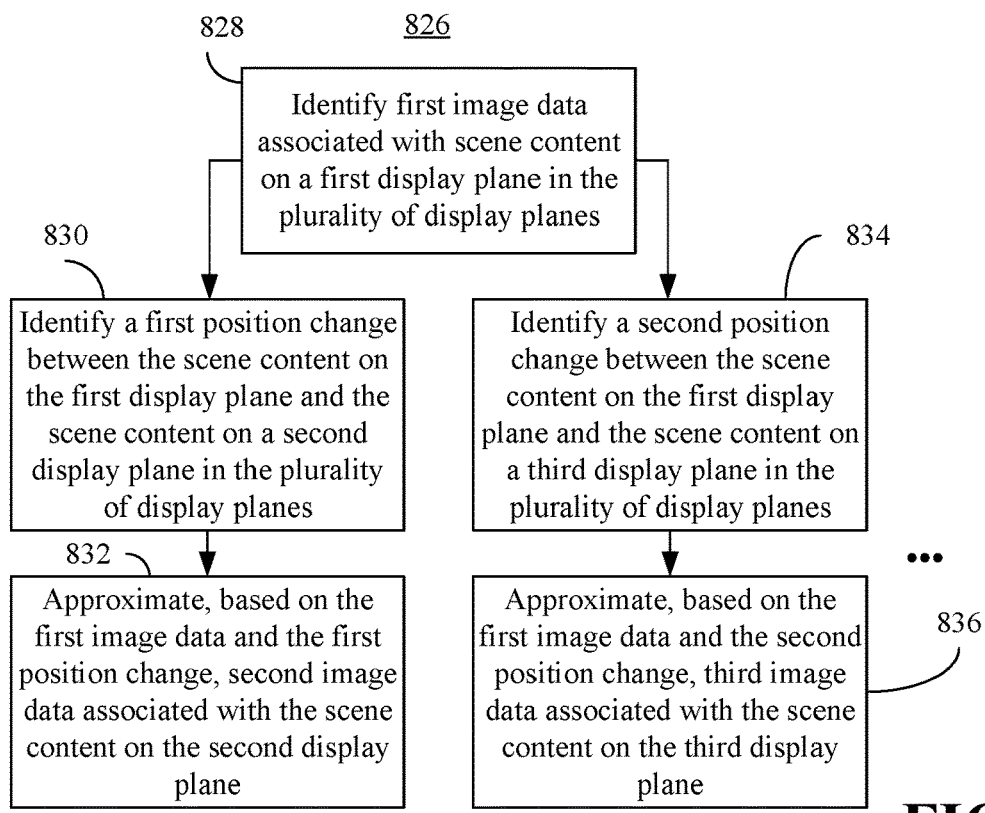
FIG. 10B is a flowchart of an example of a method of warping scene content across a plurality of display planes according to an embodiment.

With continuing reference to FIGS. 10A and 10B, a method 826 of warping the scene content 824 across a plurality of display planes is shown. The method 826 may generally be implemented in logic such as, for example, the logic 606 (FIGS. 6A and 6B), already discussed. More particularly, the method 826 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 828 provides for identifying first image data associated with the scene content 824 on a first display plane in the plurality of display planes. Block 830 may identify a first position change between the scene content 824 on the first display plane and the scene content 824 on a second display plane in the plurality of display planes. In one example, block 832 approximates, based on the first image data and the first position change, second image data associated with the scene content 824 on the second display plane. Additionally, block 834 may identify a second position change between the scene content 824 on the first display plane and the scene content 824 on a third display plane in the plurality of display planes. In such a case, illustrated block 836 approximates, based on the first image data and the second position change, third image data associated with the scene content 824 on the third display plane. Approximating the image data in the manner shown may significantly reduce processing overhead.

FIGS. 10A-10B therefore demonstrate that enhanced image warping technology may render the same object from different positions on the focal plane to mimic different focus points on the iris. Moreover, the enhanced image warping technology may be combined with the data formatting technology described with respect to FIGS. 6C-6F, the enhanced re-projection technology described with respect to FIGS. 7A-7E, the enhanced foveation technology described with respect to FIGS. 8A-8C and/or the enhanced tile binning technology described with respect to FIGS. 9A-9I to achieve additional synergistic improvements with regard to latency, performance, power consumption and/or battery life.

Display Technology

Figure 11:
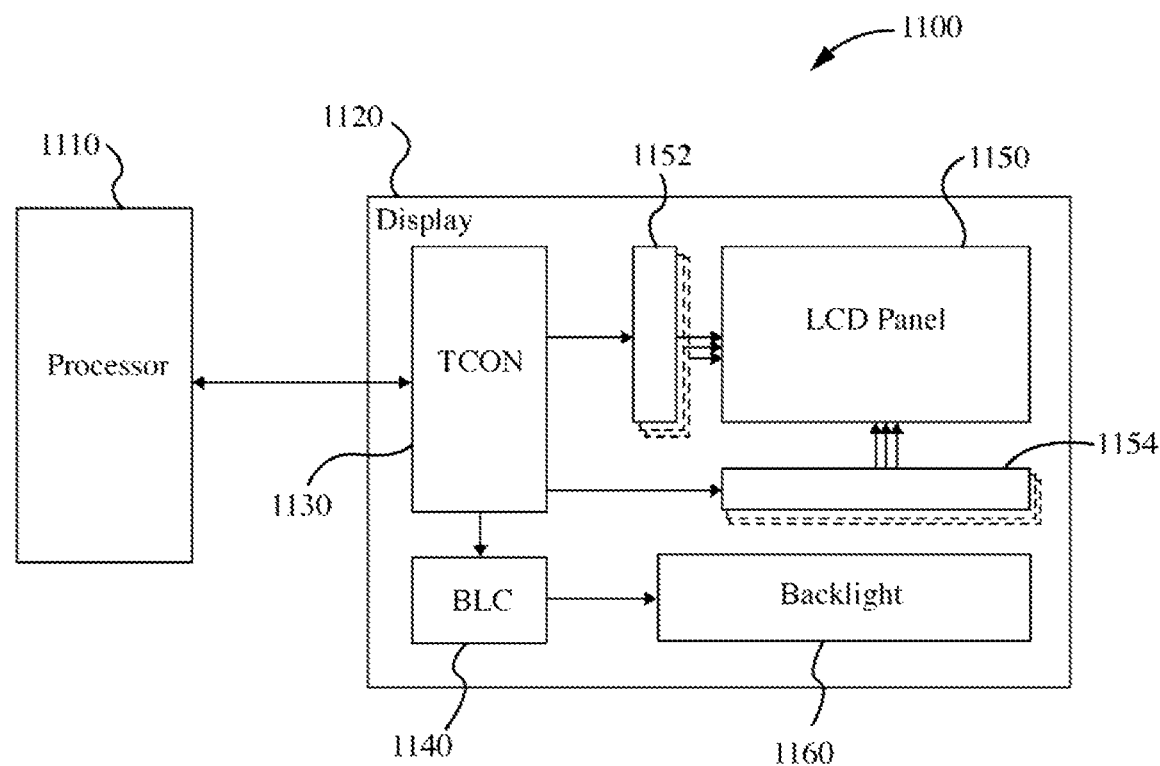
FIG. 11 is a block diagram of an example of a display with a localized backlight capability according to an embodiment.

Turning now to FIG. 11, a performance-enhanced computing system 1100 is shown. In the illustrated example, a processor 1110 is coupled to a display 1120. The processor 1110 may generally generate images to be displayed on an LCD panel 1150 of the display 1120. In one example, the processor 1110 includes a communication interface such as, for example, a video graphics array (VGA), a DisplayPort (DP) interface, an embedded DisplayPort (eDP) interface, a high-definition multimedia interface (HDMI), a digital visual interface (DVI), and so forth. The processor 1110 may be a graphics processor (e.g., graphics processing unit/GPU) that processes graphics data and generates the images (e.g., video frames, still images) displayed on the LCD panel 1150. Moreover, the processor 1110 may include one or more image processing pipelines that generate pixel data. The image processing pipelines may comply with the OPENGL architecture, or other suitable architecture. Additionally, the processor 1110 may be connected to a host processor (e.g., central processing unit/CPU), wherein the host processor executes one or more device drivers that control and/or interact with the processor 1110.

The illustrated display 1120 includes a timing controller (TCON) 1130, which may individually address different pixels in the LCD panel 1150 and update each individual pixel in the LCD panel 1150 per refresh cycle. In this regard, the LCD panel 1150 may include a plurality of liquid crystal elements such as, for example, a liquid crystal and integrated color filter. Each pixel of the LCD panel 1150 may include a trio of liquid crystal elements with red, green, and blue color filters, respectively. The LCD panel 1150 may arrange the pixels in a two-dimensional (2D) array that is controlled via row drivers 1152 and column drivers 1154 to update the image being displayed by the LCD panel 1150. Thus, the TCON 1130 may drive the row drivers 1152 and the column drivers 1154 to address specific pixels of the LCD panel 1150. The TCON 1130 may also adjust the voltage provided to the liquid crystal elements in the pixel to change the intensity of the light passing through each of the three liquid crystal elements and, therefore, change the color of the pixel displayed on the surface of the LCD panel 1150.

A backlight 1160 may include a plurality of light emitting elements such as, for example, light emitting diodes (LEDs), that are arranged at an edge of the LCD panel 1150. Accordingly, the light generated by the LEDs may be dispersed through the LCD panel 1150 by a diffuser (not shown). In another example, the LEDs are arranged in a 2D array directly behind the LCD panel 1150 in a configuration sometimes referred to as direct backlighting because each LED disperses light through one or more corresponding pixels of the LCD panel 1150 positioned in front of the LED. The light emitting elements may also include compact florescent lamps (CFL's) arranged along one or more edges of the LCD panel 1150. To eliminate multiple edges, the combination of edges may be altered to achieve selective illumination of a region, wherein less than the total set of lighting elements is used with less power.

The light emitting elements may also include one or more sheets of electroluminescent material placed behind the LCD panel 1150. In such a case, light from the surface of the sheet may be dispersed through the pixels of the LCD panel 1150. Additionally, the sheet may be divided into a plurality of regions such as, for example, quadrants. In one example, each region is individually controlled to illuminate only a portion of the LCD panel 1150. Other backlighting solutions may also be used.

The illustrated display 1120 also includes a backlight controller (BLC) 1140 that provides a voltage to the light emitting elements of the backlight 1160. For example, the BLC 1140 may include a pulse width modulation (PWM) driver (not shown) to generate a PWM signal that activates at least a portion of the light emitting elements of the backlight 1160. The duty cycle and frequency of the PWM signal may cause the light generated by the light emitting elements to dim. For example, a 100% duty cycle may correspond to the light emitting elements being fully on and a 0% duty cycle may correspond to the light emitting elements being fully off. Thus, intermediate duty cycles (e.g., 25%, 50%) typically cause the light emitting elements to be turned on for a portion of a cycle period that is proportional to the percentage of the duty cycle. The cycle period of may be fast enough that the blinking of the light emitting elements is not noticeable to the human eye. Moreover, the effect to the user may be that the level of the light emitted by the backlight 1160 is lower than if the backlight 1160 were fully activated. The BLC 1140 may be separate from or incorporated into the TCON 1130.

Alternatively, an emissive display system may be used where the LCD panel 1150 would be replaced by an emissive display panel (e.g. organic light emitting diode/OLED) the backlight 1160 would be omitted, and the row and column drivers 1152 and 1154, respectively, may be used to directly modulate pixel color and brightness.

Distance Based Display Resolution

Figure 12A:
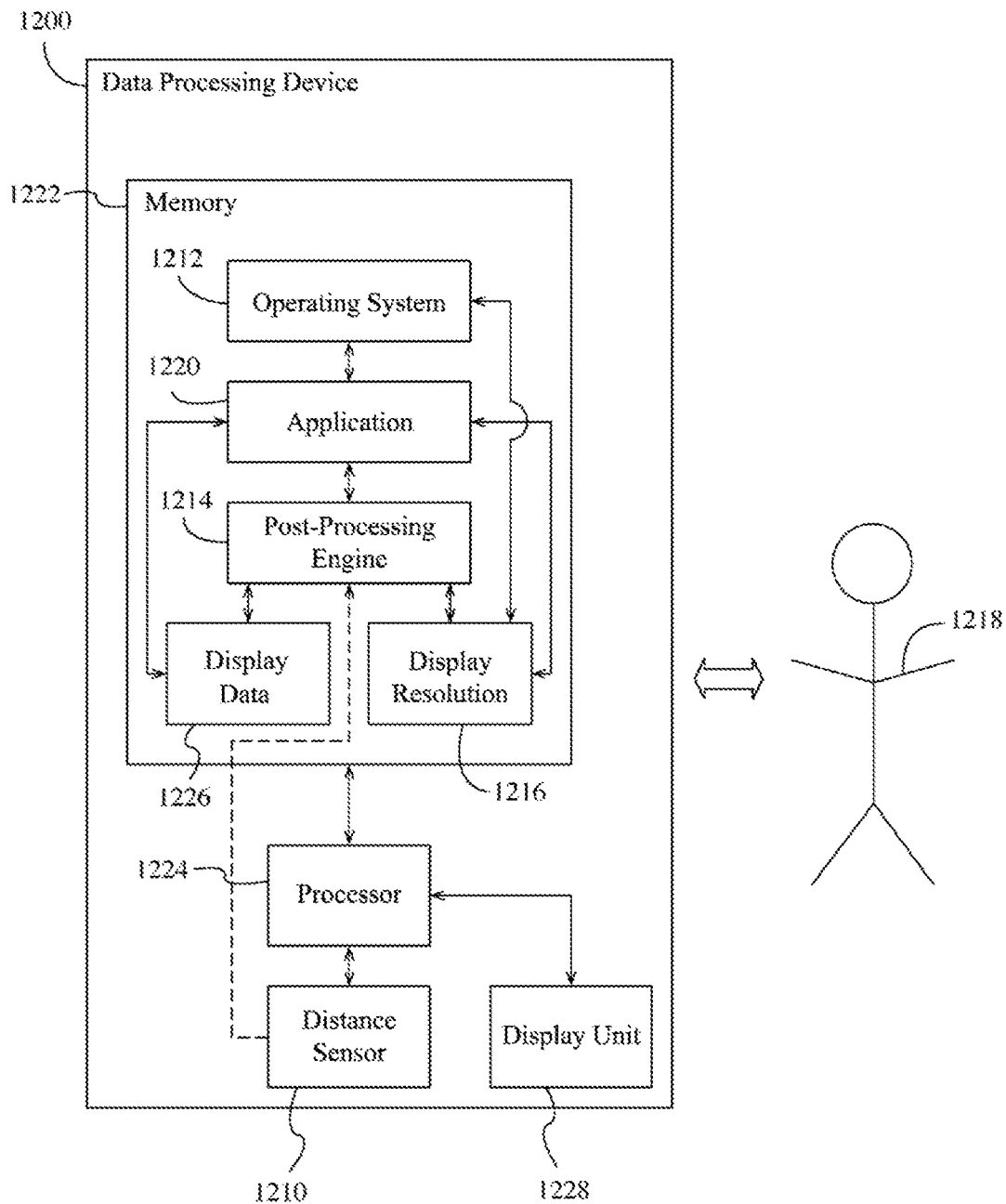
FIG. 12A is a block diagram of an example of a data processing device according to an embodiment.

FIG. 12A shows a scenario in which a user 1218 interacts with a data processing device 1200 containing a display unit 1228. The display processing device 1200 may include, for example, a notebook computer, a desktop computer, a tablet computer, a convertible tablet, a mobile Internet device (MID), a personal digital assistant (PDA), a wearable device (e.g., head mounted display/HMD), a media player, etc., or any combination thereof. The illustrated data processing device 1200 includes a processor 1224 (e.g., embedded controller, microcontroller, host processor, graphics processor) coupled to a memory 1222, which may include storage locations that are addressable through the processor 1224. As will be discussed in greater detail, a distance sensor 1210 may enable distance based display resolution with respect to the display units 1228.

The illustrated memory 1222 includes display data 1226 that is to be rendered on the display unit 1228. In one example, the processor 1224 conducts data conversion on the display data 1226 prior to presenting the display data 1226 on the display unit 1228. A post-processing engine 1214 may execute on the processor 1224 to receive the display data 1226 and an output of the distance sensor 1210. The post-processing engine 1214 may modify the display data 1226 to enhance the readability of screen content on the display unit 1228, reduce power consumption in the data processing device 1200, etc., or any combination thereof.

The illustrated memory 1222 stores a display resolution setting 1216, in addition to an operating system 1212 and an application 1220. The display resolution setting 1216 may specify a number of pixels of the display data 1226 to be presented on the display unit 1228 along a length dimension and a width dimension. If the display data 1226 as generated by the application 1220 is incompatible with the format of the display unit 1228, the processor 1224 may configure the scale of the display data 1226 to match the format of the display units 1228. In this regard, the display resolution setting 1216 may be associated with and/or incorporated into configuration data that defines other settings for the display unit 1228. Moreover, the display resolution setting 1216 may be defined in terms of unit distance or area (e.g., pixels per inch/PPI), or other suitable parameter.

The application 1220 may generate a user interface, wherein the user 1218 may interact with the user interface to select the display resolution setting 1216 from one or more options provided through the user interface, enter the display resolution setting 1216 as a requested value, and so forth. Thus, the display data 1226 may be resized to fit into the display resolution setting 1216 prior to being rendered on the display unit 1228.

The distance sensor 1210 may track the distance between the user 1218 and the display unit 1228, wherein distance sensing may be triggered through a physical button associated with the data processing device 1200/display unit 1228, through the user interface provided by the application 1220 and/or loading of the operating system 1220, and so forth. For example, during a boot of the data processing device 1200 the operating system 1212 may conduct an automatic process to trigger the distance sensing in the background or foreground. Distance sensing may be conducted periodically or continuously.

Figure 12B:
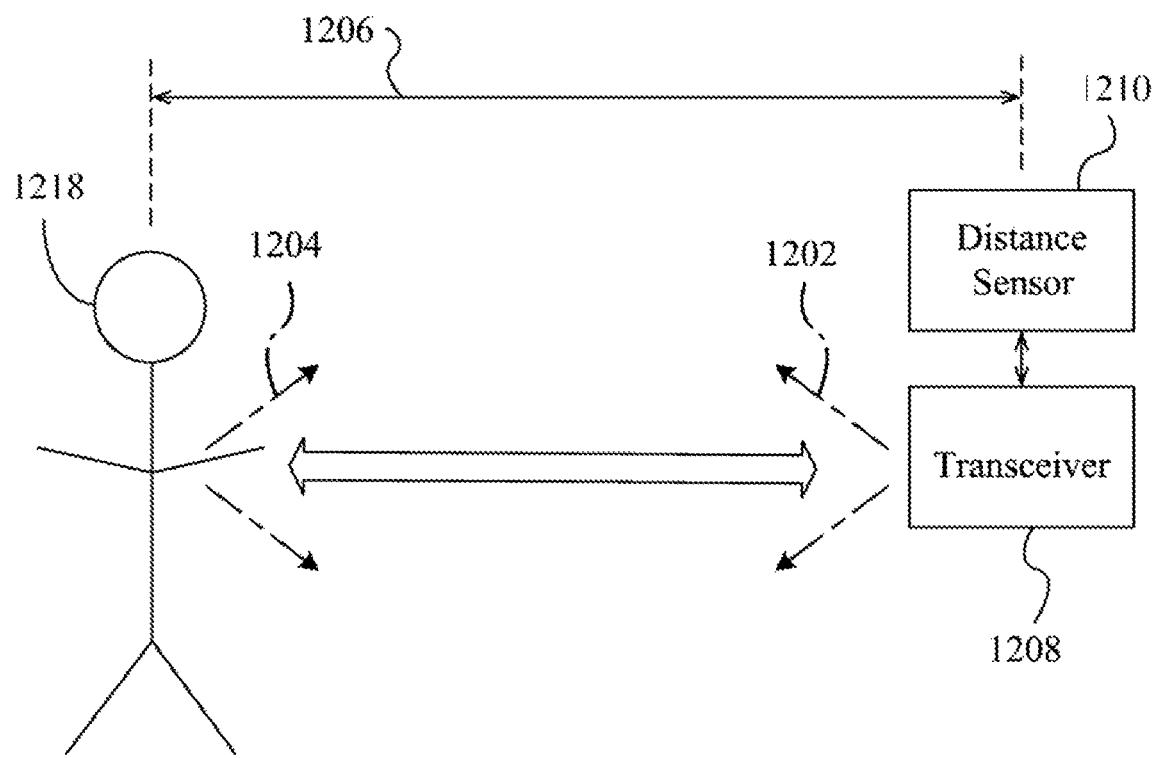
FIG. 12B is an illustration of an example of a distance determination according to an embodiment.

FIG. 12B shows one example of a distance sensing scenario. In the illustrated example, the distance sensor 1210 uses a transceiver 1208 to emit an electromagnetic beam 1202 in the direction of the user 1218. Thus, the transceiver 1202 might be positioned on a front facing surface of the data processing device 1200 (FIG. 12A). The electromagnetic beam 1202 may impact the user 1218 and be reflected/scattered from the user 1218 as a return electromagnetic beam 1204. The return electromagnetic beam 1204 may be analyzed by, for example, the processor 1224 (FIG. 12A) and/or the post-processing engine 1214 (FIG. 12A) to determine the distance 1206 between the user 1218 and the display unit 1228 (FIG. 12A). The distance 1206 may be used to adjust the display resolution setting 1216.

Display Layers

Figure 13:
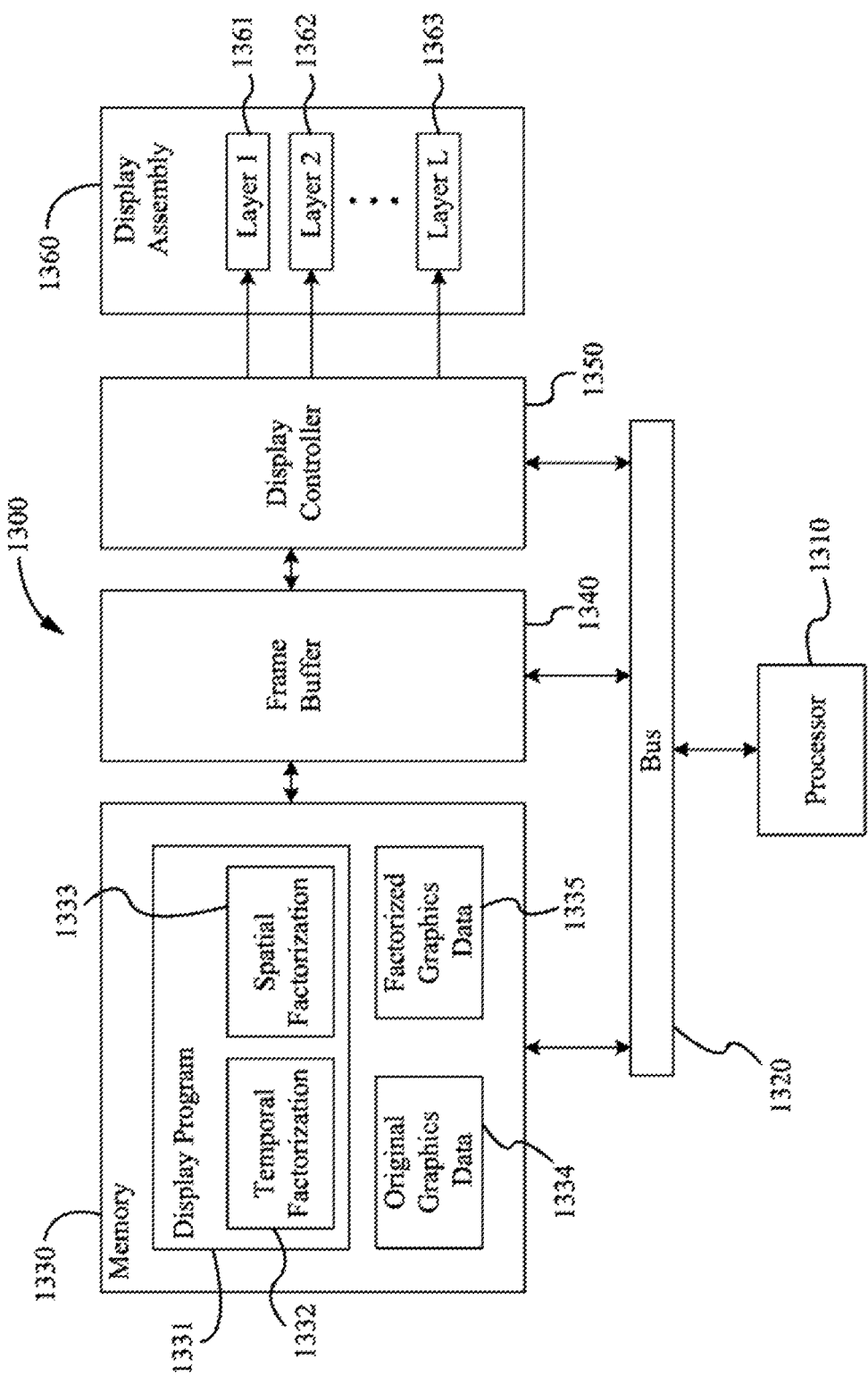
FIG. 13 is a block diagram of an example of a layered display architecture according to an embodiment.

Turning now to FIG. 13, a display system 1300 is shown in which cascaded display layers 1361, 1362 and 1363 are used to achieve spatial/temporal super-resolution in a display assembly 1360. In the illustrated example, a processor 1310 provides original graphics data 1334 (e.g., video frames, still images), to the system 1300 via a bus 1320. A cascaded display program 1331 may be stored in a memory 1330, wherein the cascaded display program 1331 may be part of a display driver associated with the display assembly 1360. The illustrated memory 1330 also includes the original graphics data 1334 and factorized graphics data 1335. In one example, the cascaded display program 1331 includes a temporal factorization component 1332 and a spatial factorization component 1333. The temporal factorization component 1332 may perform temporal factorization computation and the spatial factorization component may perform spatial factorization computation. The cascaded display program 1331 may derive the factorized graphics data 1335 for presentation on each display layer 1361, 1362 and 1363 based on user configurations and the original graphics data 1334.

The display assembly 1360 may be implemented as an LCD (liquid crystal display) used in, for example, a head mounted display (HMD) application. More particularly, the display assembly 1360 may include a stack of LCD panels interface boards a lens attachment, and so forth. Each panel may be operated at a native resolution of, for example, 1280×800 pixels and with a 60 Hz refresh rate. Other native resolutions, refresh rates, display panel technology and/or layer configurations may be used.

Multiple Display Units

Figure 14:
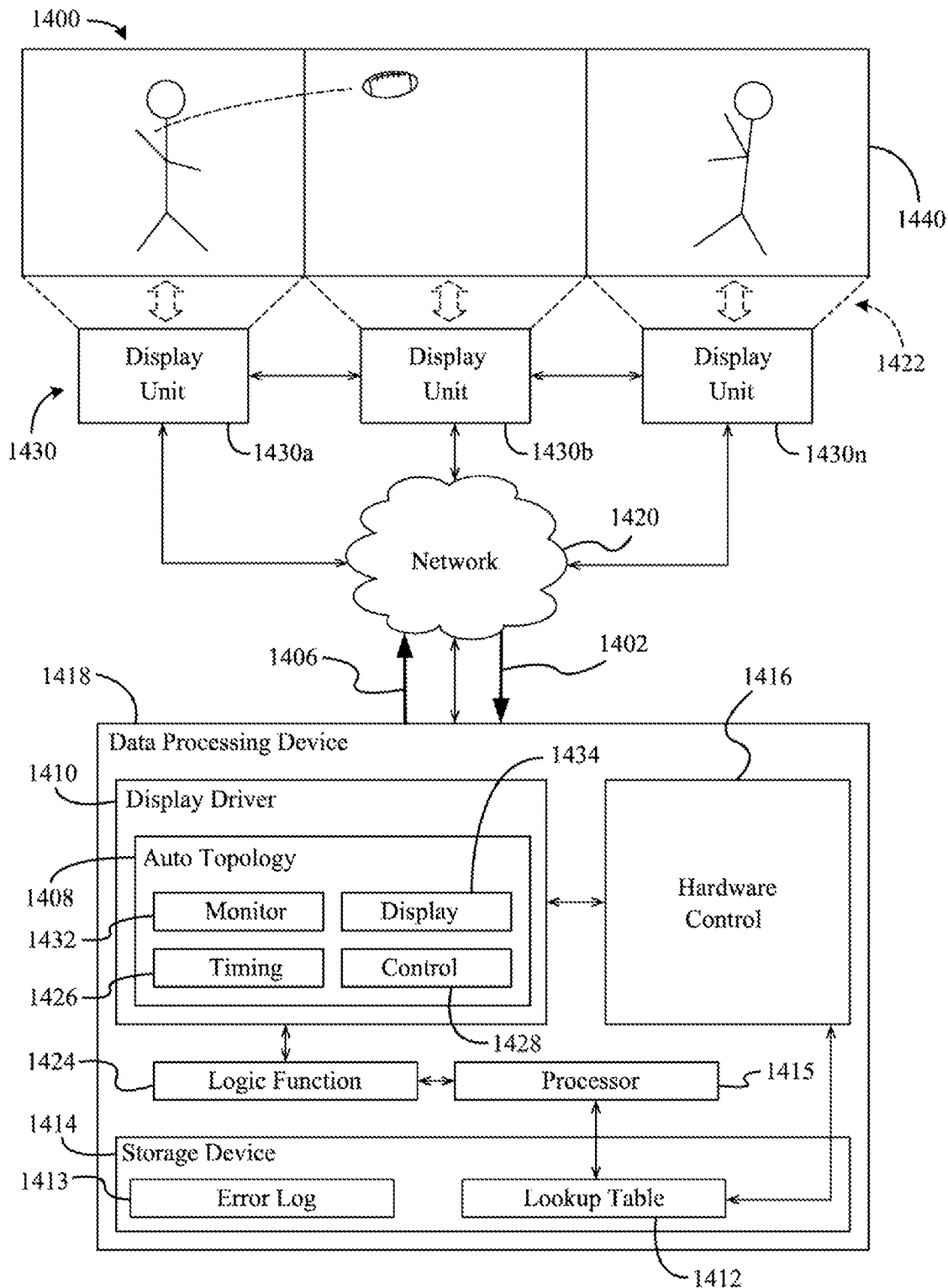
FIG. 14 is a block diagram of an example of a display architecture that includes multiple display units according to an embodiment.

FIG. 14 shows a graphics display system 1400 that includes a set of display units 1430 (1430*a*-1430*n*) that may generally be used to output a widescreen (e.g., panoramic) presentation 1440 that includes coordinated content in a cohesive and structured topological form. In the illustrated example, a data processing device 1418 includes a processor 1415 that applies a logic function 1424 to hardware profile data 1402 received from the set of display units 1430 over a network 1420. The application of the logic function 1424 to the hardware profile data 1402 may create a set of automatic topology settings 1406 when a match of the hardware profile data with a set of settings in a hardware profile lookup table 1412 is not found. The illustrated set of automatic topology settings 1406 are transmitted from the display processing device 1418 to the display units 1430 over the network 1420.

The processor 1415 may perform and execute the logic function 1424 upon receipt of the logic function 1424 from a display driver 1410. In this regard, the display driver 1410 may include an auto topology module 1408 that automatically configures and structures the topologies of the display units 1432 to create the presentation 1440. In one example, the display driver 1410 is a set of instructions, which when executed by the processor 1415, cause the data processing device 1418 to communicate with the display units 1430, video cards, etc., and conduct automatic topology generation operations.

The data processing device 1418 may include, for example, a server, desktop, notebook computer, tablet computer, convertible tablet, MID, PDA, wearable device, media player, and so forth. Thus, the display processing device 1418 may include a hardware control module 1416, a storage device 1414, random access memory (RAM, not shown), controller cards including one or more video controller cards, and so forth. In one example, the display units 1430 are flat-panel displays (e.g., liquid crystal, active matrix, plasma, etc.), HMD's, video projection devices, and so forth, that coordinate with one another to produce the presentation 1440. Moreover, the presentation 1440 may be generated based on a media file stored in the storage device 1414, wherein the media file might include, for example, a film, video clip, animation, advertisement, etc., or any combination thereof.

The term "topology" may be considered the number, scaling, shape and/or other configuration parameter of a first display unit 1430*a*, a second display unit 1430*b*, a third display unit 1430*n*, and so forth. Accordingly, the topology of the display units 1430 may enable the presentation 1440 be visually presented in concert such that the individual sections of the presentation 1440 are proportional and compatible with the original dimensions and scope of the media being played through the display units 1430. Thus, the topology may constitute spatial relations and/or geometric properties that are not impacted by the continuous change of shape or size of the content rendered in the presentation 1440. In one example, the auto topology module 1408 includes a timing module 1426, a control module 1428, a signal monitor module 1432 and a signal display module 1434. The timing module 1426 may designate a particular display unit in the set of display units 1430 as a sample display unit. In such a case, the timing module 1426 may designate the remaining display units 1430 as additional display units. In one example, the timing module 1426 automatically sets a shaping factor to be compatible with the hardware profile data 1402, wherein the presentation 1440 is automatically initiated by a sequence of graphics signals 1422.

In one example, the control module 1428 modifies the set of automatic topology settings 1406. Additionally, the signal monitor module 1432 may automatically monitor the sequence of graphics signals 1422 and trigger the storage device 1414 to associate the set of automatic topology settings 1406 with the hardware profile lookup table 1412. Moreover, the signal monitor module 1432 may automatically detect changes in the set of display units 1430 according to a set of change criteria and automatically generate a new topology profile corresponding to the change in the set of display units 1430. Thus, the new topology profile may be applied to the set of display units 1430. The signal monitor module 1432 may also trigger the signal display module 1434 to reapply the set of automatic apology settings 1406 if the sequence of graphics signals 1422 fails to meet a set of criteria. If the hardware profile data 1402 does not support automatic topology display of the sequence of graphics signals 1422, the data processing device 1418 may report an error and record the error in an error log 1413.

Cloud-Assisted Media Delivery

Figure 15:
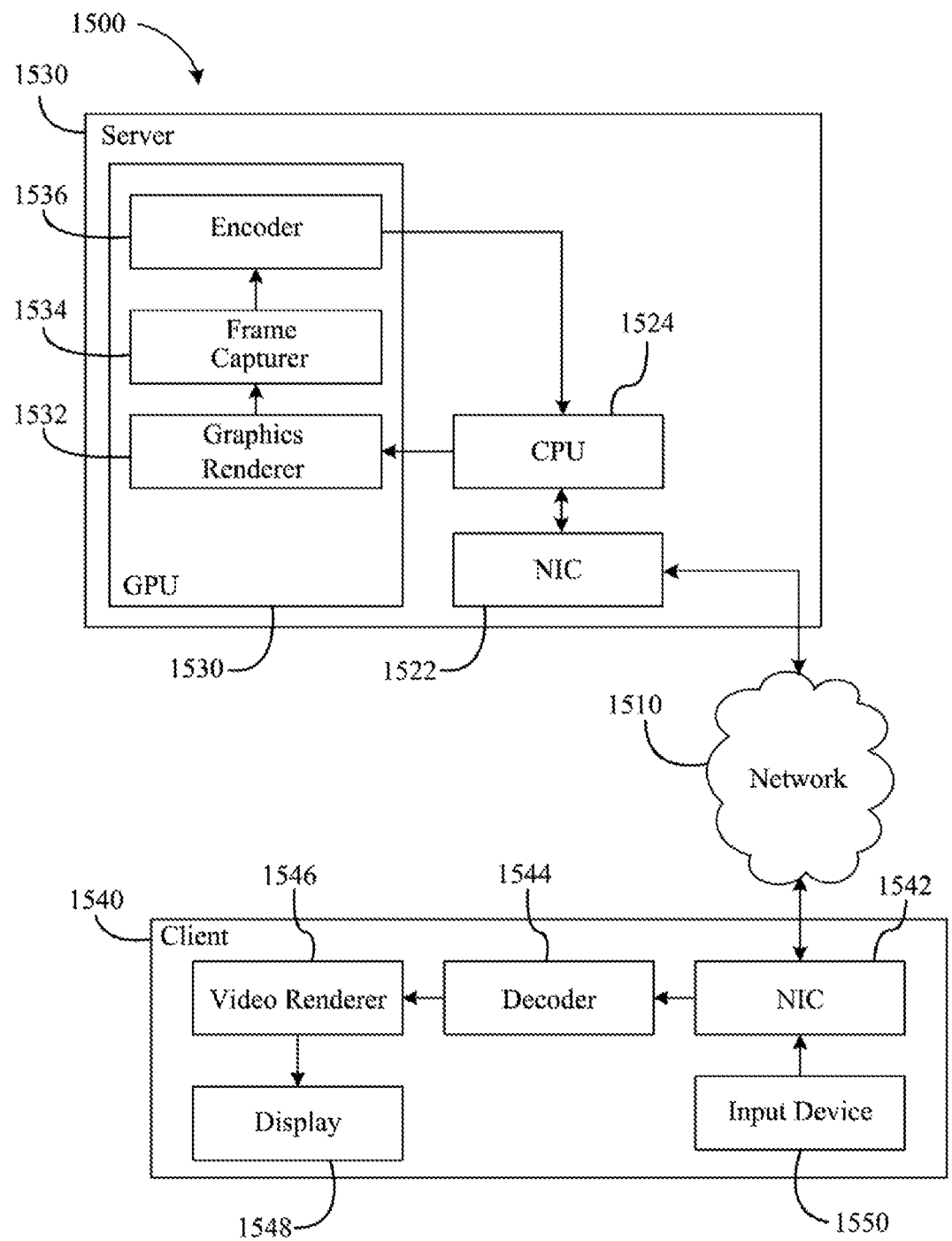
FIG. 15 is a block diagram of an example of a cloud-assisted media delivery architecture according to an embodiment.

Turning now to FIG. 15, a cloud gaming system 1500 includes a client 1540 that is coupled to a server 1520 through a network 1510. The client 1540 may generally be a consumer of graphics (e.g., gaming, virtual reality/VR, augmented reality/AR) content that is housed, processed and rendered on the server 1520. The illustrated server 1520, which may be scalable, has the capacity to provide the graphics content to multiple clients simultaneously (e.g., by leveraging parallel and apportioned processing and rendering resources). In one example, the scalability of the server 1520 is limited by the capacity of the network 1510. Accordingly, there may be some threshold number of clients above which the service to all clients made degrade.

In one example, the server 1520 includes a graphics processor (e.g., GPU) 1530, a host processor (e.g., CPU) 1524 and a network interface card (NIC) 1522. The NIC 1522 may receive a request from the client 1540 for graphics content. The request from the client 1540 may cause the graphics content to be retrieved from memory via an application executing on the host processor 1524. The host processor 1524 may carry out high level operations such as, for example, determining position, collision and motion of objects in a given scene. Based on the high level operations, the host processor 1524 may generate rendering commands that are combined with the scene data and executed by the graphics processor 1530. The rendering commands may cause the graphics processor 1530 to define scene geometry, shading, lighting, motion, texturing, camera parameters, etc., for scenes to be presented via the client 1540.

More particularly, the illustrated graphics processor 1530 includes a graphics renderer 1532 that executes rendering procedures according to the rendering commands generated by the host processor 1524. The output of the graphics renderer 1532 may be a stream of raw video frames that are provided to a frame capturer 1534. The illustrated frame capturer 1534 is coupled to an encoder 1536, which may compress/format the raw video stream for transmission over the network 1510. The encoder 1536 may use a wide variety of video compression algorithms such as, for example, the H.264 standard from the International Telecommunication Union Telecommunication Standardization Sector (ITUT), the MPEG4 Advanced Video Coding (AVC) Standard from the International Organization for the Standardization/International Electrotechnical Commission (ISO/IEC), and so forth.

The illustrated client 1540, which may be a desktop computer, notebook computer, tablet computer, convertible tablet, wearable device, MID, PDA, media player, etc., includes an NIC 1542 to receive the transmitted video stream from the server 1520. The NIC 1522, may include the physical layer and the basis for the software layer of the network interface in the client 1540 in order to facilitate communications over the network 1510. The client 1540 may also include a decoder 1544 that employs the same formatting/compression scheme of the encoder 1536. Thus, the decompressed video stream may be provided from the decoder 1544 to a video renderer 1546. The illustrated video renderer 1546 is coupled to a display 1548 that visually presents the graphics content.

As already noted, the graphics content may include gaming content. In this regard, the client 1540 may conduct real-time interactive streaming that involves the collection of user input from an input device 1550 and delivery of the user input to the server 1520 via the network 1510. This real-time interactive component of cloud gaming may pose challenges with regard to latency.

Additional System Overview Example

Figure 16:
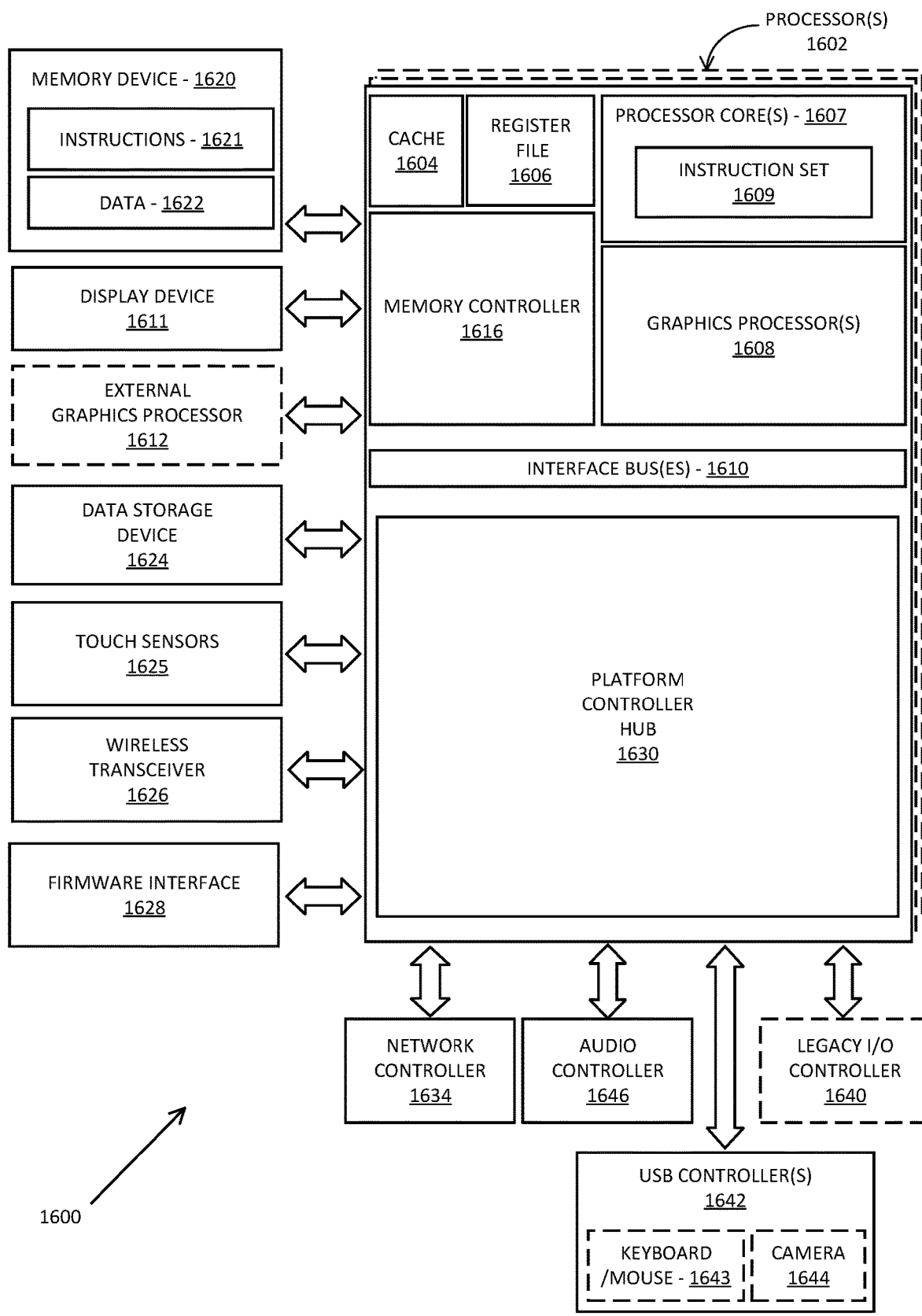
FIGS. 16-18 are block diagrams of an example of an overview of a data processing system according to an embodiment.

FIG. 16 is a block diagram of a processing system 1600, according to an embodiment. In various embodiments the system 1600 includes one or more processors 1602 and one or more graphics processors 1608, and may be a single processor desktop system, a multiprocessor workstation system, or a server system having a large number of processors 1602 or processor cores 1607. In one embodiment, the system 1600 is a processing platform incorporated within a system-on-a-chip (SoC) integrated circuit for use in mobile, handheld, or embedded devices.

In one embodiment the system 1600 can include, or be incorporated within a server-based gaming platform, a game console, including a game and media console, a mobile gaming console, a handheld game console, or an online game console. In some embodiments the system 1600 is a mobile phone, smart phone, tablet computing device or mobile Internet device. The processing system 1600 can also include, couple with, or be integrated within a wearable device, such as a smart watch wearable device, smart eyewear device, augmented reality device, or virtual reality device. In some embodiments, the processing system 1600 is a television or set top box device having one or more processors 1602 and a graphical interface generated by one or more graphics processors 1608.

In some embodiments, the one or more processors 1602 each include one or more processor cores 1607 to process instructions which, when executed, perform operations for system and user software. In some embodiments, each of the one or more processor cores 1607 is configured to process a specific instruction set 1609. In some embodiments, instruction set 1609 may facilitate Complex Instruction Set Computing (CISC), Reduced Instruction Set Computing (RISC), or computing via a Very Long Instruction Word (VLIW). Multiple processor cores 1607 may each process a different instruction set 1609, which may include instructions to facilitate the emulation of other instruction sets. Processor core 1607 may also include other processing devices, such a Digital Signal Processor (DSP).

In some embodiments, the processor 1602 includes cache memory 1604. Depending on the architecture, the processor 1602 can have a single internal cache or multiple levels of internal cache. In some embodiments, the cache memory is shared among various components of the processor 1602. In some embodiments, the processor 1602 also uses an external cache (e.g., a Level-3 (L3) cache or Last Level Cache (LLC)) (not shown), which may be shared among processor cores 1607 using known cache coherency techniques. A register file 1606 is additionally included in processor 1602 which may include different types of registers for storing different types of data (e.g., integer registers, floating point registers, status registers, and an instruction pointer register). Some registers may be general-purpose registers, while other registers may be specific to the design of the processor 1602.

In some embodiments, one or more processor(s) 1602 are coupled with one or more interface bus(es) 1610 to transmit communication signals such as address, data, or control signals between processor 1602 and other components in the system 1600. The interface bus 1610, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 1602 include an integrated memory controller 1616 and a platform controller hub 1630. The memory controller 1616 facilitates communication between a memory device and other components of the system 1600, while the platform controller hub (PCH) 1630 provides connections to I/O devices via a local I/O bus.

The memory device 1620 can be a dynamic random access memory (DRAM) device, a static random access memory (SRAM) device, flash memory device, phase-change memory device, or some other memory device having suitable performance to serve as process memory. In one embodiment the memory device 1620 can operate as system memory for the system 1600, to store data 1622 and instructions 1621 for use when the one or more processors 1602 executes an application or process. Memory controller 1616 also couples with an optional external graphics processor 1612, which may communicate with the one or more graphics processors 1608 in processors 1602 to perform graphics and media operations. In some embodiments a display device 1611 can connect to the processor(s) 1602. The display device 1611 can be one or more of an internal display device, as in a mobile electronic device or a laptop device or an external display device attached via a display interface (e.g., DisplayPort, etc.). In one embodiment the display device 1611 can be a head mounted display (HMD) such as a stereoscopic display device for use in virtual reality (VR) applications or augmented reality (AR) applications.

In some embodiments the platform controller hub 1630 enables peripherals to connect to memory device 1620 and processor 1602 via a high-speed I/O bus. The I/O peripherals include, but are not limited to, an audio controller 1646, a network controller 1634, a firmware interface 1628, a wireless transceiver 1626, touch sensors 1625, a data storage device 1624 (e.g., hard disk drive, flash memory, etc.). The data storage device 1624 can connect via a storage interface (e.g., SATA) or via a peripheral bus, such as a Peripheral Component Interconnect bus (e.g., PCI, PCI Express). The touch sensors 1625 can include touch screen sensors, pressure sensors, or fingerprint sensors. The wireless transceiver 1626 can be a Wi-Fi transceiver, a Bluetooth transceiver, or a mobile network transceiver such as a 3G, 4G, or Long Term Evolution (LTE) transceiver. The firmware interface 1628 enables communication with system firmware, and can be, for example, a unified extensible firmware interface (UEFI). The network controller 1634 can enable a network connection to a wired network. In some embodiments, a high-performance network controller (not shown) couples with the interface bus 1610. The audio controller 1646, in one embodiment, is a multi-channel high definition audio controller. In one embodiment the system 1600 incudes an optional legacy I/O controller 1640 for coupling legacy (e.g., Personal System 2 (PS/2)) devices to the system. The platform controller hub 1630 can also connect to one or more Universal Serial Bus (USB) controllers 1642 connect input devices, such as keyboard and mouse 1643 combinations, a camera 1644, or other USB input devices.

It will be appreciated that the system 1600 shown is exemplary and not limiting, as other types of data processing systems that are differently configured may also be used. For example, an instance of the memory controller 1616 and platform controller hub 1630 may be integrated into a discreet external graphics processor, such as the external graphics processor 1612. In one embodiment the platform controller hub 1630 and/or memory controller 1660 may be external to the one or more processor(s) 1602. For example, the system 1600 can include an external memory controller 1616 and platform controller hub 1630, which may be configured as a memory controller hub and peripheral controller hub within a system chipset that is in communication with the processor(s) 1602.

Figure 17:
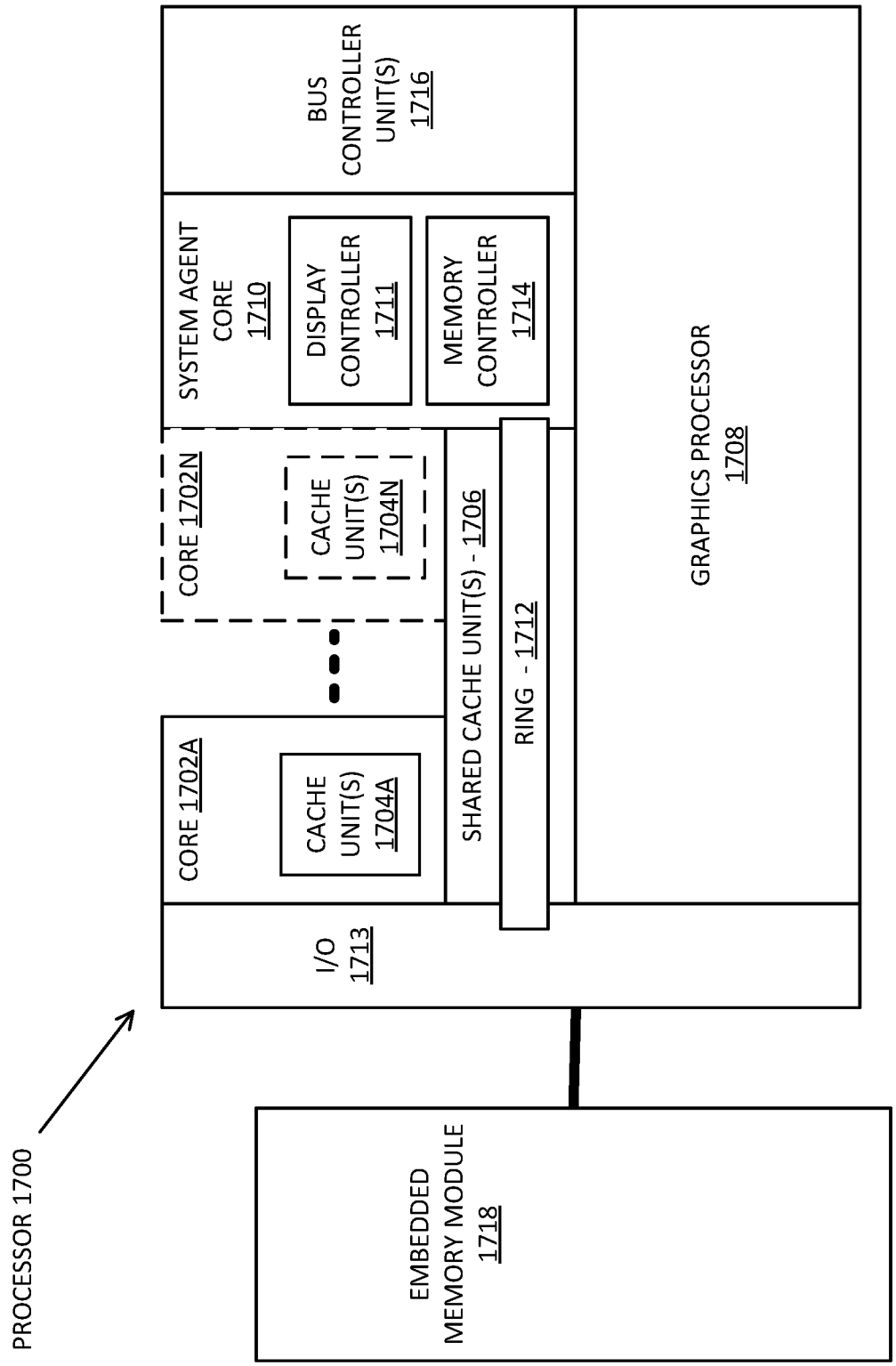

FIG. 17 is a block diagram of an embodiment of a processor 1700 having one or more processor cores 1702A-1702N, an integrated memory controller 1714, and an integrated graphics processor 1708. Those elements of FIG. 17 having the same reference numbers (or names) as the elements of any other figure herein can operate or function in any manner similar to that described elsewhere herein, but are not limited to such. Processor 1700 can include additional cores up to and including additional core 1702N represented by the dashed lined boxes. Each of processor cores 1702A-1702N includes one or more internal cache units 1704A-1704N. In some embodiments each processor core also has access to one or more shared cached units 1706.

The internal cache units 1704A-1704N and shared cache units 1706 represent a cache memory hierarchy within the processor 1700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1706 and 1704A-1704N.

In some embodiments, processor 1700 may also include a set of one or more bus controller units 1716 and a system agent core 1710. The one or more bus controller units 1716 manage a set of peripheral buses, such as one or more PCI or PCI express busses. System agent core 1710 provides management functionality for the various processor components. In some embodiments, system agent core 1710 includes one or more integrated memory controllers 1714 to manage access to various external memory devices (not shown).

In some embodiments, one or more of the processor cores 1702A-1702N include support for simultaneous multithreading. In such embodiment, the system agent core 1710 includes components for coordinating and operating cores 1702A-1702N during multi-threaded processing. System agent core 1710 may additionally include a power control unit (PCU), which includes logic and components to regulate the power state of processor cores 1702A-1702N and graphics processor 1708.

In some embodiments, processor 1700 additionally includes graphics processor 1708 to execute graphics processing operations. In some embodiments, the graphics processor 1708 couples with the set of shared cache units 1706, and the system agent core 1710, including the one or more integrated memory controllers 1714. In some embodiments, the system agent core 1710 also includes a display controller 1711 to drive graphics processor output to one or more coupled displays. In some embodiments, display controller 1711 may also be a separate module coupled with the graphics processor via at least one interconnect, or may be integrated within the graphics processor 1708.

In some embodiments, a ring based interconnect unit 1712 is used to couple the internal components of the processor 1700. However, an alternative interconnect unit may be used, such as a point-to-point interconnect, a switched interconnect, or other techniques, including techniques well known in the art. In some embodiments, graphics processor 1708 couples with the ring interconnect 1712 via an I/O link 1713.

The exemplary I/O link 1713 represents at least one of multiple varieties of I/O interconnects, including an on package I/O interconnect which facilitates communication between various processor components and a high-performance embedded memory module 1718, such as an eDRAM module. In some embodiments, each of the processor cores 1702A-1702N and graphics processor 1708 use embedded memory modules 1718 as a shared Last Level Cache.

In some embodiments, processor cores 1702A-1702N are homogenous cores executing the same instruction set architecture. In another embodiment, processor cores 1702A-1702N are heterogeneous in terms of instruction set architecture (ISA), where one or more of processor cores 1702A-1702N execute a first instruction set, while at least one of the other cores executes a subset of the first instruction set or a different instruction set. In one embodiment processor cores 1702A-1702N are heterogeneous in terms of microarchitecture, where one or more cores having a relatively higher power consumption couple with one or more power cores having a lower power consumption. Additionally, processor 1700 can be implemented on one or more chips or as an SoC integrated circuit having the illustrated components, in addition to other components.

Figure 18:
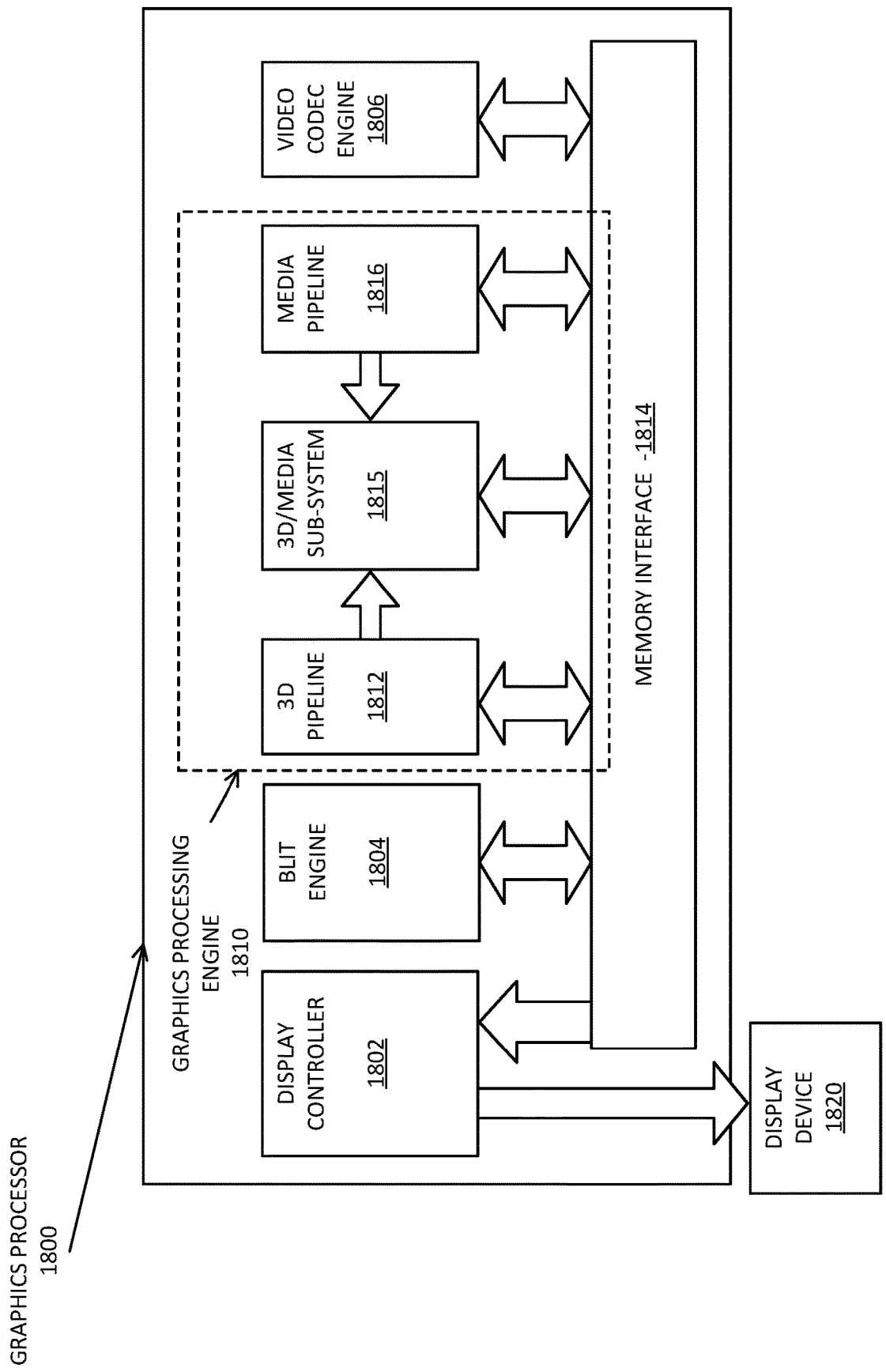

FIG. 18 is a block diagram of a graphics processor 1800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1800 includes a memory interface 1814 to access memory. Memory interface 1814 can be an interface to local memory, one or more internal caches, one or more shared external caches, and/or to system memory.

In some embodiments, graphics processor 1800 also includes a display controller 1802 to drive display output data to a display device 1820. Display controller 1802 includes hardware for one or more overlay planes for the display and composition of multiple layers of video or user interface elements. The display device 1820 can be an internal or external display device. In one embodiment the display device 1820 is a head mounted display device, such as a virtual reality (VR) display device or an augmented reality (AR) display device. In some embodiments, graphics processor 1800 includes a video codec engine 1806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1800 includes a block image transfer (BLIT) engine 1804 to perform two-dimensional (2D) rasterizer operations including, for example, bit-boundary block transfers. However, in one embodiment, 2D graphics operations are performed using one or more components of graphics processing engine (GPE) 1810. In some embodiments, GPE 1810 is a compute engine for performing graphics operations, including three-dimensional (3D) graphics operations and media operations.

In some embodiments, GPE 1810 includes a 18D pipeline 1812 for performing 3D operations, such as rendering three-dimensional images and scenes using processing functions that act upon 3D primitive shapes (e.g., rectangle, triangle, etc.). The 3D pipeline 1812 includes programmable and fixed function elements that perform various tasks within the element and/or spawn execution threads to a 3D/Media sub-system 1815. While 3D pipeline 1812 can be used to perform media operations, an embodiment of GPE 1810 also includes a media pipeline 1816 that is specifically used to perform media operations, such as video post-processing and image enhancement.

In some embodiments, media pipeline 1816 includes fixed function or programmable logic units to perform one or more specialized media operations, such as video decode acceleration, video de-interlacing, and video encode acceleration in place of, or on behalf of video codec engine 1806. In some embodiments, media pipeline 1816 additionally includes a thread spawning unit to spawn threads for execution on 3D/Media sub-system 1815. The spawned threads perform computations for the media operations on one or more graphics execution units included in 3D/Media sub-system 1815.

In some embodiments, 3D/Media subsystem 1815 includes logic for executing threads spawned by 3D pipeline 1812 and media pipeline 1816. In one embodiment, the pipelines send thread execution requests to 3D/Media sub-system 1815, which includes thread dispatch logic for arbitrating and dispatching the various requests to available thread execution resources. The execution resources include an array of graphics execution units to process the 3D and media threads. In some embodiments, 3D/Media subsystem 1815 includes one or more internal caches for thread instructions and data. In some embodiments, the subsystem also includes shared memory, including registers and addressable memory, to share data between threads and to store output data.

Graphics Processing Engine

Figure 19:
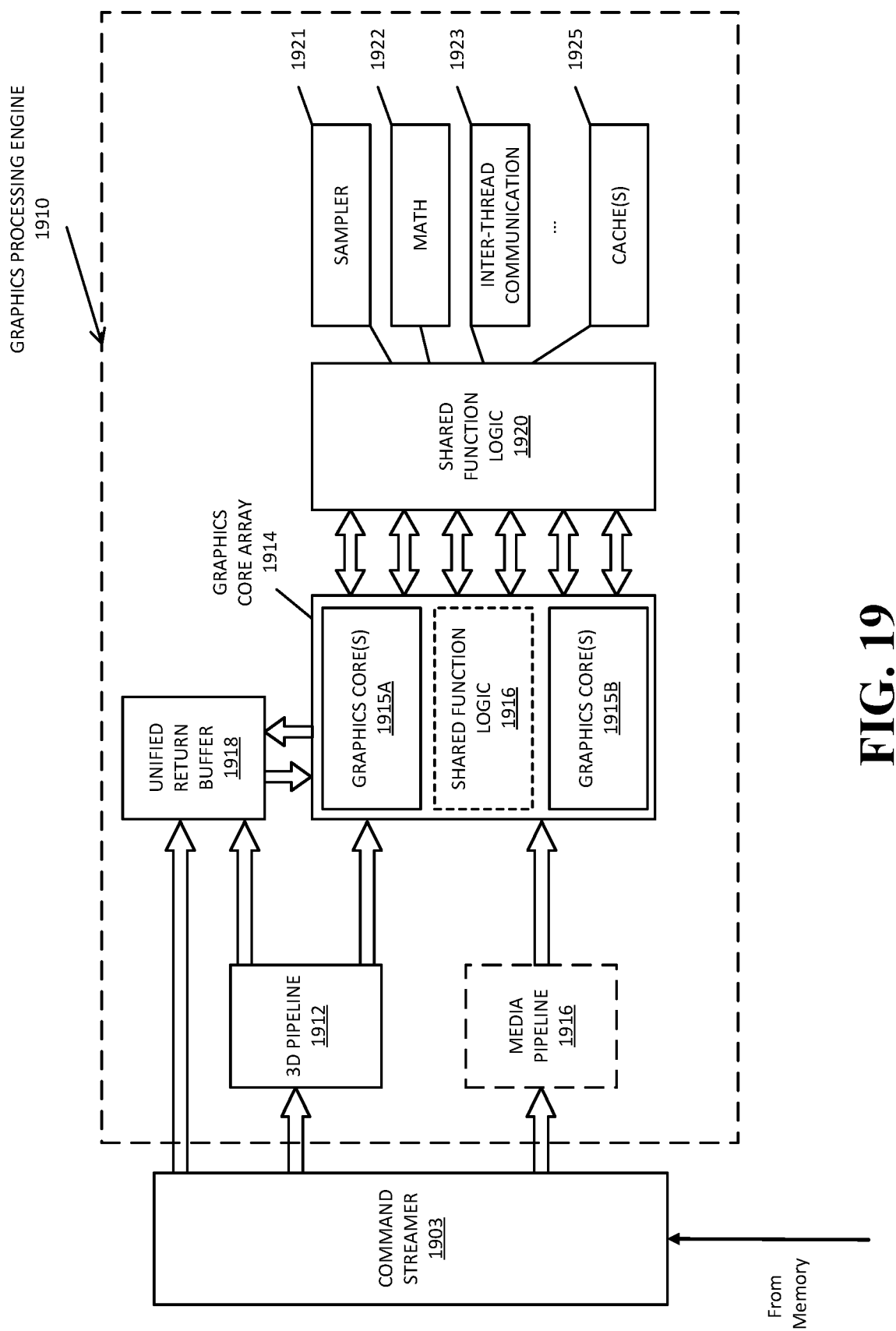
FIG. 19 is a block diagram of an example of a graphics processing engine according to an embodiment.

FIG. 19 is a block diagram of a graphics processing engine 1910 of a graphics processor in accordance with some embodiments. In one embodiment, the graphics processing engine (GPE) 1910 is a version of the GPE 1810 shown in FIG. 18. Elements of FIG. 19 having the same reference numbers (or names) as the elements of any other figure herein can operate or function in any manner similar to that described elsewhere herein, but are not limited to such. For example, the 3D pipeline 1812 and media pipeline 1816 of FIG. 18 are illustrated. The media pipeline 1816 is optional in some embodiments of the GPE 1910 and may not be explicitly included within the GPE 1910. For example and in at least one embodiment, a separate media and/or image processor is coupled to the GPE 1910.

In some embodiments, GPE 1910 couples with or includes a command streamer 1903, which provides a command stream to the 3D pipeline 1812 and/or media pipelines 1816. In some embodiments, command streamer 1903 is coupled with memory, which can be system memory, or one or more of internal cache memory and shared cache memory. In some embodiments, command streamer 1903 receives commands from the memory and sends the commands to 3D pipeline 1812 and/or media pipeline 1816. The commands are directives fetched from a ring buffer, which stores commands for the 3D pipeline 1812 and media pipeline 1816. In one embodiment, the ring buffer can additionally include batch command buffers storing batches of multiple commands. The commands for the 3D pipeline 1812 can also include references to data stored in memory, such as but not limited to vertex and geometry data for the 3D pipeline 1812 and/or image data and memory objects for the media pipeline 1816. The 3D pipeline 1812 and media pipeline 1816 process the commands and data by performing operations via logic within the respective pipelines or by dispatching one or more execution threads to a graphics core array 1914. In one embodiment the graphics core array 1914 include one or more blocks of graphics cores (e.g., graphics core(s) 1915A, graphics core(s) 1915B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 1812 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 1914. The graphics core array 1914 provides a unified block of execution resources for use in processing these shader programs. Multi-purpose execution logic (e.g., execution units) within the graphics core(s) 1915A-1914B of the graphic core array 1914 includes support for various 3D API shader languages and can execute multiple simultaneous execution threads associated with multiple shaders.

In some embodiments the graphics core array 1914 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-1702N as in FIG. 2.

Output data generated by threads executing on the graphics core array 1914 can output data to memory in a unified return buffer (URB) 1918. The URB 1918 can store data for multiple threads. In some embodiments the URB 1918 may be used to send data between different threads executing on the graphics core array 1914. In some embodiments the URB 1918 may additionally be used for synchronization between threads on the graphics core array and fixed function logic within the shared function logic 1920.

In some embodiments, graphics core array 1914 is scalable, such that the array includes a variable number of graphics cores, each having a variable number of execution units based on the target power and performance level of GPE 1910. In one embodiment the execution resources are dynamically scalable, such that execution resources may be enabled or disabled as needed.

The graphics core array 1914 couples with shared function logic 1920 that includes multiple resources that are shared between the graphics cores in the graphics core array. The shared functions within the shared function logic 1920 are hardware logic units that provide specialized supplemental functionality to the graphics core array 1914. In various embodiments, shared function logic 1920 includes but is not limited to sampler 1921, math 1922, and inter-thread communication (ITC) 1923 logic. Additionally, some embodiments implement one or more cache(s) 1925 within the shared function logic 1920.

A shared function is implemented where the demand for a given specialized function is insufficient for inclusion within the graphics core array 1914. Instead a single instantiation of that specialized function is implemented as a stand-alone entity in the shared function logic 1920 and shared among the execution resources within the graphics core array 1914. The precise set of functions that are shared between the graphics core array 1914 and included within the graphics core array 1914 varies across embodiments. In some embodiments, specific shared functions within the shared function logic 1920 that are used extensively by the graphics core array 1914 may be included within shared function logic 1916 within the graphics core array 1914. In various embodiments, the shared function logic 1916 within the graphics core array 1914 can include some or all logic within the shared function logic 1920. In one embodiment, all logic elements within the shared function logic 1920 may be duplicated within the shared function logic 1916 of the graphics core array 1914. In one embodiment the shared function logic 1920 is excluded in favor of the shared function logic 1916 within the graphics core array 1914.

Figure 20:
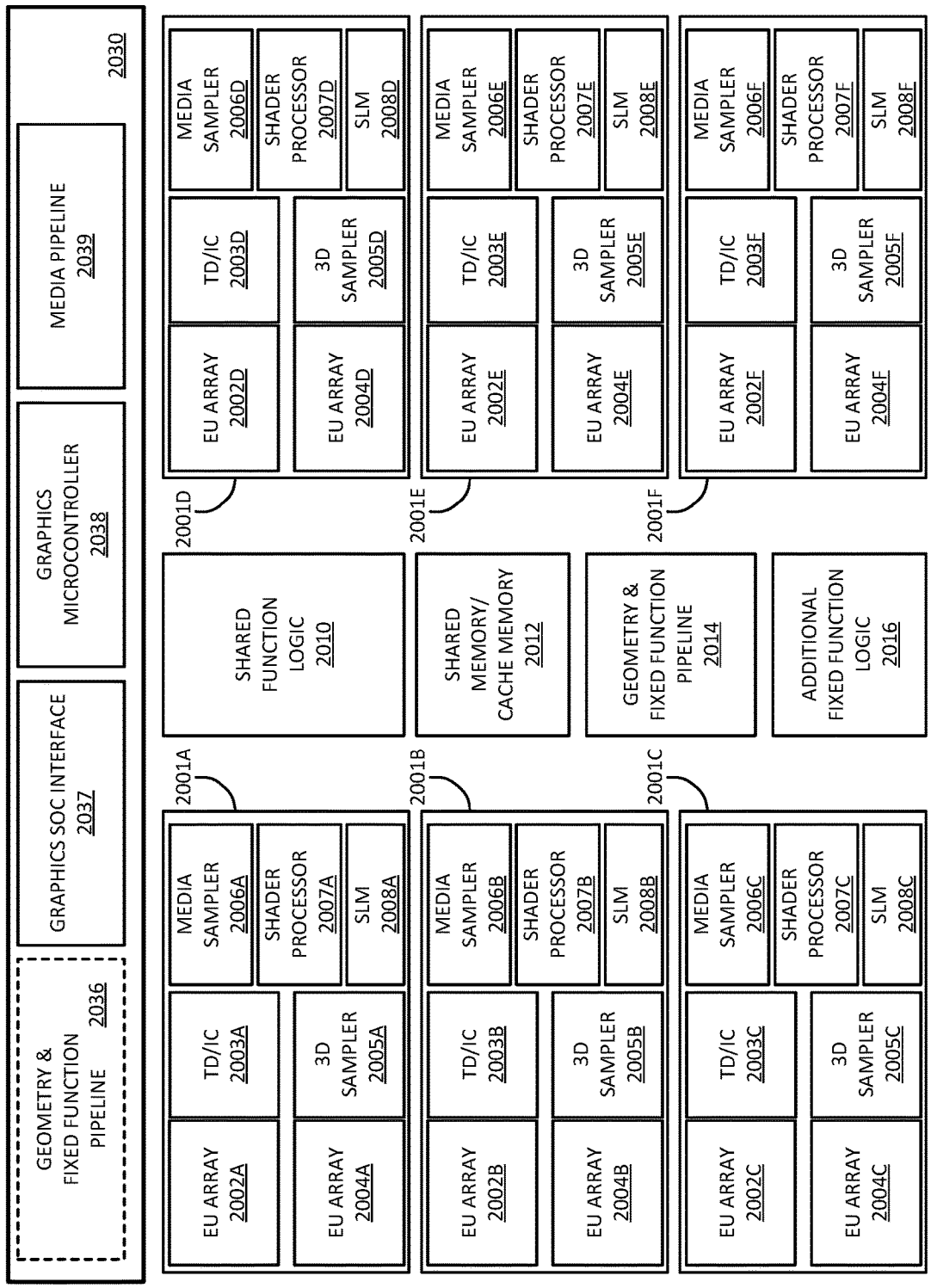
FIGS. 20-22 are block diagrams of examples of execution units according to an embodiment.

FIG. 20 is a block diagram of hardware logic of a graphics processor core 2000, according to some embodiments described herein. Elements of FIG. 20 having the same reference numbers (or names) as the elements of any other figure herein can operate or function in any manner similar to that described elsewhere herein, but are not limited to such. The illustrated graphics processor core 2000, in some embodiments, is included within the graphics core array 1914 of FIG. 19. The graphics processor core 2000, sometimes referred to as a core slice, can be one or multiple graphics cores within a modular graphics processor. The graphics processor core 2000 is exemplary of one graphics core slice, and a graphics processor as described herein may include multiple graphics core slices based on target power and performance envelopes. Each graphics core 2000 can include a fixed function block 2030 coupled with multiple sub-cores 2001A-2001F, also referred to as sub-slices, that include modular blocks of general-purpose and fixed function logic.

In some embodiments the fixed function block 2030 includes a geometry/fixed function pipeline 2036 that can be shared by all sub-cores in the graphics processor 2000, for example, in lower performance and/or lower power graphics processor implementations. In various embodiments, the geometry/fixed function pipeline 2036 includes a 3D fixed function pipeline (e.g., 3D pipeline 1812 as in FIG. 18 and FIG. 19) a video front-end unit, a thread spawner and thread dispatcher, and a unified return buffer manager, which manages unified return buffers, such as the unified return buffer 1918 of FIG. 19.

In one embodiment the fixed function block 2030 also includes a graphics SoC interface 2037, a graphics microcontroller 2038, and a media pipeline 2039. The graphics SoC interface 2037 provides an interface between the graphics core 2000 and other processor cores within a system on a chip integrated circuit. The graphics microcontroller 2038 is a programmable sub-processor that is configurable to manage various functions of the graphics processor 2000, including thread dispatch, scheduling, and pre-emption. The media pipeline 2039 (e.g., media pipeline 1816 of FIG. 18 and FIG. 19) includes logic to facilitate the decoding, encoding, pre-processing, and/or post-processing of multimedia data, including image and video data. The media pipeline 2039 implement media operations via requests to compute or sampling logic within the sub-cores 2001-2001F.

In one embodiment the SoC interface 2037 enables the graphics core 2000 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 2037 can also enable communication with fixed function devices within the SoC, such as camera imaging pipelines, and enables the use of and/or implements global memory atomics that may be shared between the graphics core 2000 and CPUs within the SoC. The SoC interface 2037 can also implement power management controls for the graphics core 2000 and enable an interface between a clock domain of the graphic core 2000 and other clock domains within the SoC. In one embodiment the SoC interface 2037 enables receipt of command buffers from a command streamer and global thread dispatcher that are configured to provide commands and instructions to each of one or more graphics cores within a graphics processor. The commands and instructions can be dispatched to the media pipeline 2039, when media operations are to be performed, or a geometry and fixed function pipeline (e.g., geometry and fixed function pipeline 2036, geometry and fixed function pipeline 2014) when graphics processing operations are to be performed.

The graphics microcontroller 2038 can be configured to perform various scheduling and management tasks for the graphics core 2000. In one embodiment the graphics microcontroller 2038 can perform graphics and/or compute workload scheduling on the various graphics parallel engines within execution unit (EU) arrays 2002A-2002F, 2004A-2004F within the sub-cores 2001A-2001F. In this scheduling model, host software executing on a CPU core of an SoC including the graphics core 2000 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 2038 can also facilitate low-power or idle states for the graphics core 2000, providing the graphics core 2000 with the ability to save and restore registers within the graphics core 2000 across low-power state transitions independently from the operating system and/or graphics driver software on the system.

The graphics core 2000 may have greater than or fewer than the illustrated sub-cores 2001A-2001F, up to N modular sub-cores. For each set of N sub-cores, the graphics core 2000 can also include shared function logic 2010, shared and/or cache memory 2012, a geometry/fixed function pipeline 2014, as well as additional fixed function logic 2016 to accelerate various graphics and compute processing operations. The shared function logic 2010 can include logic units associated with the shared function logic 1920 of FIG. 19 (e.g., sampler, math, and/or inter-thread communication logic) that can be shared by each N sub-cores within the graphics core 2000. The shared and/or cache memory 2012 can be a last-level cache for the set of N sub-cores 2001A-2001F within the graphics core 2000, and can also serve as shared memory that is accessible by multiple sub-cores. The geometry/fixed function pipeline 2014 can be included instead of the geometry/fixed function pipeline 2036 within the fixed function block 2030 and can include the same or similar logic units.

In one embodiment the graphics core 2000 includes additional fixed function logic 2016 that can include various fixed function acceleration logic for use by the graphics core 2000. In one embodiment the additional fixed function logic 2016 includes an additional geometry pipeline for use in position only shading. In position-only shading, two geometry pipelines exist, the full geometry pipeline within the geometry/fixed function pipeline 2016, 2036, and a cull pipeline, which is an additional geometry pipeline which may be included within the additional fixed function logic 2016. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 2016 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 2016 can also include machine-learning acceleration logic, such as fixed function matrix multiplication logic, for implementations including optimizations for machine learning training or inferencing.

Within each graphics sub-core 2001A-2001F includes a set of execution resources that may be used to perform graphics, media, and compute operations in response to requests by graphics pipeline, media pipeline, or shader programs. The graphics sub-cores 2001A-2001F include multiple EU arrays 2002A-2002F, 2004A-2004F, thread dispatch and inter-thread communication (TD/IC) logic 2003A-2003F, a 3D (e.g., texture) sampler 2005A-2005F, a media sampler 2006A-2006F, a shader processor 2007A-2007F, and shared local memory (SLM) 2008A-2008F. The EU arrays 2002A-2002F, 2004A-2004F each include multiple execution units, which are general-purpose graphics processing units capable of performing floating-point and integer/fixed-point logic operations in service of a graphics, media, or compute operation, including graphics, media, or compute shader programs. The TD/IC logic 2003A-2003F performs local thread dispatch and thread control operations for the execution units within a sub-core and facilitate communication between threads executing on the execution units of the sub-core. The 3D sampler 2005A-2005F can read texture or other 3D graphics related data into memory. The 3D sampler can read texture data differently based on a configured sample state and the texture format associated with a given texture. The media sampler 2006A-2006F can perform similar read operations based on the type and format associated with media data. In one embodiment, each graphics sub-core 2001A-2001F can alternately include a unified 3D and media sampler. Threads executing on the execution units within each of the sub-cores 2001A-2001F can make use of shared local memory 2008A-2008F within each sub-core, to enable threads executing within a thread group to execute using a common pool of on-chip memory.

Execution Units

Figure 21A:
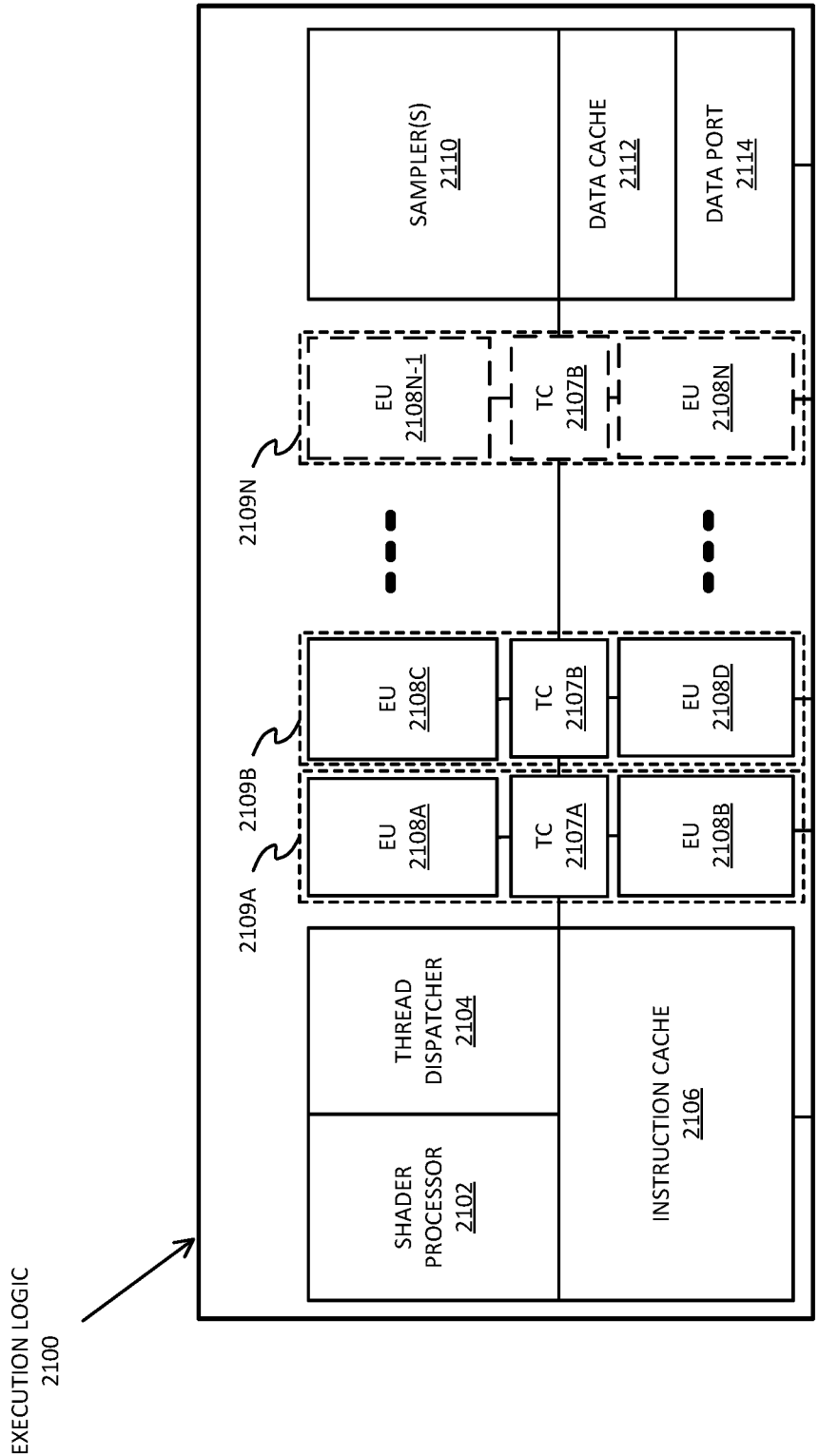
Figure 21B:
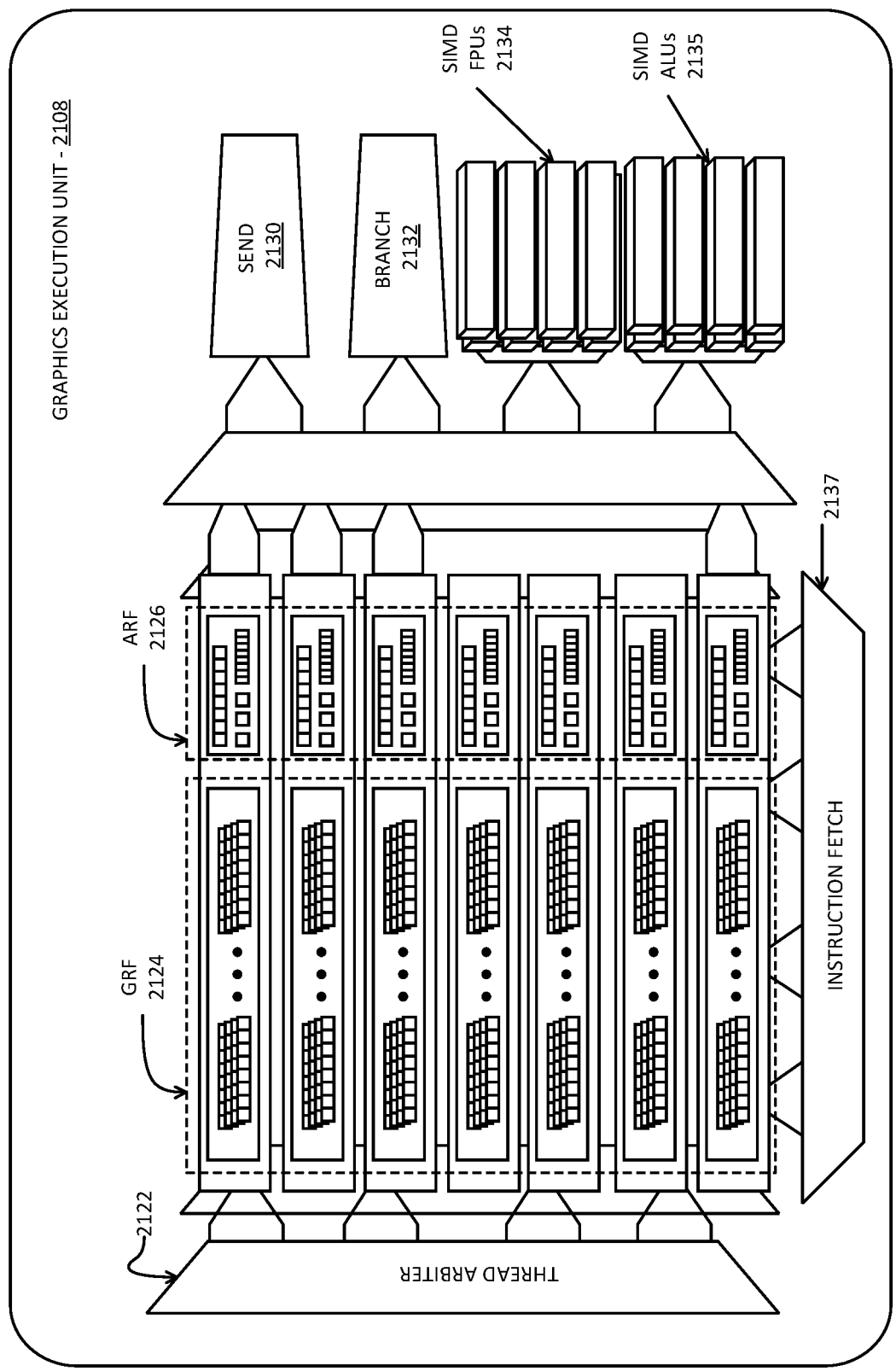

FIGS. 21A-21B illustrate thread execution logic 2100 including an array of processing elements employed in a graphics processor core according to embodiments described herein. Elements of FIGS. 21A-21B having the same reference numbers (or names) as the elements of any other figure herein can operate or function in any manner similar to that described elsewhere herein, but are not limited to such. FIG. 21A illustrates an overview of thread execution logic 2100, which can include a variant of the hardware logic illustrated with each sub-core 2001A-2001F of FIG. 20. FIG. 21B illustrates exemplary internal details of an execution unit.

As illustrated in FIG. 21A, in some embodiments thread execution logic 2100 includes a shader processor 2102, a thread dispatcher 2104, instruction cache 2106, a scalable execution unit array including a plurality of execution units 2108A-2108N, a sampler 2110, a data cache 2112, and a data port 2114. In one embodiment the scalable execution unit array can dynamically scale by enabling or disabling one or more execution units (e.g., any of execution unit 2108A, 2108B, 2108C, 2108D, through 2108N-1 and 2108N) based on the computational requirements of a workload. In one embodiment the included components are interconnected via an interconnect fabric that links to each of the components. In some embodiments, thread execution logic 2100 includes one or more connections to memory, such as system memory or cache memory, through one or more of instruction cache 2106, data port 2114, sampler 2110, and execution units 2108A-2108N. In some embodiments, each execution unit (e.g. 2108A) is a stand-alone programmable general-purpose computational unit that is capable of executing multiple simultaneous hardware threads while processing multiple data elements in parallel for each thread. In various embodiments, the array of execution units 2108A-2108N is scalable to include any number individual execution units.

In some embodiments, the execution units 2108A-2108N are primarily used to execute shader programs. A shader processor 2102 can process the various shader programs and dispatch execution threads associated with the shader programs via a thread dispatcher 2104. In one embodiment the thread dispatcher includes logic to arbitrate thread initiation requests from the graphics and media pipelines and instantiate the requested threads on one or more execution unit in the execution units 2108A-2108N. For example, a geometry pipeline can dispatch vertex, tessellation, or geometry shaders to the thread execution logic for processing. In some embodiments, thread dispatcher 2104 can also process runtime thread spawning requests from the executing shader programs.

In some embodiments, the execution units 2108A-2108N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 2108A-2108N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 2108A-2108N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 2108A-2108N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 2108A-2108N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 2109A-2109N having thread control logic (607A-2107N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 2109A-2109N includes at least two execution units. For example, fused execution unit 2109A includes a first EU 2108A, second EU 2108B, and thread control logic 2107A that is common to the first EU 2108A and the second EU 2108B. The thread control logic 2107A controls threads executed on the fused graphics execution unit 2109A, allowing each EU within the fused execution units 2109A-2109N to execute using a common instruction pointer register.

One or more internal instruction caches (e.g., 2106) are included in the thread execution logic 2100 to cache thread instructions for the execution units. In some embodiments, one or more data caches (e.g., 2112) are included to cache thread data during thread execution. In some embodiments, a sampler 2110 is included to provide texture sampling for 3D operations and media sampling for media operations. In some embodiments, sampler 2110 includes specialized texture or media sampling functionality to process texture or media data during the sampling process before providing the sampled data to an execution unit.

During execution, the graphics and media pipelines send thread initiation requests to thread execution logic 2100 via thread spawning and dispatch logic. Once a group of geometric objects has been processed and rasterized into pixel data, pixel processor logic (e.g., pixel shader logic, fragment shader logic, etc.) within the shader processor 2102 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 2102 then executes an application programming interface (API)-supplied pixel or fragment shader program. To execute the shader program, the shader processor 2102 dispatches threads to an execution unit (e.g., 2108A) via thread dispatcher 2104. In some embodiments, shader processor 2102 uses texture sampling logic in the sampler 2110 to access texture data in texture maps stored in memory. Arithmetic operations on the texture data and the input geometry data compute pixel color data for each geometric fragment, or discards one or more pixels from further processing.

In some embodiments, the data port 2114 provides a memory access mechanism for the thread execution logic 2100 to output processed data to memory for further processing on a graphics processor output pipeline. In some embodiments, the data port 2114 includes or couples to one or more cache memories (e.g., data cache 2112) to cache data for memory access via the data port.

As illustrated in FIG. 21B, a graphics execution unit 2108 can include an instruction fetch unit 2137, a general register file array (GRF) 2124, an architectural register file array (ARF) 2126, a thread arbiter 2122, a send unit 2130, a branch unit 2132, a set of SIMD floating point units (FPUs) 2134, and in one embodiment a set of dedicated integer SIMD ALUs 2135. The GRF 2124 and ARF 2126 includes the set of general register files and architecture register files associated with each simultaneous hardware thread that may be active in the graphics execution unit 2108. In one embodiment, per thread architectural state is maintained in the ARF 2126, while data used during thread execution is stored in the GRF 2124. The execution state of each thread, including the instruction pointers for each thread, can be held in thread-specific registers in the ARF 2126.

In one embodiment the graphics execution unit 2108 has an architecture that is a combination of Simultaneous Multi- Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 2108 can co-issue multiple instructions, which may each be different instructions. The thread arbiter 2122 of the graphics execution unit thread 2108 can dispatch the instructions to one of the send unit 2130, branch unit 2142, or SIMD FPU(s) 2134 for execution. Each execution thread can access 128 general-purpose registers within the GRF 2124, where each register can store 32 bytes, accessible as a SIMD 8-element vector of 32-bit data elements. In one embodiment, each execution unit thread has access to 4 Kbytes within the GRF 2124, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 2124 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 2130. In one embodiment, branch instructions are dispatched to a dedicated branch unit 2132 to facilitate SIMD divergence and eventual convergence.

In one embodiment the graphics execution unit 2108 includes one or more SIMD floating point units (FPU(s)) 2134 to perform floating-point operations. In one embodiment, the FPU(s) 2134 also support integer computation. In one embodiment the FPU(s) 2134 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 2135 are also present, and may be specifically optimized to perform operations associated with machine learning computations.

In one embodiment, arrays of multiple instances of the graphics execution unit 2108 can be instantiated in a graphics sub-core grouping (e.g., a sub-slice). For scalability, product architects can chose the exact number of execution units per sub-core grouping. In one embodiment the execution unit 2108 can execute instructions across a plurality of execution channels. In a further embodiment, each thread executed on the graphics execution unit 2108 is executed on a different channel.

Figure 22:
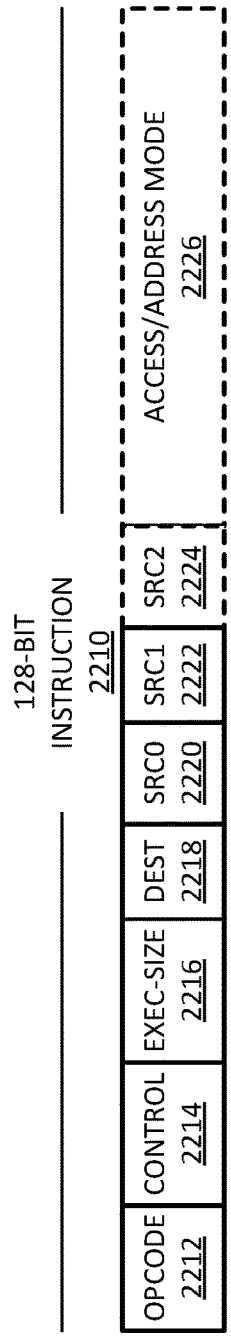
Figure 22:
Figure 22:
Figure 22:
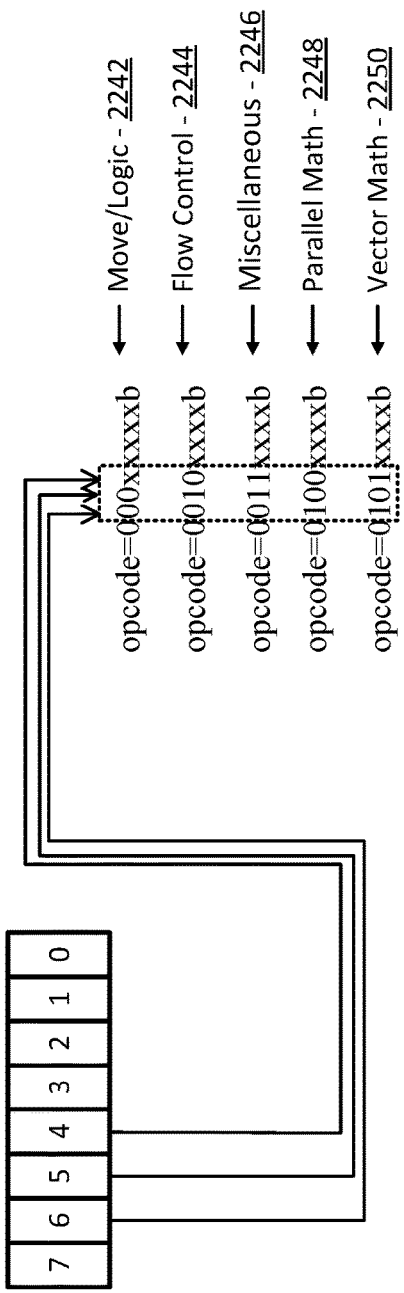

FIG. 22 is a block diagram illustrating a graphics processor instruction formats 2200 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 2200 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 2210. A 64-bit compacted instruction format 2230 is available for some instructions based on the selected instruction, instruction options, and number of operands. The native 128-bit instruction format 2210 provides access to all instruction options, while some options and operations are restricted in the 64-bit format 2230. The native instructions available in the 64-bit format 2230 vary by embodiment. In some embodiments, the instruction is compacted in part using a set of index values in an index field 2213. The execution unit hardware references a set of compaction tables based on the index values and uses the compaction table outputs to reconstruct a native instruction in the 128-bit instruction format 2210.

For each format, instruction opcode 2212 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 2214 enables control over certain execution options, such as channels selection (e.g., predication) and data channel order (e.g., swizzle). For instructions in the 128-bit instruction format 2210 an exec-size field 2216 limits the number of data channels that will be executed in parallel. In some embodiments, exec-size field 2216 is not available for use in the 64-bit compact instruction format 2230.

Some execution unit instructions have up to three operands including two source operands, src0 2220, src1 2222, and one destination 2218. In some embodiments, the execution units support dual destination instructions, where one of the destinations is implied. Data manipulation instructions can have a third source operand (e.g., SRC2 2224), where the instruction opcode 2212 determines the number of source operands. An instruction's last source operand can be an immediate (e.g., hard-coded) value passed with the instruction.

In some embodiments, the 128-bit instruction format 2210 includes an access/address mode field 2226 specifying, for example, whether direct register addressing mode or indirect register addressing mode is used. When direct register addressing mode is used, the register address of one or more operands is directly provided by bits in the instruction.

In some embodiments, the 128-bit instruction format 2210 includes an access/address mode field 2226, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 2226 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 2212 bit-fields to simplify Opcode decode 2240. For an 8-bit opcode, bits 4, 5, and 6 allow the execution unit to determine the type of opcode. The precise opcode grouping shown is merely an example. In some embodiments, a move and logic opcode group 2242 includes data movement and logic instructions (e.g., move (mov), compare (cmp)). In some embodiments, move and logic group 2242 shares the five most significant bits (MSB), where move (mov) instructions are in the form of 0000xxxxb and logic instructions are in the form of 0001xxxxb. A flow control instruction group 2244 (e.g., call, jump (jmp)) includes instructions in the form of 0010xxxxb (e.g., 0x20). A miscellaneous instruction group 2246 includes a mix of instructions, including synchronization instructions (e.g., wait, send) in the form of 0011xxxxb (e.g., 0x30). A parallel math instruction group 2248 includes component-wise arithmetic instructions (e.g., add, multiply (mul)) in the form of 0100xxxxb (e.g., 0x40). The parallel math group 2248 performs the arithmetic operations in parallel across data channels. The vector math group 2250 includes arithmetic instructions (e.g., dp4) in the form of 0101xxxxb (e.g., 0x50). The vector math group performs arithmetic such as dot product calculations on vector operands.

Graphics Pipeline

Figure 23:
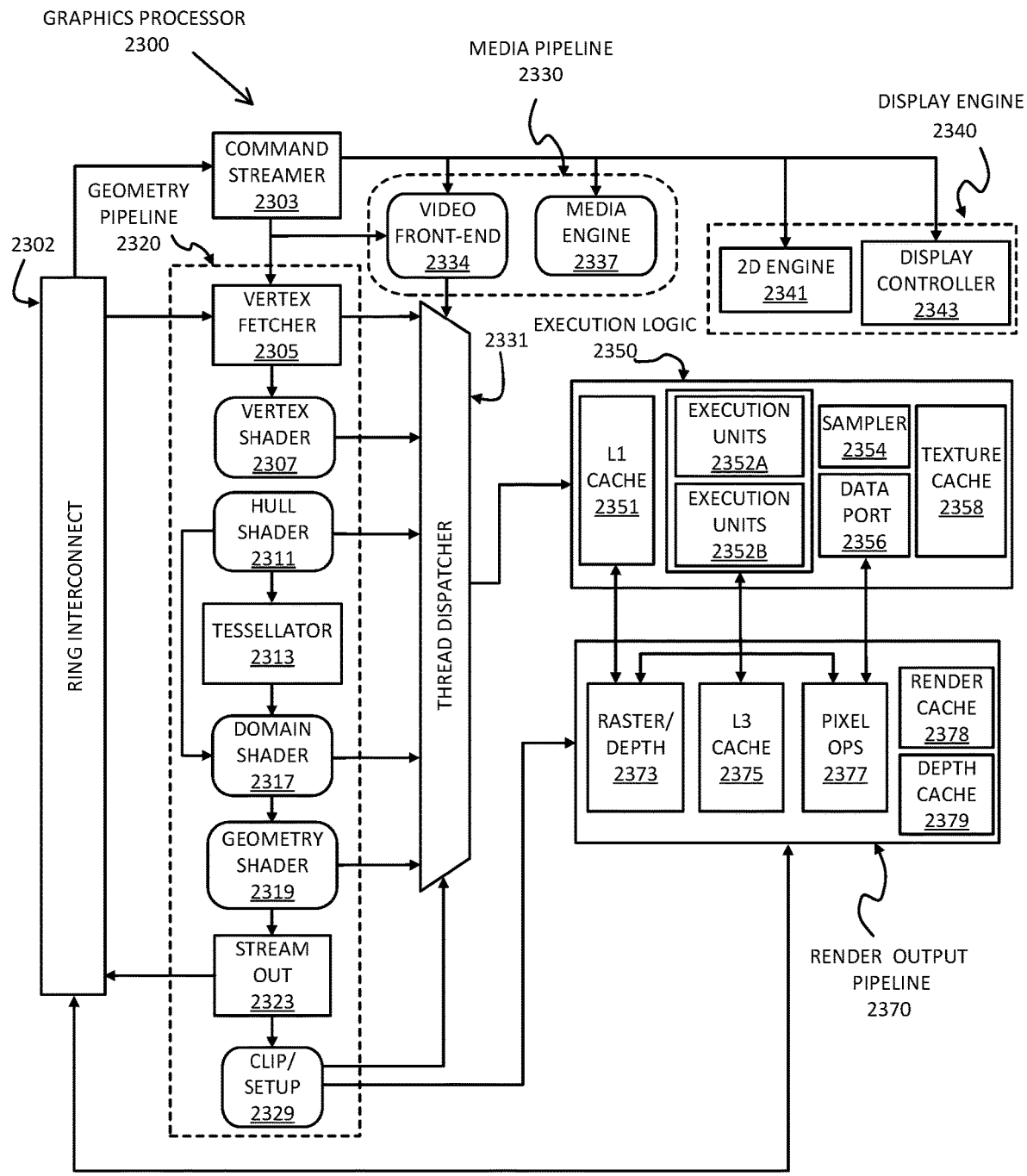
FIG. 23 is a block diagram of an example of a graphics pipeline according to an embodiment.

FIG. 23 is a block diagram of another embodiment of a graphics processor 2300. Elements of FIG. 23 having the same reference numbers (or names) as the elements of any other figure herein can operate or function in any manner similar to that described elsewhere herein, but are not limited to such.

In some embodiments, graphics processor 2300 includes a geometry pipeline 2320, a media pipeline 2330, a display engine 2340, thread execution logic 2350, and a render output pipeline 2370. In some embodiments, graphics processor 2300 is a graphics processor within a multi-core processing system that includes one or more general-purpose processing cores. The graphics processor is controlled by register writes to one or more control registers (not shown) or via commands issued to graphics processor 2300 via a ring interconnect 2302. In some embodiments, ring interconnect 2302 couples graphics processor 2300 to other processing components, such as other graphics processors or general-purpose processors. Commands from ring interconnect 2302 are interpreted by a command streamer 2303, which supplies instructions to individual components of the geometry pipeline 2320 or the media pipeline 2330.

In some embodiments, command streamer 2303 directs the operation of a vertex fetcher 2305 that reads vertex data from memory and executes vertex-processing commands provided by command streamer 2303. In some embodiments, vertex fetcher 2305 provides vertex data to a vertex shader 2307, which performs coordinate space transformation and lighting operations to each vertex. In some embodiments, vertex fetcher 2305 and vertex shader 2307 execute vertex-processing instructions by dispatching execution threads to execution units 2352A-2352B via a thread dispatcher 2331.

In some embodiments, execution units 2352A-2352B are an array of vector processors having an instruction set for performing graphics and media operations. In some embodiments, execution units 2352A-2352B have an attached L1 cache 2351 that is specific for each array or shared between the arrays. The cache can be configured as a data cache, an instruction cache, or a single cache that is partitioned to contain data and instructions in different partitions.

In some embodiments, geometry pipeline 2320 includes tessellation components to perform hardware-accelerated tessellation of 3D objects. In some embodiments, a programmable hull shader 2311 configures the tessellation operations. A programmable domain shader 2317 provides back-end evaluation of tessellation output. A tessellator 2313 operates at the direction of hull shader 2311 and contains special purpose logic to generate a set of detailed geometric objects based on a coarse geometric model that is provided as input to geometry pipeline 2320. In some embodiments, if tessellation is not used, tessellation components (e.g., hull shader 2311, tessellator 2313, and domain shader 2317) can be bypassed.

In some embodiments, complete geometric objects can be processed by a geometry shader 2319 via one or more threads dispatched to execution units 2352A-2352B, or can proceed directly to the clipper 2329. In some embodiments, the geometry shader operates on entire geometric objects, rather than vertices or patches of vertices as in previous stages of the graphics pipeline. If the tessellation is disabled the geometry shader 2319 receives input from the vertex shader 2307. In some embodiments, geometry shader 2319 is programmable by a geometry shader program to perform geometry tessellation if the tessellation units are disabled.

Before rasterization, a clipper 2329 processes vertex data. The clipper 2329 may be a fixed function clipper or a programmable clipper having clipping and geometry shader functions. In some embodiments, a rasterizer and depth test component 2373 in the render output pipeline 2370 dispatches pixel shaders to convert the geometric objects into per pixel representations. In some embodiments, pixel shader logic is included in thread execution logic 2350. In some embodiments, an application can bypass the rasterizer and depth test component 2373 and access un-rasterized vertex data via a stream out unit 2323.

The graphics processor 2300 has an interconnect bus, interconnect fabric, or some other interconnect mechanism that allows data and message passing amongst the major components of the processor. In some embodiments, execution units 2352A-2352B and associated logic units (e.g., L1 cache 2351, sampler 2354, texture cache 2358, etc.) interconnect via a data port 2356 to perform memory access and communicate with render output pipeline components of the processor. In some embodiments, sampler 2354, caches 2351, 2358 and execution units 2352A-2352B each have separate memory access paths. In one embodiment the texture cache 2358 can also be configured as a sampler cache.

In some embodiments, render output pipeline 2370 contains a rasterizer and depth test component 2373 that converts vertex-based objects into an associated pixel-based representation. In some embodiments, the rasterizer logic includes a windower/masker unit to perform fixed function triangle and line rasterization. An associated render cache 2378 and depth cache 2379 are also available in some embodiments. A pixel operations component 2377 performs pixel-based operations on the data, though in some instances, pixel operations associated with 2D operations (e.g. bit block image transfers with blending) are performed by the 2D engine 2341, or substituted at display time by the display controller 2343 using overlay display planes. In some embodiments, a shared L3 cache 2375 is available to all graphics components, allowing the sharing of data without the use of main system memory.

In some embodiments, graphics processor media pipeline 2330 includes a media engine 2337 and a video front-end 2334. In some embodiments, video front-end 2334 receives pipeline commands from the command streamer 2303. In some embodiments, media pipeline 2330 includes a separate command streamer. In some embodiments, video front-end 2334 processes media commands before sending the command to the media engine 2337. In some embodiments, media engine 2337 includes thread spawning functionality to spawn threads for dispatch to thread execution logic 2350 via thread dispatcher 2331.

In some embodiments, graphics processor 2300 includes a display engine 2340. In some embodiments, display engine 2340 is external to processor 2300 and couples with the graphics processor via the ring interconnect 2302, or some other interconnect bus or fabric. In some embodiments, display engine 2340 includes a 2D engine 2341 and a display controller 2343. In some embodiments, display engine 2340 contains special purpose logic capable of operating independently of the 3D pipeline. In some embodiments, display controller 2343 couples with a display device (not shown), which may be a system integrated display device, as in a laptop computer, or an external display device attached via a display device connector.

In some embodiments, the geometry pipeline 2320 and media pipeline 2330 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 24A:
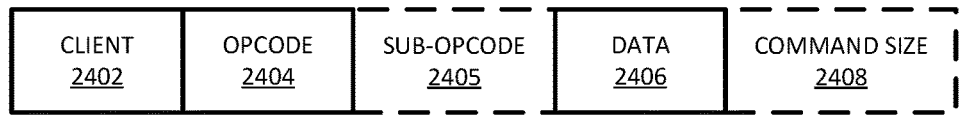
FIGS. 24A-24B are block diagrams of examples of graphics pipeline programming according to an embodiment.
Figure 24B:
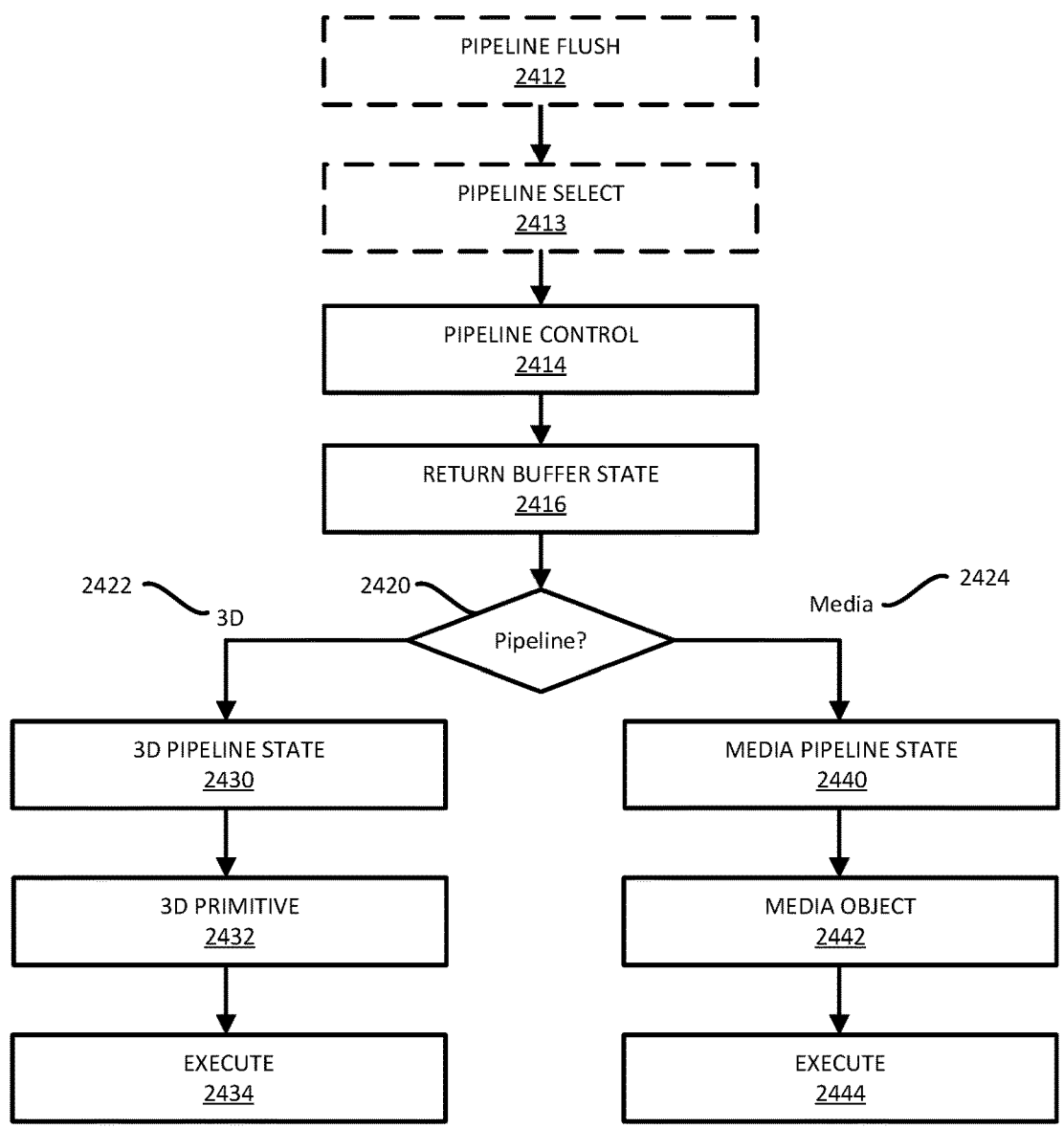

FIG. 24A is a block diagram illustrating a graphics processor command format 2400 according to some embodiments. FIG. 24B is a block diagram illustrating a graphics processor command sequence 2410 according to an embodiment. The solid lined boxes in FIG. 24A illustrate the components that are generally included in a graphics command while the dashed lines include components that are optional or that are only included in a sub-set of the graphics commands. The exemplary graphics processor command format 2400 of FIG. 24A includes data fields to identify a client 2402, a command operation code (opcode) 2404, and data 2406 for the command. A sub-opcode 2405 and a command size 2408 are also included in some commands.

In some embodiments, client 2402 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 2404 and, if present, sub-opcode 2405 to determine the operation to perform. The client unit performs the command using information in data field 2406. For some commands an explicit command size 2408 is expected to specify the size of the command. In some embodiments, the command parser automatically determines the size of at least some of the commands based on the command opcode. In some embodiments commands are aligned via multiples of a double word.

The flow diagram in FIG. 24B illustrates an exemplary graphics processor command sequence 2410. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 2410 may begin with a pipeline flush command 2412 to cause any active graphics pipeline to complete the currently pending commands for the pipeline. In some embodiments, the 3D pipeline 2422 and the media pipeline 2424 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 2412 can be used for pipeline synchronization or before placing the graphics processor into a low power state.

In some embodiments, a pipeline select command 2413 is used when a command sequence requires the graphics processor to explicitly switch between pipelines. In some embodiments, a pipeline select command 2413 is required only once within an execution context before issuing pipeline commands unless the context is to issue commands for both pipelines. In some embodiments, a pipeline flush command 2412 is required immediately before a pipeline switch via the pipeline select command 2413.

In some embodiments, a pipeline control command 2414 configures a graphics pipeline for operation and is used to program the 3D pipeline 2422 and the media pipeline 2424. In some embodiments, pipeline control command 2414 configures the pipeline state for the active pipeline. In one embodiment, the pipeline control command 2414 is used for pipeline synchronization and to clear data from one or more cache memories within the active pipeline before processing a batch of commands.

In some embodiments, return buffer state commands 2416 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 2416 includes selecting the size and number of return buffers to use for a set of pipeline operations.

The remaining commands in the command sequence differ based on the active pipeline for operations. Based on a pipeline determination 2420, the command sequence is tailored to the 3D pipeline 2422 beginning with the 3D pipeline state 2430 or the media pipeline 2424 beginning at the media pipeline state 2440.

The commands to configure the 3D pipeline state 2430 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 2430 commands are also able to selectively disable or bypass certain pipeline elements if those elements will not be used.

In some embodiments, 3D primitive 2432 command is used to submit 3D primitives to be processed by the 3D pipeline. Commands and associated parameters that are passed to the graphics processor via the 3D primitive 2432 command are forwarded to the vertex fetch function in the graphics pipeline. The vertex fetch function uses the 3D primitive 2432 command data to generate vertex data structures. The vertex data structures are stored in one or more return buffers. In some embodiments, 3D primitive 2432 command is used to perform vertex operations on 3D primitives via vertex shaders. To process vertex shaders, 3D pipeline 2422 dispatches shader execution threads to graphics processor execution units.

In some embodiments, 3D pipeline 2422 is triggered via an execute 2434 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 2410 follows the media pipeline 2424 path when performing media operations. In general, the specific use and manner of programming for the media pipeline 2424 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 2424 is configured in a similar manner as the 3D pipeline 2422. A set of commands to configure the media pipeline state 2440 are dispatched or placed into a command queue before the media object commands 2442. In some embodiments, commands for the media pipeline state 2440 include data to configure the media pipeline elements that will be used to process the media objects. This includes data to configure the video decode and video encode logic within the media pipeline, such as encode or decode format. In some embodiments, commands for the media pipeline state 2440 also support the use of one or more pointers to "indirect" state elements that contain a batch of state settings.

In some embodiments, media object commands 2442 supply pointers to media objects for processing by the media pipeline. The media objects include memory buffers containing video data to be processed. In some embodiments, all media pipeline states must be valid before issuing a media object command 2442. Once the pipeline state is configured and media object commands 2442 are queued, the media pipeline 2424 is triggered via an execute command 2444 or an equivalent execute event (e.g., register write). Output from media pipeline 2424 may then be post processed by operations provided by the 3D pipeline 2422 or the media pipeline 2424. In some embodiments, GPGPU operations are configured and executed in a similar manner as media operations.

Graphics Software Architecture

Figure 25:
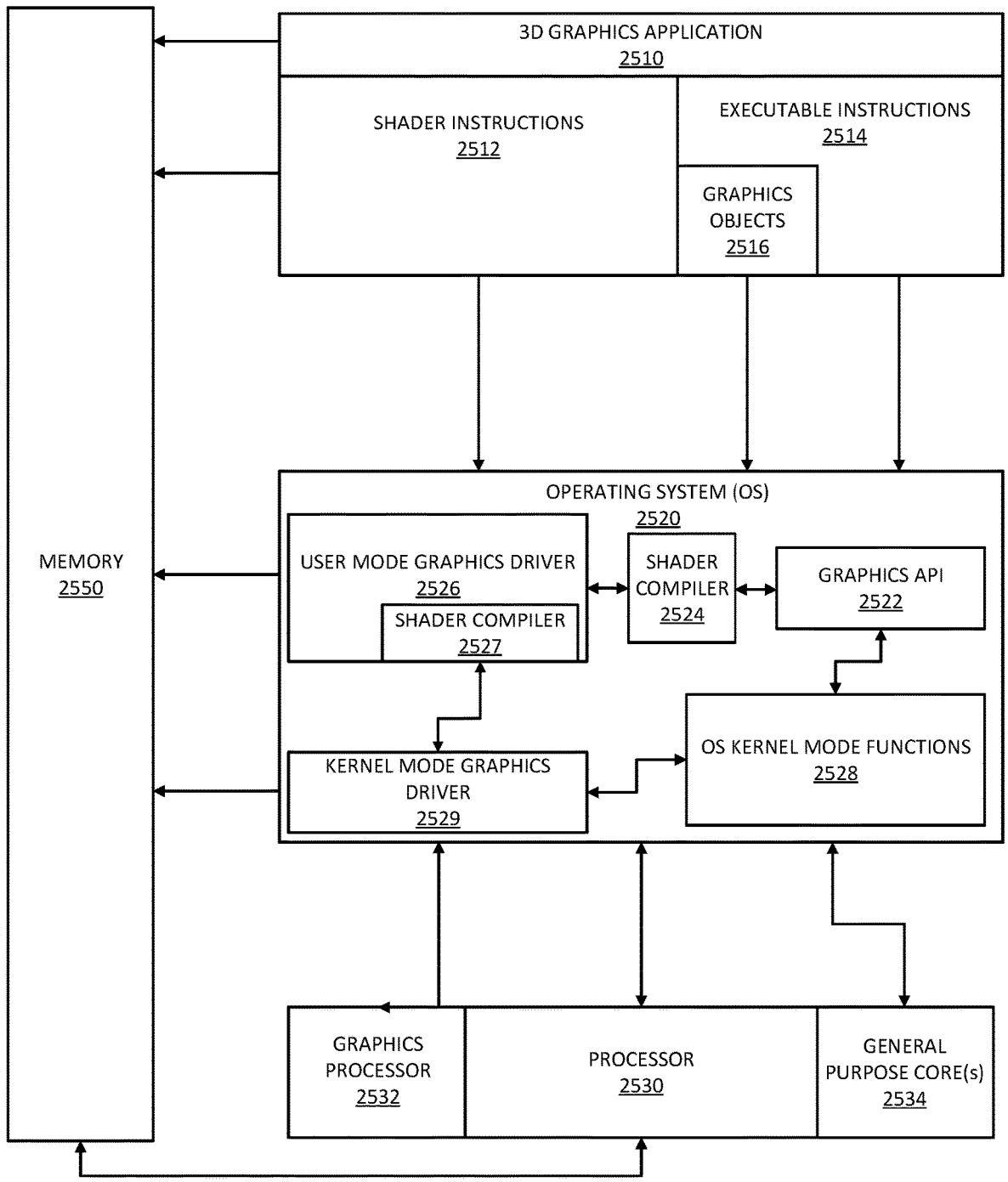
FIG. 25 is a block diagram of an example of a graphics software architecture according to an embodiment.

FIG. 25 illustrates exemplary graphics software architecture for a data processing system 2500 according to some embodiments. In some embodiments, software architecture includes a 3D graphics application 2510, an operating system 2520, and at least one processor 2530. In some embodiments, processor 2530 includes a graphics processor 2532 and one or more general-purpose processor core(s) 2534. The graphics application 2510 and operating system 2520 each execute in the system memory 2550 of the data processing system.

In some embodiments, 3D graphics application 2510 contains one or more shader programs including shader instructions 2512. The shader language instructions may be in a high-level shader language, such as the High Level Shader Language (HLSL) or the OpenGL Shader Language (GLSL). The application also includes executable instructions 2514 in a machine language suitable for execution by the general-purpose processor core 2534. The application also includes graphics objects 2516 defined by vertex data.

In some embodiments, operating system 2520 is a Microsoft® Windows® operating system from the Microsoft Corporation, a proprietary UNIX-like operating system, or an open source UNIX-like operating system using a variant of the Linux kernel. The operating system 2520 can support a graphics API 2522 such as the Direct3D API, the OpenGL API, or the Vulkan API. When the Direct3D API is in use, the operating system 2520 uses a front-end shader compiler 2524 to compile any shader instructions 2512 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 2510. In some embodiments, the shader instructions 2512 are provided in an intermediate form, such as a version of the Standard Portable Intermediate Representation (SPIR) used by the Vulkan API.

In some embodiments, user mode graphics driver 2526 contains a back-end shader compiler 2527 to convert the shader instructions 2512 into a hardware specific representation. When the OpenGL API is in use, shader instructions 2512 in the GLSL high-level language are passed to a user mode graphics driver 2526 for compilation. In some embodiments, user mode graphics driver 2526 uses operating system kernel mode functions 2528 to communicate with a kernel mode graphics driver 2529. In some embodiments, kernel mode graphics driver 2529 communicates with graphics processor 2532 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 26A:
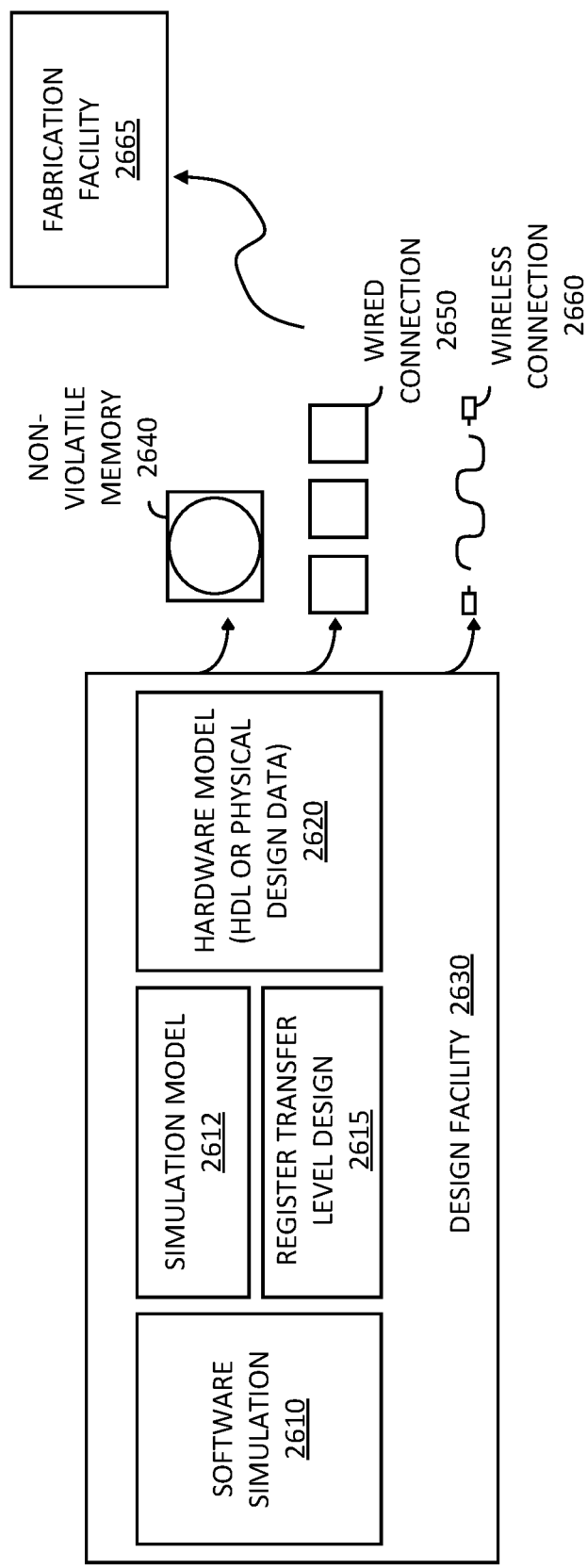
FIG. 26A is a block diagram of an example of an intellectual property (IP) core development system according to an embodiment.

FIG. 26A is a block diagram illustrating an IP core development system 2600 that may be used to manufacture an integrated circuit to perform operations according to an embodiment. The IP core development system 2600 may be used to generate modular, re-usable designs that can be incorporated into a larger design or used to construct an entire integrated circuit (e.g., an SOC integrated circuit). A design facility 2630 can generate a software simulation 2610 of an IP core design in a high-level programming language (e.g., C/C++). The software simulation 2610 can be used to design, test, and verify the behavior of the IP core using a simulation model 2612. The simulation model 2612 may include functional, behavioral, and/or timing simulations. A register transfer level (RTL) design 2615 can then be created or synthesized from the simulation model 2612. The RTL design 2615 is an abstraction of the behavior of the integrated circuit that models the flow of digital signals between hardware registers, including the associated logic performed using the modeled digital signals. In addition to an RTL design 2615, lower-level designs at the logic level or transistor level may also be created, designed, or synthesized. Thus, the particular details of the initial design and simulation may vary.

The RTL design 2615 or equivalent may be further synthesized by the design facility into a hardware model 2620, which may be in a hardware description language (HDL), or some other representation of physical design data. The HDL may be further simulated or tested to verify the IP core design. The IP core design can be stored for delivery to a 3rd party fabrication facility 2665 using non-volatile memory 2640 (e.g., hard disk, flash memory, or any non-volatile storage medium). Alternatively, the IP core design may be transmitted (e.g., via the Internet) over a wired connection 2650 or wireless connection 2660. The fabrication facility 2665 may then fabricate an integrated circuit that is based at least in part on the IP core design. The fabricated integrated circuit can be configured to perform operations in accordance with at least one embodiment described herein.

Figure 26B:
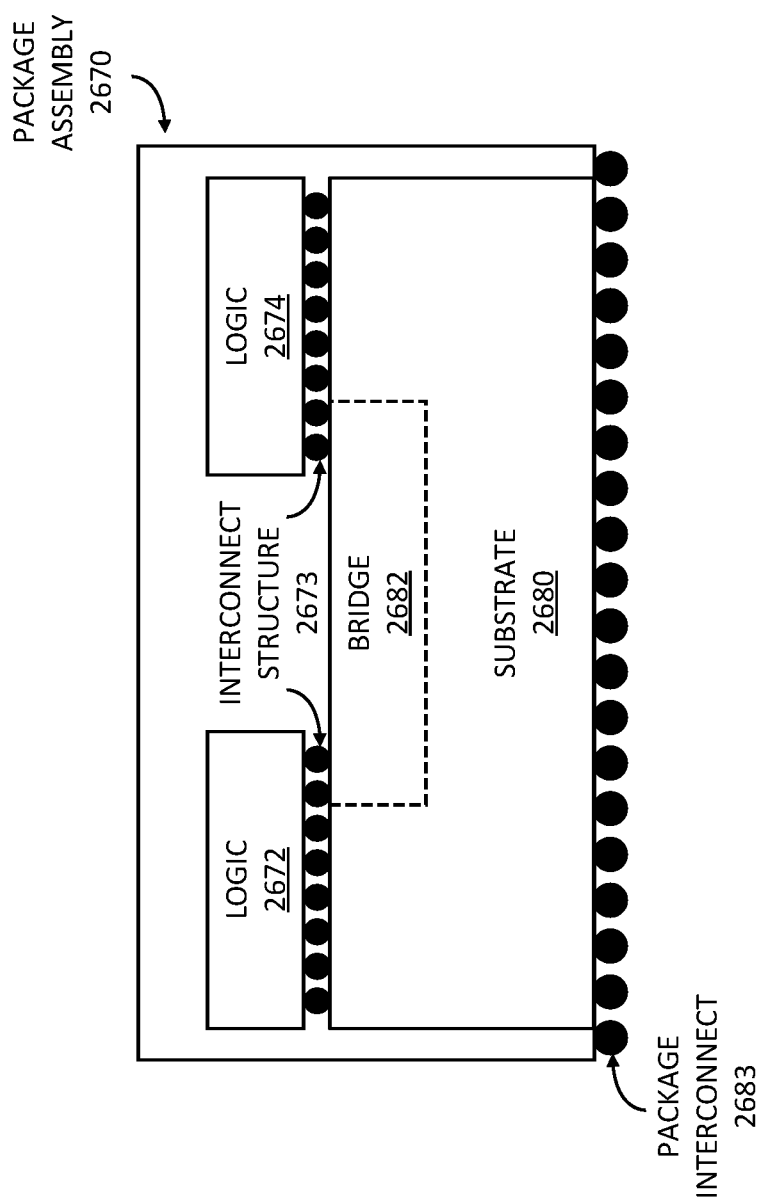
FIG. 26B is a cross-section side view of an example of an integrated circuit package assembly according to an embodiment.

FIG. 26B illustrates a cross-section side view of an integrated circuit package assembly 2670, according to some embodiments described herein. The integrated circuit package assembly 2670 illustrates an implementation of one or more processor or accelerator devices as described herein. The package assembly 2670 includes multiple units of hardware logic 2672, 2674 connected to a substrate 2680. The logic 2672, 2674 may be implemented at least partly in configurable logic or fixed-functionality logic hardware, and can include one or more portions of any of the processor core(s), graphics processor(s), or other accelerator devices described herein. Each unit of logic 2672, 2674 can be implemented within a semiconductor die and coupled with the substrate 2680 via an interconnect structure 2673. The interconnect structure 2673 may be configured to route electrical signals between the logic 2672, 2674 and the substrate 2680, and can include interconnects such as, but not limited to bumps or pillars. In some embodiments, the interconnect structure 2673 may be configured to route electrical signals such as, for example, input/output (I/O) signals and/or power or ground signals associated with the operation of the logic 2672, 2674. In some embodiments, the substrate 2680 is an epoxy-based laminate substrate. The package substrate 2680 may include other suitable types of substrates in other embodiments. The package assembly 2670 can be connected to other electrical devices via a package interconnect 2683. The package interconnect 2683 may be coupled to a surface of the substrate 2680 to route electrical signals to other electrical devices, such as a motherboard, other chipset, or multi-chip module.

In some embodiments, the units of logic 2672, 2674 are electrically coupled with a bridge 2682 that is configured to route electrical signals between the logic 2672, 2674. The bridge 2682 may be a dense interconnect structure that provides a route for electrical signals. The bridge 2682 may include a bridge substrate composed of glass or a suitable semiconductor material. Electrical routing features can be formed on the bridge substrate to provide a chip-to-chip connection between the logic 2672, 2674.

Although two units of logic 2672, 2674 and a bridge 2682 are illustrated, embodiments described herein may include more or fewer logic units on one or more dies. The one or more dies may be connected by zero or more bridges, as the bridge 2682 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

FIGS. 27-29B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

Figure 27:
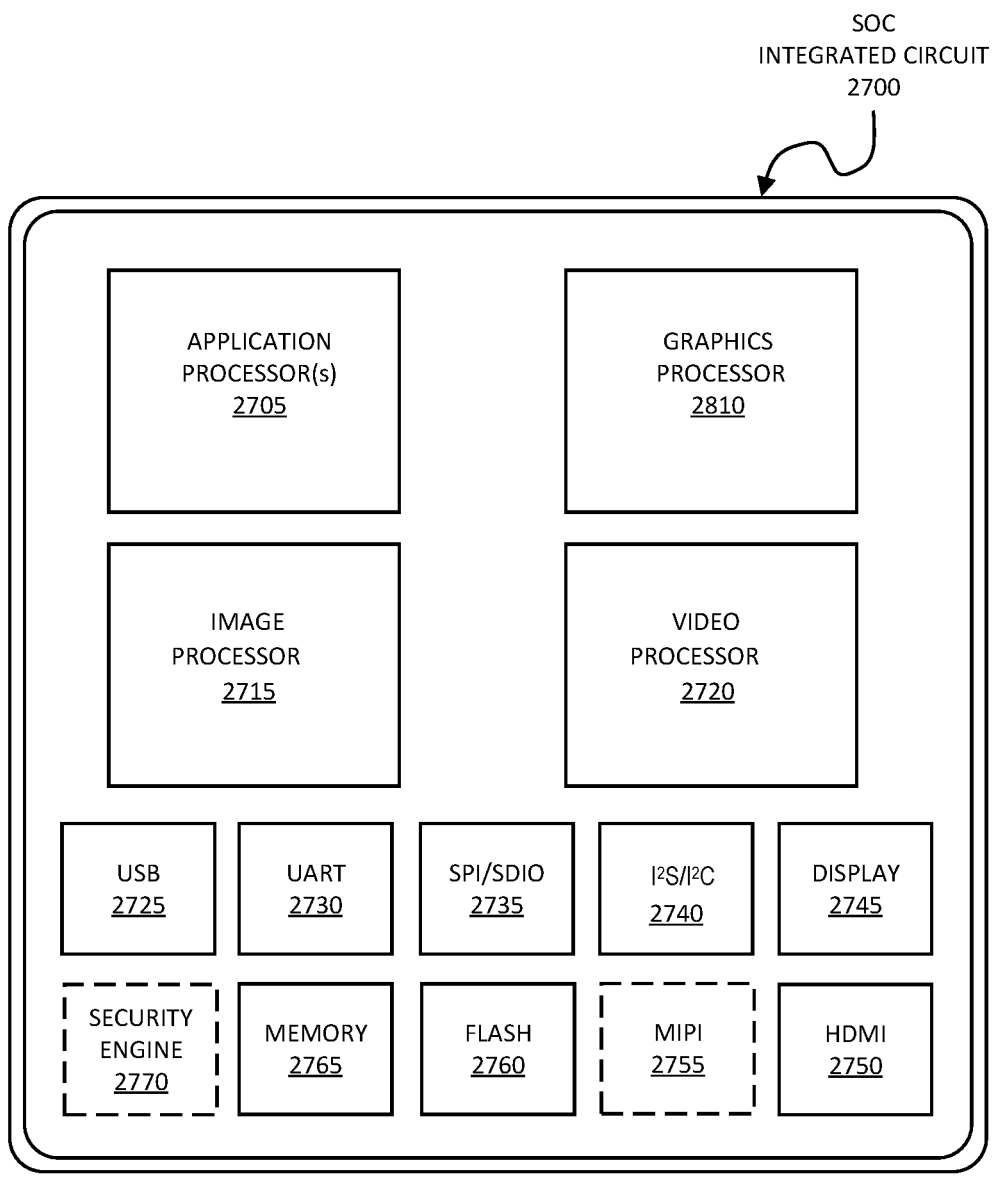
FIG. 27 is a block diagram of an example of a system on a chip integrated circuit according to an embodiment.

FIG. 27 is a block diagram illustrating an exemplary system on a chip integrated circuit 2700 that may be fabricated using one or more IP cores, according to an embodiment. Exemplary integrated circuit 2700 includes one or more application processor(s) 2705 (e.g., CPUs), at least one graphics processor 2710, and may additionally include an image processor 2715 and/or a video processor 2720, any of which may be a modular IP core from the same or multiple different design facilities. Integrated circuit 2700 includes peripheral or bus logic including a USB controller 2725, UART controller 2730, an SPI/SDIO controller 2735, and an I2S/I2C controller 2740. Additionally, the integrated circuit can include a display device 2745 coupled to one or more of a high-definition multimedia interface (HDMI)

controller 2750 and a mobile industry processor interface (MIPI) display interface 2755. Storage may be provided by a flash memory subsystem 2760 including flash memory and a flash memory controller. Memory interface may be provided via a memory controller 2765 for access to SDRAM or SRAM memory devices. Some integrated circuits additionally include an embedded security engine 2770.

Figure 28A:
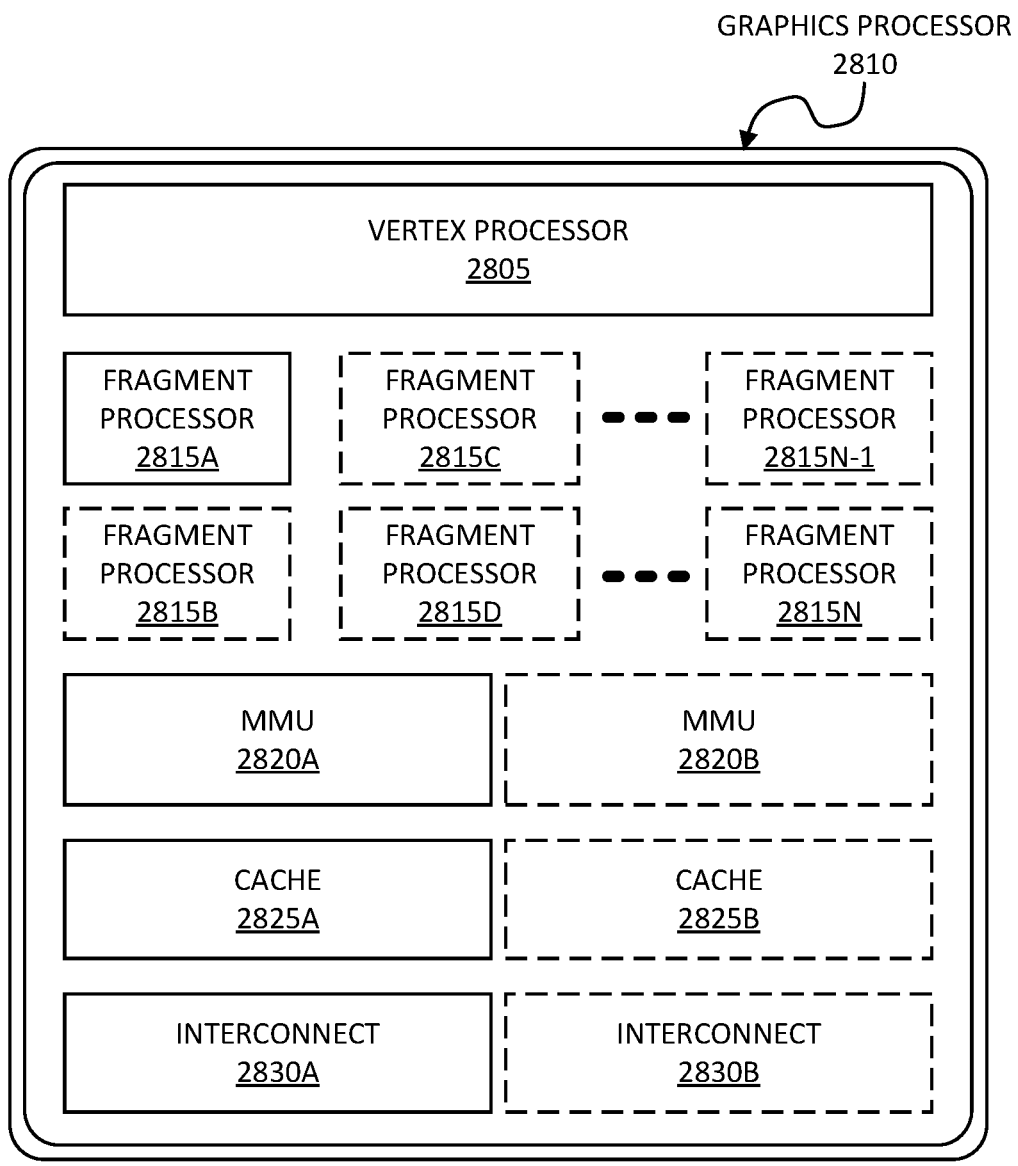
FIG. 28A is an illustration of an example of a head mounted display (HMD) system according to an embodiment.
Figure 28B:
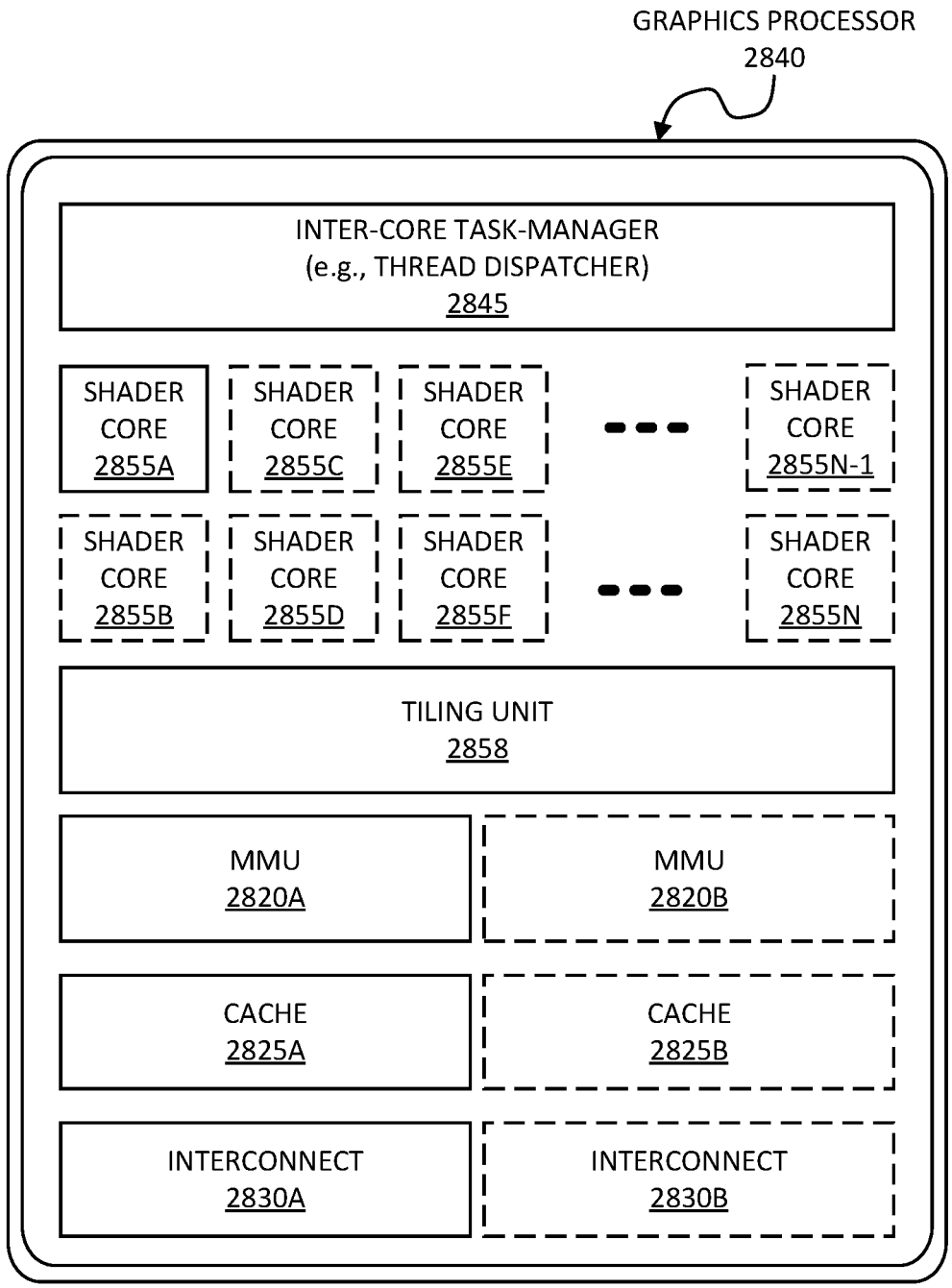
FIG. 28B is a block diagram of an example of a graphics processor according to an embodiment.

FIGS. 28A-28B are block diagrams illustrating exemplary graphics processors for use within an SoC, according to embodiments described herein. FIG. 28A illustrates an exemplary graphics processor 2810 of a system on a chip integrated circuit that may be fabricated using one or more IP cores, according to an embodiment. FIG. 28B illustrates an additional exemplary graphics processor 2840 of a system on a chip integrated circuit that may be fabricated using one or more IP cores, according to an embodiment. Graphics processor 2810 of FIG. 28A is an example of a low power graphics processor core. Graphics processor 2840 of FIG. 28B is an example of a higher performance graphics processor core. Each of the graphics processors 2810, 2840 can be variants of the graphics processor 2710 of FIG. 27.

As shown in FIG. 28A, graphics processor 2810 includes a vertex processor 2805 and one or more fragment processor(s) 2815A-2815N (e.g., 2815A, 2815B, 2815C, 2815D, through 2815N-1, and 2815N). Graphics processor 2810 can execute different shader programs via separate logic, such that the vertex processor 2805 is optimized to execute operations for vertex shader programs, while the one or more fragment processor(s) 2815A-2815N execute fragment (e.g., pixel) shading operations for fragment or pixel shader programs. The vertex processor 2805 performs the vertex processing stage of the 3D graphics pipeline and generates primitives and vertex data. The fragment processor(s) 2815A-2815N use the primitive and vertex data generated by the vertex processor 2805 to produce a framebuffer that is displayed on a display device. In one embodiment, the fragment processor(s) 2815A-2815N are optimized to execute fragment shader programs as provided for in the OpenGL API, which may be used to perform similar operations as a pixel shader program as provided for in the Direct 3D API.

Graphics processor 2810 additionally includes one or more memory management units (MMUs) 2820A-2820B, cache(s) 2825A-2825B, and circuit interconnect(s) 2830A-2830B. The one or more MMU(s) 2820A-2820B provide for virtual to physical address mapping for the graphics processor 2810, including for the vertex processor 2805 and/or fragment processor(s) 2815A-2815N, which may reference vertex or image/texture data stored in memory, in addition to vertex or image/texture data stored in the one or more cache(s) 2825A-2825B. In one embodiment the one or more MMU(s) 2820A-2820B may be synchronized with other MMUs within the system, including one or more MMUs associated with the one or more application processor(s) 2705, image processor 2715, and/or video processor 2720 of FIG. 27, such that each processor 2705-2720 can participate in a shared or unified virtual memory system. The one or more circuit interconnect(s) 2830A-2830B enable graphics processor 2810 to interface with other IP cores within the SoC, either via an internal bus of the SoC or via a direct connection, according to embodiments.

As shown FIG. 28B, graphics processor 2840 includes the one or more MMU(s) 2820A-2820B, caches 2825A-2825B, and circuit interconnects 2830A-2830B of the graphics processor 2810 of FIG. 28A. Graphics processor 2840 includes one or more shader core(s) 2855A-2855N (e.g., 2855A, 2855B, 2855C, 2855D, 2855E, 2855F, through 2855N-1, and 2855N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 2840 includes an inter-core task manager 2845, which acts as a thread dispatcher to dispatch execution threads to one or more shader cores 2855A-2855N and a tiling unit 2858 to accelerate tiling operations for tile-based rendering, in which rendering operations for a scene are subdivided in image space, for example to exploit local spatial coherence within a scene or to optimize use of internal caches.

Figure 29A:
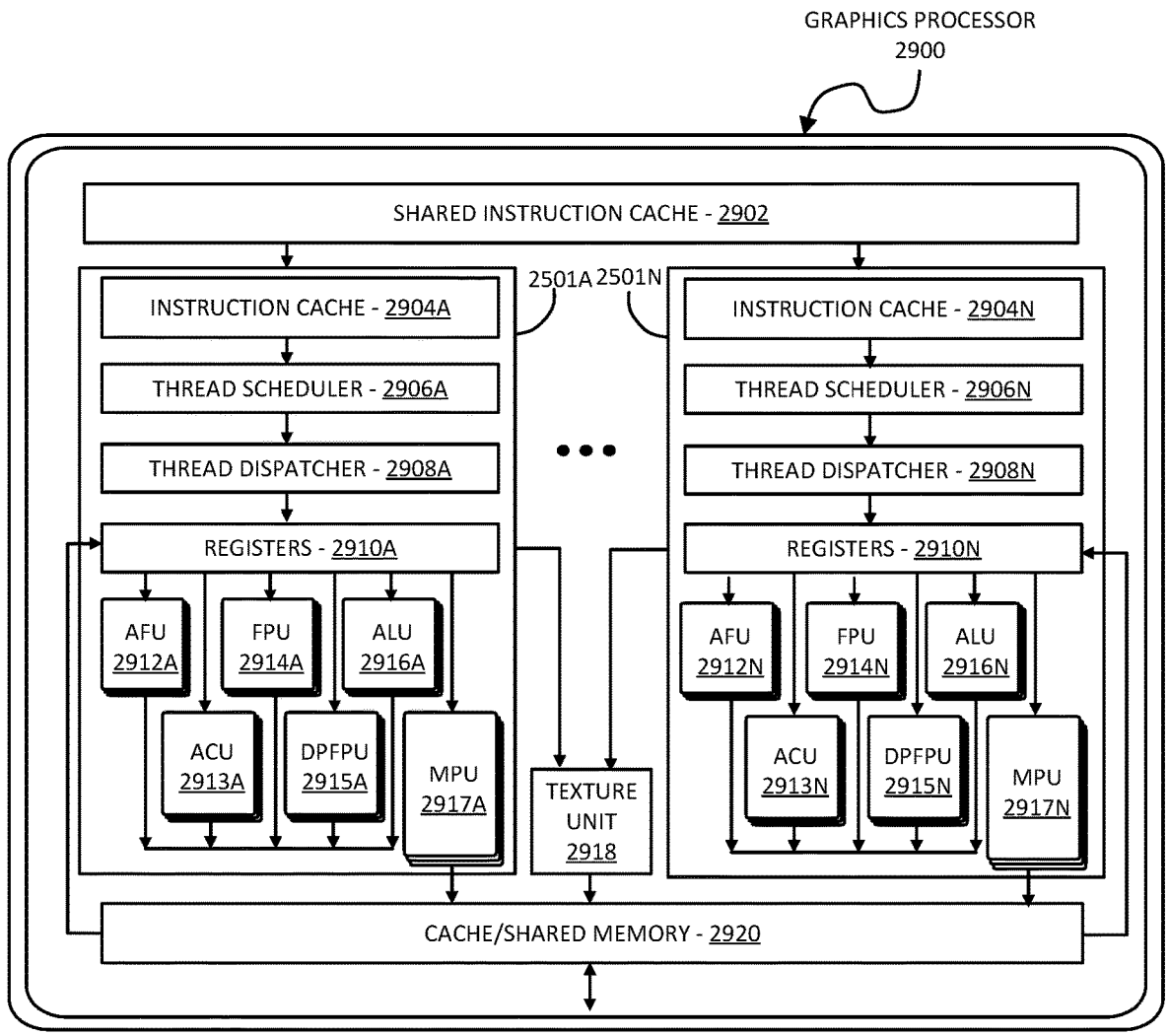
FIGS. 29A-29B are block diagrams examples of graphics processor logic according to embodiments.
Figure 29B:
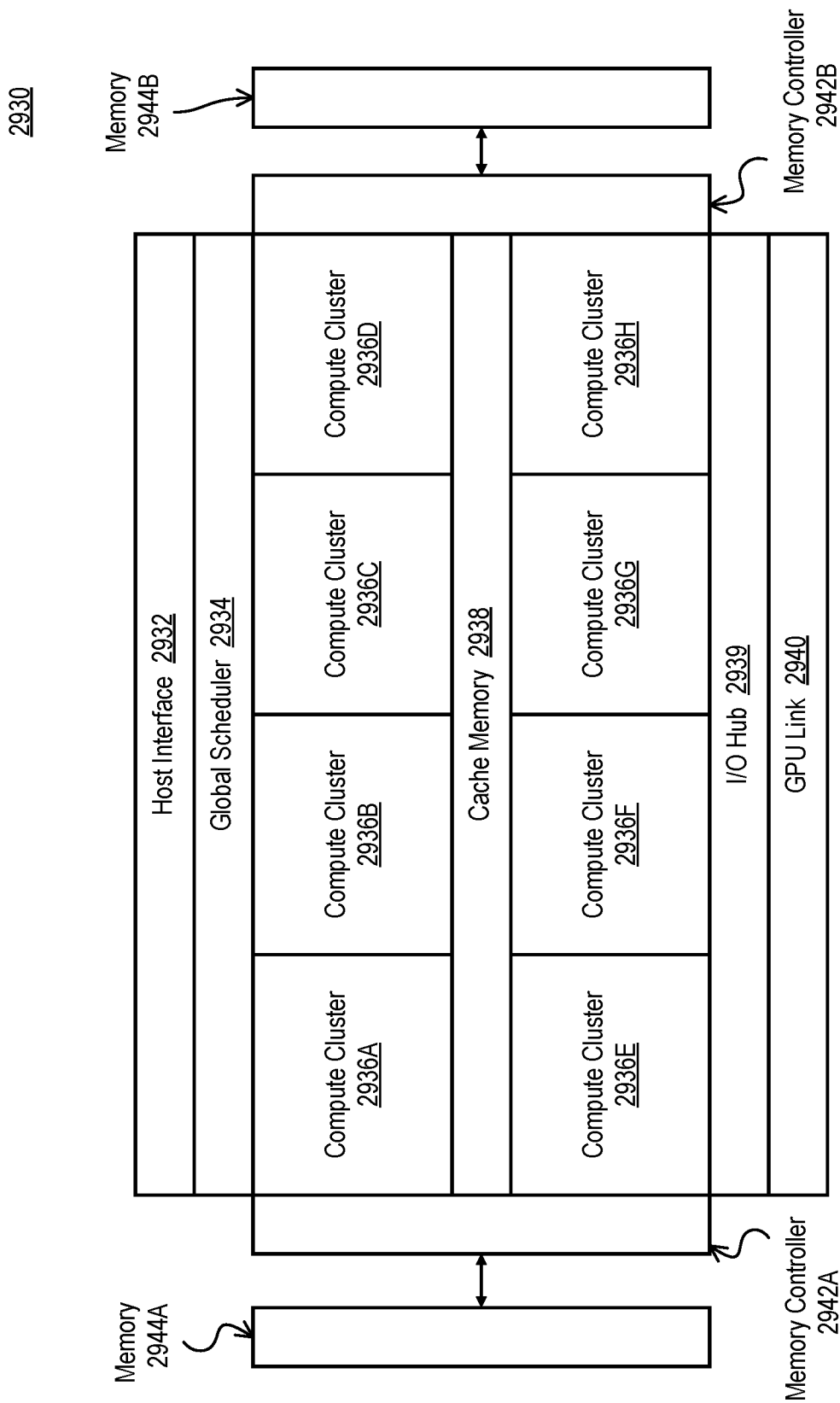

FIGS. 29A-29B illustrate additional exemplary graphics processor logic according to embodiments described herein. FIG. 29A illustrates a graphics core 2900 that may be included within the graphics processor 2710 of FIG. 27, and may be a unified shader core 2855A-2855N as in FIG. 28B. FIG. 29B illustrates a highly-parallel general-purpose graphics processing unit 2930 suitable for deployment on a multi-chip module.

As shown in FIG. 29A, the graphics core 2900 includes a shared instruction cache 2902, a texture unit 2918, and a cache/shared memory 2920 that are common to the execution resources within the graphics core 2900. The graphics core 2900 can include multiple slices 2901A-2901N or partition for each core, and a graphics processor can include multiple instances of the graphics core 2900. The slices 2901A-2901N can include support logic including a local instruction cache 2904A-2904N, a thread scheduler 2906A-2906N, a thread dispatcher 2908A-2908N, and a set of registers 2910A. To perform logic operations, the slices 2901A-2901N can include a set of additional function units (AFUs 2912A-2912N), floating-point units (FPU 2914A-2914N), integer arithmetic logic units (ALUs 2916-2916N), address computational units (ACU 2913A-2913N), double-precision floating-point units (DPFPU 2915A-2915N), and matrix processing units (MPU 2917A-2917N).

Some of the computational units operate at a specific precision. For example, the FPUs 2914A-2914N can perform single-precision (32-bit) and half-precision (16-bit) floating point operations, while the DPFPUs 2915A-2915N perform double precision (64-bit) floating point operations. The ALUs 2916A-2916N can perform variable precision integer operations at 8-bit, 16-bit, and 32-bit precision, and can be configured for mixed precision operations. The MPUs 2917A-2917N can also be configured for mixed precision matrix operations, including half-precision floating point and 8-bit integer operations. The MPUs 2917-2917N can perform a variety of matrix operations to accelerate machine learning application frameworks, including enabling support for accelerated general matrix to matrix multiplication (GEMM). The AFUs 2912A-2912N can perform additional logic operations not supported by the floating-point or integer units, including trigonometric operations (e.g., Sine, Cosine, etc.).

As shown in FIG. 29B, a general-purpose processing unit (GPGPU) 2930 can be configured to enable highly-parallel compute operations to be performed by an array of graphics processing units. Additionally, the GPGPU 2930 can be linked directly to other instances of the GPGPU to create a multi-GPU cluster to improve training speed for particularly deep neural networks. The GPGPU 2930 includes a host interface 2932 to enable a connection with a host processor. In one embodiment the host interface 2932 is a PCI Express interface. However, the host interface can also be a vendor specific communications interface or communications fabric. The GPGPU 2930 receives commands from the host processor and uses a global scheduler 2934 to distribute execution threads associated with those commands to a set of compute clusters 2936A-2936H. The compute clusters 2936A-2936H share a cache memory 2938. The cache memory 2938 can serve as a higher-level cache for cache memories within the compute clusters 2936A-2936H.

The GPGPU 2930 includes memory 2944A-2934B coupled with the compute clusters 2936A-2936H via a set of memory controllers 2942A-2942B. In various embodiments, the memory 2944A-2934B can include various types of memory devices including dynamic random access memory (DRAM) or graphics random access memory, such as synchronous graphics random access memory (SGRAM), including graphics double data rate (GDDR) memory.

In one embodiment the compute clusters 2936A-2936H each include a set of graphics cores, such as the graphics core 2900 of FIG. 29A, which can include multiple types of integer and floating point logic units that can perform computational operations at a range of precisions including suited for machine learning computations. For example and in one embodiment at least a subset of the floating point units in each of the compute clusters 2936A-2936H can be configured to perform 16-bit or 32-bit floating point operations, while a different subset of the floating point units can be configured to perform 64-bit floating point operations.

Multiple instances of the GPGPU 2930 can be configured to operate as a compute cluster. The communication mechanism used by the compute cluster for synchronization and data exchange varies across embodiments. In one embodiment the multiple instances of the GPGPU 2930 communicate over the host interface 2932. In one embodiment the GPGPU 2930 includes an I/O hub 2939 that couples the GPGPU 2930 with a GPU link 2940 that enables a direct connection to other instances of the GPGPU. In one embodiment the GPU link 2940 is coupled to a dedicated GPU-to-GPU bridge that enables communication and synchronization between multiple instances of the GPGPU 2930. In one embodiment the GPU link 2940 couples with a high speed interconnect to transmit and receive data to other GPGPUs or parallel processors. In one embodiment the multiple instances of the GPGPU 2930 are located in separate data processing systems and communicate via a network device that is accessible via the host interface 2932. In one embodiment the GPU link 2940 can be configured to enable a connection to a host processor in addition to or as an alternative to the host interface 2932.

While the illustrated configuration of the GPGPU 2930 can be configured to train neural networks, one embodiment provides alternate configuration of the GPGPU 2930 that can be configured for deployment within a high performance or low power inferencing platform. In an inferencing configuration the GPGPU 2930 includes fewer of the compute clusters 2936A-2936H relative to the training configuration. Additionally, the memory technology associated with the memory 2944A-2934B may differ between inferencing and training configurations, with higher bandwidth memory technologies devoted to training configurations. In one embodiment the inferencing configuration of the GPGPU 2930 can support inferencing specific instructions. For example, an inferencing configuration can provide support for one or more 8-bit integer dot product instructions, which are commonly used during inferencing operations for deployed neural networks.

Head-Mounted Display System Overview

Figure 30:
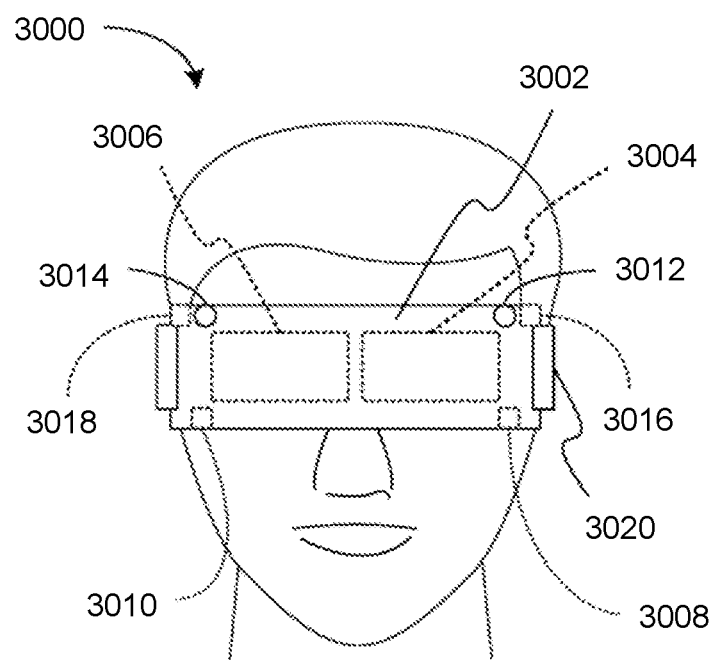
FIG. 30 is an illustration of an example of a head mounted display (HMD) system according to an embodiment.

FIG. 30 shows a head mounted display (HMD) system 3000 that is being worn by a user while experiencing an immersive environment such as, for example, a virtual reality (VR) environment, an augmented reality (AR) environment, a multi-player three-dimensional (3D) game, and so forth. In the illustrated example, one or more straps 3020 hold a frame 3002 of the HMD system 3000 in front of the eyes of the user. Accordingly, a left-eye display 3004 may be positioned to be viewed by the left eye of the user and a right-eye display 3006 may be positioned to be viewed by the right eye of the user. The left-eye display 3004 and the right-eye display 3006 may alternatively be integrated into a single display in certain examples such as, for example, a smart phone being worn by the user. In the case of AR, the displays 3004, 3006 may be view-through displays that permit the user to view the physical surroundings, with other rendered content (e.g., virtual characters, informational annotations, heads up display/HUD) being presented on top of a live feed of the physical surroundings.

In one example, the frame 3002 includes a left look-down camera 3008 to capture images from an area generally in front of the user and beneath the left eye (e.g., left hand gestures). Additionally, a right look-down camera 3010 may capture images from an area generally in front of the user and beneath the right eye (e.g., right hand gestures). The illustrated frame 3002 also includes a left look-front camera 3012 and a right look-front camera 3014 to capture images in front of the left and right eyes, respectively, of the user. The frame 3002 may also include a left look-side camera 3016 to capture images from an area to the left of the user and a right look-side camera 3018 to capture images from an area to the right of the user.

The images captured by the cameras 3008, 3010, 3012, 3014, 3016, 3018, which may have overlapping fields of view, may be used to detect gestures made by the user as well as to analyze and/or reproduce the external environment on the displays 3004, 3006. In one example, the detected gestures are used by a graphics processing architecture (e.g., internal and/or external) to render and/or control a virtual representation of the user in a 3D game. Indeed, the overlapping fields of view may enable the capture of gestures made by other individuals (e.g., in a multi-player game), where the gestures of other individuals may be further used to render/control the immersive experience. The overlapping fields of view may also enable the HMD system 3000 to automatically detect obstructions or other hazards near the user. Such an approach may be particularly advantageous in advanced driver assistance system (ADAS) applications.

In one example, providing the left look-down camera 3008 and the right look-down camera 3010 with overlapping fields of view provides a stereoscopic view having an increased resolution. The increased resolution may in turn enable very similar user movements to be distinguished from one another (e.g., at sub-millimeter accuracy). The result may be an enhanced performance of the HMD system 3000 with respect to reliability. Indeed, the illustrated solution may be useful in a wide variety of applications such as, for example, coloring information in AR settings, exchanging virtual tools/devices between users in a multi-user environment, rendering virtual items (e.g., weapons, swords, staffs), and so forth. Gestures of other objects, limbs and/or body parts may also be detected and used to render/control the virtual environment. For example, myelographic signals, electroencephalographic signals, eye tracking, breathing or puffing, hand motions, etc., may be tracked in real-time, whether from the wearer or another individual in a shared environment. The images captured by the cameras 3008, 3010, 3012, 3014, 3016, 3018, may also serve as contextual input. For example, it might be determined that the user is indicating a particular word to edit or key to press in a word processing application, a particular weapon to deployed or a travel direction in a game, and so forth.

Additionally, the images captured by the cameras 3008, 3010, 3012, 3014, 3016, 3018, may be used to conduct shared communication or networked interactivity in equipment operation, medical training, and/or remote/tele-operation guidance applications. Task specific gesture libraries or neural network machine learning could enable tool identification and feedback for a task. For example, a virtual tool that translates into remote, real actions may be enabled. In yet another example, the HMD system 3000 translates the manipulation of a virtual drill within a virtual scene to the remote operation of a drill on a robotic device deployed to search a collapsed building. Moreover, the HMD system 3000 may be programmable to the extent that it includes, for example, a protocol that enables the user to add a new gesture to a list of identifiable gestures associated with user actions.

In addition, the various cameras in the HMD 3000 may be configurable to detect spectrum frequencies in addition to the visible wavelengths of the spectrum. Multi-spectral imaging capabilities in the input cameras allows position tracking of the user and/or objects by eliminating nonessential image features (e.g., background noise). For example, in augmented reality (AR) applications such as surgery, instruments and equipment may be tracked by their infrared reflectivity without the need for additional tracking aids. Moreover, HMD 3000 could be employed in situations of low visibility where a "live feed" from the various cameras could be enhanced or augmented through computer analysis and displayed to the user as visual or audio cues.

The HMD system 3000 may also forego performing any type of data communication with a remote computing system or need power cables (e.g., independent mode of operation). In this regard, the HMD system 3000 may be a "cordless" device having a power unit that enables the HMD system 3000 to operate independently of external power systems. Accordingly, the user might play a full featured game without being tethered to another device (e.g., game console) or power supply. In a word processing example, the HMD system 3000 might present a virtual keyboard and/or virtual mouse on the displays 3004 and 3006 to provide a virtual desktop or word processing scene. Thus, gesture recognition data captured by one or more of the cameras may represent user typing activities on the virtual keyboard or movements of the virtual mouse. Advantages include, but are not limited to, ease of portability and privacy of the virtual desktop from nearby individuals. The underlying graphics processing architecture may support compression and/or decompression of video and audio signals. Moreover, providing separate images to the left eye and right eye of the user may facilitate the rendering, generation and/or perception of 3D scenes. The relative positions of the left-eye display 3004 and the right-eye display 3006 may also be adjustable to match variations in eye separation between different users.

The number of cameras illustrated in FIG. 30 is to facilitate discussion only. Indeed, the HMD system 3000 may include less than six or more than six cameras, depending on the circumstances.

The display 1120 (FIG. 11), the display assembly 1360 (FIG. 13) and/or the HMD system 3000 may include a light field display. In one example, the 3D graphics application 2510 (FIG. 25) performs processing block 628 (FIG. 6E) of the method 626 (FIG. 6E) and the user mode graphics driver 2526 (FIG. 25) performs processing block 1530 of the method 626 (FIG. 6E) to support the enhanced data formatting techniques described herein. Additionally, the graphics processing pipeline 500 (FIG. 5) may be modified to support the re-projection, foveation, hierarchical culling and image warping solutions described herein. Moreover, a tiling unit may be modified to populate tile bins as described herein.

ADDITIONAL NOTES AND EXAMPLES

Example 1 may include a performance-enhanced graphics apparatus comprising one or more substrates and logic coupled to the one or more substrates, wherein the logic is implemented in one or more of configurable logic or fixed-functionality hardware logic, the logic coupled to the one or more substrates to identify a pixel location with respect to a plurality of display planes, store image data associated with the pixel location and the plurality of display planes to adjacent memory locations, and simultaneously render the image data from the adjacent memory locations across the plurality of display planes.

Example 2 may include the apparatus of Example 1, wherein the logic coupled to the one or more substrates is to dispatch a single instruction multiple data (SIMD) instruction to a plurality of graphics execution units to simultaneously render the image data.

Example 3 may include the apparatus of Example 1, wherein the image data is to be further associated with a pixel subspan containing the pixel location.

Example 4 may include the apparatus of Example 1, wherein the logic coupled to the one or more substrates is to transpose the simultaneously rendered image data to a surface layout associated with the plurality of display planes.

Example 5 may include the apparatus of Example 1, wherein the adjacent memory locations are to be within a single cache line.

Example 6 may include the apparatus of Example 1, wherein the logic coupled to the one or more substrates is to render a source view associated with a first display plane in the plurality of display planes, re-project the rendered source view to a second display plane in the plurality of display planes to obtain a re-projected view, and fill one or more holes in the re-projected view based on one or more of extended field of view data corresponding to the source view, rasterization data corresponding to the source view or rasterization data corresponding to the re-projected view.

Example 7 may include the apparatus of Example 6, wherein when the one or more holes are filled based on the extended field of view data, the re-projected view has a non-extended field of view.

Example 8 may include the apparatus of Example 7, wherein when the one or more holes are filled based on the rasterization data corresponding to the source view, the logic coupled to the one or more substrates is to disable a depth test during rendering of the source view, and conduct the depth test during filling of the one or more holes in the re-projected view.

Example 9 may include the apparatus of Example 7, wherein when the one or more holes are filled based on the rasterization data corresponding to the re-projected view, the logic coupled to the one or more substrates is to pre-populate a depth buffer during re-projection of the rendered source view, and conduct a depth test during filling of the one or more holes based on data in the depth buffer.

Example 10 may include the apparatus of Example 1, wherein the logic coupled to the one or more substrates is to determine a focus point relative to the plurality of display planes, and vary, on a per display plane basis, a resolution of scene content presented on the plurality of display planes based on the focus point.

Example 11 may include the apparatus of Example 10, wherein the logic coupled to the one or more substrates is to vary, on the per display plane basis, a view density of the scene content presented on the plurality of display planes based on the focus point.

Example 12 may include the apparatus of Example 10, wherein the logic coupled to the one or more substrates is to vary, on the per display plane basis, a view update frequency of the scene content presented on the plurality of display planes based on the focus point.

Example 13 may include the apparatus of Example 10, wherein the logic coupled to the one or more substrates is to separate peripheral views into bins having one or more of different resolutions, different view densities or different update frequencies.

Example 14 may include the apparatus of Example 1, wherein the logic coupled to the one or more substrates is to determine a set of primitives associated with the plurality of display planes, and conduct a hierarchical sequence of culling operations on the set of primitives.

Example 15 may include the apparatus of Example 14, wherein the hierarchical sequence of culling operations is to include a near plane-far plane culling operation that rejects primitives behind a farthest display plane in the plurality of display planes and rejects primitives in front of a nearest display plane in the plurality of display planes.

Example 16 may include the apparatus of Example 15, wherein the hierarchical sequence of culling operations is to include a coarse frustum culling operation that is conducted on a per eye basis and after the near plane-far plane culling operation, and wherein the coarse frustum culling operation is to reject primitives outside a top frustum plane of a topmost viewport, a bottom frustum plane of a bottommost viewport, a left frustum plane of a leftmost viewport and a right frustum plane of a rightmost viewport.

Example 17 may include the apparatus of Example 16, wherein the hierarchical sequence of culling operations is to include a fine frustum culling operation that is conducted after the coarse frustum culling operation, and wherein the logic coupled to the one or more substrates is to populate one or more tile bins with primitives that pass the fine frustum culling operation.

Example 18 may include the apparatus of Example 1, wherein the logic coupled to the one or more substrates is to identify first image data associated with scene content on a first display plane in the plurality of display planes, identify a first position change between the scene content on the first display plane and the scene content on a second display plane in the plurality of display planes, and approximate, based on the first image data and the first position change, second image data associated with the scene content on the second display plane.

Example 19 may include the apparatus of Example 18, wherein the logic coupled to the one or more substrates is to identify a second position change between the scene content on the first display plane and the scene content on a third display plane in the plurality of display planes, and approximate, based on the first image data and the second position change, third image data associated with the scene content on the third display plane.

Example 20 may include an apparatus comprising one or more substrates, and logic coupled to the one or more substrates, wherein the logic is implemented in one or more of configurable logic or fixed-functionality hardware logic, the logic coupled to the one or more substrates to render a source view associated with a first display plane in a plurality of display planes, re-project the rendered source view to a second display plane in the plurality of display planes to obtain a re-projected view, and fill one or more holes in the re-projected view based on one or more of extended field of view data corresponding to the source view, rasterization data corresponding to the source view or rasterization data corresponding to the re-projected view.

Example 21 may include the apparatus of Example 20, wherein when the one or more holes are filled based on the extended field of view data, the re-projected view has a non-extended field of view.

Example 22 may include the apparatus of Example 20, wherein when the one or more holes are filled based on the rasterization data corresponding to the source view, the logic coupled to the one or more substrates is to disable a depth test during rendering of the source view, and conduct the depth test during filling of the one or more holes in the re-projected view.

Example 23 may include the apparatus of Example 20, wherein when the one or more holes are filled based on the rasterization data corresponding to the re-projected view, the logic coupled to the one or more substrates is to pre-populate a depth buffer during re-projection of the rendered source view, and conduct a depth test during filling of the one or more holes based on data in the depth buffer.

Example 24 may include the apparatus of Example 20, wherein the logic coupled to the one or more substrates is to determine a focus point relative to the plurality of display planes, and vary, on a per display plane basis, a resolution of scene content presented on the plurality of display planes based on the focus point.

Example 25 may include the apparatus of Example 24, wherein the logic coupled to the one or more substrates is to vary, on the per display plane basis, a view density of the scene content presented on the plurality of display planes based on the focus point.

Example 26 may include the apparatus of Example 24, wherein the logic coupled to the one or more substrates is to vary, on the per display plane basis, a view update frequency of the scene content presented on the plurality of display planes based on the focus point.

Example 27 may include the apparatus of Example 24, wherein the logic coupled to the one or more substrates is to separate peripheral views into bins having one or more of different resolutions, different view densities or different update frequencies.

Example 28 may include the apparatus of Example 20, wherein the logic coupled to the one or more substrates is to determine a set of primitives associated with the plurality of display planes, and conduct a hierarchical sequence of culling operations on the set of primitives.

Example 29 may include the apparatus of Example 28, wherein the hierarchical sequence of culling operations is to include a near plane-far plane culling operation that rejects primitives behind a farthest display plane in the plurality of display planes and rejects primitives in front of a nearest display plane in the plurality of display planes.

Example 30 may include the apparatus of Example 29, wherein the hierarchical sequence of culling operations is to include a coarse frustum culling operation that is conducted on a per eye basis and after the near plane-far plane culling operation, and wherein the coarse frustum culling operation is to reject primitives outside a top frustum plane of a topmost viewport, a bottom frustum plane of a bottommost viewport, a left frustum plane of a leftmost viewport and a right frustum plane of a rightmost viewport.

Example 31 may include the apparatus of Example 30, wherein the hierarchical sequence of culling operations is to include a fine frustum culling operation that is conducted after the coarse frustum culling operation, and wherein the logic coupled to the one or more substrates is to populate one or more tile bins with primitives that pass the fine frustum culling operation.

Example 32 may include the apparatus of Example 20, wherein the logic coupled to the one or more substrates is to identify first image data associated with scene content on a first display plane in the plurality of display planes, identify a first position change between the scene content on the first display plane and the scene content on a second display plane in the plurality of display planes, and approximate, based on the first image data and the first position change, second image data associated with the scene content on the second display plane.

Example 33 may include the apparatus of Example 32, wherein the logic coupled to the one or more substrates is to identify a second position change between the scene content on the first display plane and the scene content on a third display plane in the plurality of display planes, and approximate, based on the first image data and the second position change, third image data associated with the scene content on the third display plane.

Example 34 may include an apparatus comprising one or more substrates, and logic coupled to the one or more substrates, wherein the logic is implemented in one or more of configurable logic or fixed-functionality hardware logic, the logic coupled to the one or more substrates to determine a focus point relative to a plurality of display planes, and vary, on a per display plane basis, a resolution of scene content presented on the plurality of display planes based on the focus point.

Example 35 may include the apparatus of Example 34, wherein the logic coupled to the one or more substrates is to vary, on the per display plane basis, a view density of the scene content presented on the plurality of display planes based on the focus point.

Example 36 may include the apparatus of Example 34, wherein the logic coupled to the one or more substrates is to vary, on the per display plane basis, a view update frequency of the scene content presented on the plurality of display planes based on the focus point.

Example 37 may include the apparatus of Example 34, wherein the logic coupled to the one or more substrates is to separate peripheral views into bins having one or more of different resolutions, different view densities or different update frequencies.

Example 38 may include the apparatus of Example 34, wherein the logic coupled to the one or more substrates is to determine a set of primitives associated with the plurality of display planes, and conduct a hierarchical sequence of culling operations on the set of primitives.

Example 39 may include the apparatus of Example 38, wherein the hierarchical sequence of culling operations is to include a near plane-far plane culling operation that rejects primitives behind a farthest display plane in the plurality of display planes and rejects primitives in front of a nearest display plane in the plurality of display planes.

Example 40 may include the apparatus of Example 39, wherein the hierarchical sequence of culling operations is to include a coarse frustum culling operation that is conducted on a per eye basis and after the near plane-far plane culling operation, and wherein the coarse frustum culling operation is to reject primitives outside a top frustum plane of a topmost viewport, a bottom frustum plane of a bottommost viewport, a left frustum plane of a leftmost viewport and a right frustum plane of a rightmost viewport.

Example 41 may include the apparatus of Example 40, wherein the hierarchical sequence of culling operations is to include a fine frustum culling operation that is conducted after the coarse frustum culling operation, and wherein the logic coupled to the one or more substrates is to populate one or more tile bins with primitives that pass the fine frustum culling operation.

Example 42 may include the apparatus of Example 34, wherein the logic coupled to the one or more substrates is to identify first image data associated with the scene content on a first display plane in the plurality of display planes, identify a first position change between the scene content on the first display plane and the scene content on a second display plane in the plurality of display planes, and approximate, based on the first image data and the first position change, second image data associated with the scene content on the second display plane.

Example 43 may include the apparatus of Example 42, wherein the logic coupled to the one or more substrates is to identify a second position change between the scene content on the first display plane and the scene content on a third display plane in the plurality of display planes, and approximate, based on the first image data and the second position change, third image data associated with the scene content on the third display plane.

Example 44 may include an apparatus comprising one or more substrates, and logic coupled to the one or more substrates, wherein the logic is implemented in one or more of configurable logic or fixed-functionality hardware logic, the logic coupled to the one or more substrates to determine a set of primitives associated with a plurality of display planes, and conduct a hierarchical sequence of culling operations on the set of primitives.

Example 45 may include the apparatus of Example 44, wherein the hierarchical sequence of culling operations is to include a near plane-far plane culling operation that rejects primitives behind a farthest display plane in the plurality of display planes and rejects primitives in front of a nearest display plane in the plurality of display planes.

Example 46 may include the apparatus of Example 45, wherein the hierarchical sequence of culling operations is to include a coarse frustum culling operation that is conducted on a per eye basis and after the near plane-far plane culling operation, and wherein the coarse frustum culling operation is to reject primitives outside a top frustum plane of a topmost viewport, a bottom frustum plane of a bottommost viewport, a left frustum plane of a leftmost viewport and a right frustum plane of a rightmost viewport.

Example 47 may include the apparatus of Example 46, wherein the hierarchical sequence of culling operations is to include a fine frustum culling operation that is conducted after the coarse frustum culling operation, and wherein the logic coupled to the one or more substrates is to populate one or more tile bins with primitives that pass the fine frustum culling operation.

Example 48 may include the apparatus of Example 44, wherein the logic coupled to the one or more substrates to identify first image data associated with scene content on a first display plane in the plurality of display planes, identify a first position change between the scene content on the first display plane and the scene content on a second display plane in the plurality of display planes, and approximate, based on the first image data and the first position change, second image data associated with the scene content on the second display plane.

Example 49 may include the apparatus of Example 48, wherein the logic coupled to the one or more substrates is to identify a second position change between the scene content on the first display plane and the scene content on a third display plane in the plurality of display planes, and approximate, based on the first image data and the second position change, third image data associated with the scene content on the third display plane.

Example 50 may include an apparatus comprising one or more substrates, and logic coupled to the one or more substrates, wherein the logic is implemented in one or more of configurable logic or fixed-functionality hardware logic, the logic coupled to the one or more substrates to identify first image data associated with scene content on a first display plane in a plurality of display planes, identify a first position change between the scene content on the first display plane and the scene content on a second display plane in the plurality of display planes, and approximate, based on the first image data and the first position change, second image data associated with the scene content on the second display plane.

Example 51 may include the apparatus of Example 50, wherein the logic coupled to the one or more substrates is to identify a second position change between the scene content on the first display plane and the scene content on a third display plane in the plurality of display planes, and approximate, based on the first image data and the second position change, third image data associated with the scene content on the third display plane.

Example 52 may include a method of operating a performance-enhanced graphics apparatus, comprising identifying a pixel location with respect to a plurality of display planes, storing image data associated with the pixel location and the plurality of display planes to adjacent memory locations, and simultaneously rendering the image data from the adjacent memory locations across the plurality of display planes.

Example 53 may include the method of Example 52, further including dispatching a single instruction multiple data (SIMD) instruction to a plurality of graphics execution units to simultaneously rendering the image data.

Example 54 may include the method of Example 52, wherein the image data is further associated with a pixel subspan containing the pixel location.

Example 55 may include the method of Example 52, further including transposing the simultaneously rendered image data to a surface layout associated with the plurality of display planes.

Example 56 may include the method of Example 52, wherein the adjacent memory locations are within a single cache line.

Example 57 may include the method of Example 52, further including rendering a source view associated with a first display plane in the plurality of display planes, re-projecting the rendered source view to a second display plane in the plurality of display planes to obtain a re-projected view, and filling one or more holes in the re-projected view based on one or more of extended field of view data corresponding to the source view, rasterization data corresponding to the source view or rasterization data corresponding to the re-projected view.

Example 58 may include the method of Example 57, wherein when the one or more holes are filled based on the extended field of view data, the re-projected view has a non-extended field of view.

Example 59 may include the method of Example 58, wherein when the one or more holes are filled based on the rasterization data corresponding to the source view, the method further includes disabling a depth test during rendering of the source view, and conducting the depth test during filling of the one or more holes in the re-projected view.

Example 60 may include the method of Example 58, wherein when the one or more holes are filled based on the rasterization data corresponding to the re-projected view, the method further includes pre-populating a depth buffer during re-projection of the rendered source view, and conducting a depth test during filling of the one or more holes based on data in the depth buffer.

Example 61 may include the method of Example 52, further including determining a focus point relative to the plurality of display planes, and varying, on a per display plane basis, a resolution of scene content presented on the plurality of display planes based on the focus point.

Example 62 may include the method of Example 61, wherein the method further includes varying, on the per display plane basis, a view density of the scene content presented on the plurality of display planes based on the focus point.

Example 63 may include the method of Example 61, wherein the method further includes varying, on the per display plane basis, a view update frequency of the scene content presented on the plurality of display planes based on the focus point.

Example 64 may include the method of Example 61, wherein the method further includes separating peripheral views into bins having one or more of different resolutions, different view densities or different update frequencies.

Example 65 may include the method of Example 52, further including determining a set of primitives associated with the plurality of display planes, and conducting a hierarchical sequence of culling operations on the set of primitives.

Example 66 may include the method of Example 65, wherein the hierarchical sequence of culling operations includes a near plane-far plane culling operation that rejects primitives behind a farthest display plane in the plurality of display planes and rejects primitives in front of a nearest display plane in the plurality of display planes.

Example 67 may include the method of Example 66, wherein the hierarchical sequence of culling operations includes a coarse frustum culling operation that is conducted on a per eye basis and after the near plane-far plane culling operation, and wherein the coarse frustum culling operation is to reject primitives outside a top frustum plane of a topmost viewport, a bottom frustum plane of a bottommost viewport, a left frustum plane of a leftmost viewport and a right frustum plane of a rightmost viewport.

Example 68 may include the method of Example 67, wherein the hierarchical sequence of culling operations includes a fine frustum culling operation that is conducted after the coarse frustum culling operation, and wherein the logic coupled to the one or more substrates is to populate one or more tile bins with primitives that pass the fine frustum culling operation.

Example 69 may include the method of Example 52, further including identifying first image data associated with scene content on a first display plane in the plurality of display planes, identifying a first position change between the scene content on the first display plane and the scene content on a second display plane in the plurality of display planes, and approximating, based on the first image data and the first position change, second image data associated with the scene content on the second display plane.

Example 70 may include the method of Example 69, further including identifying a second position change between the scene content on the first display plane and the scene content on a third display plane in the plurality of display planes, and approximating, based on the first image data and the second position change, third image data associated with the scene content on the third display plane.

Example 71 may include a method of operating a performance-enhanced apparatus, comprising rendering a source view associated with a first display plane in a plurality of display planes, re-projecting the rendered source view to a second display plane in the plurality of display planes to obtain a re-projected view, and filling one or more holes in the re-projected view based on one or more of extended field of view data corresponding to the source view, rasterization data corresponding to the source view or rasterization data corresponding to the re-projected view.

Example 72 may include the method of Example 71, wherein when the one or more holes are filled based on the extended field of view data, the re-projected view has a non-extended field of view.

Example 73 may include the method of Example 71, wherein when the one or more holes are filled based on the rasterization data corresponding to the source view, the method further includes disabling a depth test during rendering of the source view, and conducting the depth test during filling of the one or more holes in the re-projected view.

Example 74 may include the method of Example 71, wherein when the one or more holes are filled based on the rasterization data corresponding to the re-projected view, the method further includes pre-populating a depth buffer during re-projection of the rendered source view, and conducting a depth test during filling of the one or more holes based on data in the depth buffer.

Example 75 may include the method of Example 71, further including determining a focus point relative to the plurality of display planes, and varying, on a per display plane basis, a resolution of scene content presented on the plurality of display planes based on the focus point.

Example 76 may include the method of Example 75, wherein the method further includes varying, on the per display plane basis, a view density of the scene content presented on the plurality of display planes based on the focus point.

Example 77 may include the method of Example 75, wherein the method further includes varying, on the per display plane basis, a view update frequency of the scene content presented on the plurality of display planes based on the focus point.

Example 78 may include the method of Example 75, wherein the method further includes separating peripheral views into bins having one or more of different resolutions, different view densities or different update frequencies.

Example 79 may include the method of Example 71, further including determining a set of primitives associated with the plurality of display planes, and conducting a hierarchical sequence of culling operations on the set of primitives.

Example 80 may include the method of Example 79, wherein the hierarchical sequence of culling operations includes a near plane-far plane culling operation that rejects primitives behind a farthest display plane in the plurality of display planes and rejects primitives in front of a nearest display plane in the plurality of display planes.

Example 81 may include the method of Example 80, wherein the hierarchical sequence of culling operations includes a coarse frustum culling operation that is conducted on a per eye basis and after the near plane-far plane culling operation, and wherein the coarse frustum culling operation is to reject primitives outside a top frustum plane of a topmost viewport, a bottom frustum plane of a bottommost viewport, a left frustum plane of a leftmost viewport and a right frustum plane of a rightmost viewport.

Example 82 may include the method of Example 81, wherein the hierarchical sequence of culling operations includes a fine frustum culling operation that is conducted after the coarse frustum culling operation, and wherein the logic coupled to the one or more substrates is to populate one or more tile bins with primitives that pass the fine frustum culling operation.

Example 83 may include the method of Example 71, further including identifying first image data associated with scene content on a first display plane in the plurality of display planes, identifying a first position change between the scene content on the first display plane and the scene content on a second display plane in the plurality of display planes, and approximating, based on the first image data and the first position change, second image data associated with the scene content on the second display plane.

Example 84 may include the method of Example 83, further including identifying a second position change between the scene content on the first display plane and the scene content on a third display plane in the plurality of display planes, and approximating, based on the first image data and the second position change, third image data associated with the scene content on the third display plane.

Example 85 may include a method of operating a performance-enhanced apparatus, comprising determining a focus point relative to a plurality of display planes, and varying, on a per display plane basis, a resolution of scene content presented on the plurality of display planes based on the focus point.

Example 86 may include the method of Example 85, wherein the method further includes varying, on the per display plane basis, a view density of the scene content presented on the plurality of display planes based on the focus point.

Example 87 may include the method of Example 85, wherein the method further includes varying, on the per display plane basis, a view update frequency of the scene content presented on the plurality of display planes based on the focus point.

Example 88 may include the method of Example 85, wherein the method further includes separating peripheral views into bins having one or more of different resolutions, different view densities or different update frequencies.

Example 89 may include the method of Example 85, further including determining a set of primitives associated with the plurality of display planes, and conducting a hierarchical sequence of culling operations on the set of primitives.

Example 90 may include the method of Example 89, wherein the hierarchical sequence of culling operations includes a near plane-far plane culling operation that rejects primitives behind a farthest display plane in the plurality of display planes and rejects primitives in front of a nearest display plane in the plurality of display planes.

Example 91 may include the method of Example 90, wherein the hierarchical sequence of culling operations includes a coarse frustum culling operation that is conducted on a per eye basis and after the near plane-far plane culling operation, and wherein the coarse frustum culling operation is to reject primitives outside a top frustum plane of a topmost viewport, a bottom frustum plane of a bottommost viewport, a left frustum plane of a leftmost viewport and a right frustum plane of a rightmost viewport.

Example 92 may include the method of Example 91, wherein the hierarchical sequence of culling operations includes a fine frustum culling operation that is conducted after the coarse frustum culling operation, and wherein the logic coupled to the one or more substrates is to populate one or more tile bins with primitives that pass the fine frustum culling operation.

Example 93 may include the method of Example 85, further including identifying first image data associated with the scene content on a first display plane in the plurality of display planes, identifying a first position change between the scene content on the first display plane and the scene content on a second display plane in the plurality of display planes, and approximating, based on the first image data and the first position change, second image data associated with the scene content on the second display plane.

Example 94 may include the method of Example 93, further including identifying a second position change between the scene content on the first display plane and the scene content on a third display plane in the plurality of display planes, and approximating, based on the first image data and the second position change, third image data associated with the scene content on the third display plane.

Example 95 may include a method of operating a performance-enhanced apparatus, comprising determining a set of primitives associated with a plurality of display planes, and conducting a hierarchical sequence of culling operations on the set of primitives.

Example 96 may include the method of Example 95, wherein the hierarchical sequence of culling operations includes a near plane-far plane culling operation that rejects primitives behind a farthest display plane in the plurality of display planes and rejects primitives in front of a nearest display plane in the plurality of display planes.

Example 97 may include the method of Example 96, wherein the hierarchical sequence of culling operations includes a coarse frustum culling operation that is conducted on a per eye basis and after the near plane-far plane culling operation, and wherein the coarse frustum culling operation is to reject primitives outside a top frustum plane of a topmost viewport, a bottom frustum plane of a bottommost viewport, a left frustum plane of a leftmost viewport and a right frustum plane of a rightmost viewport.

Example 98 may include the method of Example 97, wherein the hierarchical sequence of culling operations includes a fine frustum culling operation that is conducted after the coarse frustum culling operation, and wherein the logic coupled to the one or more substrates is to populate one or more tile bins with primitives that pass the fine frustum culling operation.

Example 99 may include the method of Example 95, wherein the logic coupled to the one or more substrates to identifying first image data associated with scene content on a first display plane in the plurality of display planes, identifying a first position change between the scene content on the first display plane and the scene content on a second display plane in the plurality of display planes, and approximating, based on the first image data and the first position change, second image data associated with the scene content on the second display plane.

Example 100 may include the method of Example 98, further including identifying a second position change between the scene content on the first display plane and the scene content on a third display plane in the plurality of display planes, and approximating, based on the first image data and the second position change, third image data associated with the scene content on the third display plane.

Example 101 may include a method of operating a performance-enhanced apparatus, comprising identifying first image data associated with scene content on a first display plane in a plurality of display planes, identifying a first position change between the scene content on the first display plane and the scene content on a second display plane in the plurality of display planes, and approximating, based on the first image data and the first position change, second image data associated with the scene content on the second display plane.

Example 102 may include the method of Example 101, further including identifying a second position change between the scene content on the first display plane and the scene content on a third display plane in the plurality of display planes, and approximating, based on the first image data and the second position change, third image data associated with the scene content on the third display plane.

Example 103 may include a performance-enhanced graphics apparatus comprising means for performing any one of the methods of Examples 52 to 102.

Example 104 may include at least one computer readable storage medium comprising a set of instructions, which when executed by a computing system, cause the computing system to perform the method of any one of Examples 52 to 102.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

As used in this application and in the claims, a list of items joined by the term "one or more of" may mean any combination of the listed terms. For example, the phrases "one or more of A, B or C" may mean A, B, C; A and B; A and C; B and C; or A, B and C.

The embodiments have been described above with reference to specific embodiments. Persons skilled in the art, however, will understand that various modifications and changes may be made thereto without departing from the broader spirit and scope of the embodiments as set forth in the appended claims. The foregoing description and drawings are, accordingly, to be regarded in an illustrative rather than a restrictive sense.

What is claimed is:

1. A computing system comprising:
   a graphics processor;
   a central processing unit; and
   a memory including a set of instructions, which when executed by one or more of the graphics processor or the central processing unit, cause the computing system to:
   determine a first plurality of primitives associated with a scene;
   reject a first primitive from the first plurality of primitives that is behind a first display plane to generate a second plurality of primitives;
   reject a second primitive that is in front of a second display plane to generate the second plurality of primitives;
   reject a third primitive of the second plurality of primitives based on a plurality of frustum planes to generate a third plurality of primitives; and
   execute fine frustum culling operations to assign the third plurality of primitives to one or more of left tile bins associated with a left eye of a user or right tile bins associated with a right eye of the user.

2. The system of claim 1, wherein the first display plane is a display plane that is farthest from the user, and the second display plane is a display plane that is closest to the user.

3. The system of claim 1, wherein the instructions, when executed, cause the computing system to:
   execute, on a per eye basis, a coarse frustum culling operation on the second plurality of primitives, wherein the coarse frustum culling operation includes the rejection of the third primitive based on the plurality of frustum planes to generate the third plurality of primitives.

4. The system of claim 1, wherein the instructions, when executed, cause the computing system to:
   determine a left frustum plane for a left viewport associated with the left eye of the user;
   determine a right frustum plane for a right viewport associated with the right eye of the user;
   determine a top frustum plane of a top viewport; and
   determine a bottom frustum plane of a bottom viewport, wherein the plurality of frustum planes includes the left frustum plane, the right frustum plane, the top frustum plane and the bottom frustum plane.

5. The system of claim 1, wherein to reject the third primitive of the second plurality of primitives, the instructions, when executed, cause the computing system to:
   determine that the third primitive will be rejected based on distances between vertices of the third primitive and each of a top frustum plane of the plurality of frustum planes, a bottom frustum plane of the plurality of frustum planes, a left frustum plane of the plurality of frustum planes and a right frustum plane of the plurality of frustum planes.

6. An apparatus comprising:
   one or more substrates; and
   logic coupled to the one or more substrates, wherein the logic coupled to the one or more substrates is implemented in one or more of configurable logic or fixed-functionality logic hardware, the logic coupled to the one or more substrates to:
   determine a first plurality of primitives associated with a plurality of display planes;
   reject a first primitive from the first plurality of primitives that is behind a first display plane to generate a second plurality of primitives;
   reject a second primitive that is in front of a second display plane to generate the second plurality of primitives;
   reject a third primitive of the second plurality of primitives based on a plurality of frustum planes to generate a third plurality of primitives; and
   execute fine frustum culling operations to assign the third plurality of primitives to one or more of left tile bins associated with a left eye of a user or right tile bins associated with a right eye of the user.

7. The apparatus of claim 6, wherein the first display plane is a display plane that is farthest from the user, and the second display plane is a display plane that is closest to the user.

8. The apparatus of claim 6, wherein the logic coupled to the one or more substrates is to:
   execute, on a per eye basis, a coarse frustum culling operation on the second plurality of primitives, wherein the coarse frustum culling operation includes the rejection of the third primitive based on the plurality of frustum planes to generate the third plurality of primitives.

9. The apparatus of claim 6, wherein the logic coupled to the one or more substrates is to:
   determine a left frustum plane for a left viewport associated with the left eye of the user;
   determine a right frustum plane for a right viewport associated with the right eye of the user;
   determine a top frustum plane of a top viewport; and
   determine a bottom frustum plane of a bottom viewport, wherein the plurality of frustum planes includes the left frustum plane, the right frustum plane, the top frustum plane and the bottom frustum plane.

10. The apparatus of claim 6, wherein to reject the third primitive of the second plurality of primitives, the logic coupled to the one or more substrates is to:
    determine that the third primitive will be rejected based on distances between vertices of the third primitive and each of a top frustum plane of the plurality of frustum planes, a bottom frustum plane of the plurality of frustum planes, a left frustum plane of the plurality of frustum planes and a right frustum plane of the plurality of frustum planes.

11. At least one non-transitory computer readable storage medium comprising a set of instructions, which when executed by a computing device, cause the computing device to:
- determine a first plurality of primitives associated with a scene;
- reject a first primitive from the first plurality of primitives that is behind a first display plane to generate a second plurality of primitives;
- reject a second primitive that is in front of a second display plane to generate the second plurality of primitives;
- reject a third primitive of the second plurality of primitives based on a plurality of frustum planes to generate a third plurality of primitives; and
- execute fine frustum culling operations to assign the third plurality of primitives to one or more of left tile bins associated with a left eye of a user or right tile bins associated with a right eye of the user.

12. The at least one non-transitory computer readable storage medium of claim 11, wherein the first display plane is a display plane that is farthest from the user, and the second display plane is a display plane that is closest to the user.

13. The at least one non-transitory computer readable storage medium of claim 11, wherein the instructions, when executed, cause the computing device to:
- execute, on a per eye basis, a coarse frustum culling operation on the second plurality of primitives, wherein the coarse frustum culling operation includes the rejection of the third primitive based on the plurality of frustum planes to generate the third plurality of primitives.

14. The at least one non-transitory computer readable storage medium of claim 11, wherein the instructions, when executed, cause the computing device to:
- determine a left frustum plane for a left viewport associated with the left eye of the user;
- determine a right frustum plane for a right viewport associated with the right eye of the user;
- determine a top frustum plane of a top viewport; and
- determine a bottom frustum plane of a bottom viewport, wherein the plurality of frustum planes includes the left frustum plane, the right frustum plane, the top frustum plane and the bottom frustum plane.

15. The at least one non-transitory computer readable storage medium of claim 11, wherein to reject the third primitive of the second plurality of primitives, the instructions, when executed, cause the computing device:
- determine that the third primitive will be rejected based on distances between vertices of the third primitive and each of a top frustum plane of the plurality of frustum planes, a bottom frustum plane of the plurality of frustum planes, a left frustum plane of the plurality of frustum planes and a right frustum plane of the plurality of frustum planes.

16. A method comprising:
- determining a first plurality of primitives associated with a scene;
- rejecting a first primitive from the first plurality of primitives that is behind a first display plane to generate a second plurality of primitives;
- rejecting a second primitive that is in front of a second display plane to generate the second plurality of primitives;
- rejecting a third primitive of the second plurality of primitives based on a plurality of frustum planes to generate a third plurality of primitives; and
- executing fine frustum culling operations to assign the third plurality of primitives to one or more of left tile bins associated with a left eye of a user or right tile bins associated with a right eye of the user.

17. The method of claim 16, wherein the first display plane is a display plane that is farthest from the user, and the second display plane is a display plane that is closest to the user.

18. The method of claim 16, further comprising:
- executing, on a per eye basis, a coarse frustum culling operation on the second plurality of primitives, wherein the coarse frustum culling operation includes the rejecting the third primitive based on the plurality of frustum planes to generate the third plurality of primitives.

19. The method of claim 16, further comprising:
- determining a left frustum plane for a left viewport associated with the left eye of the user;
- determining a right frustum plane for a right viewport associated with the right eye of the user;
- determining a top frustum plane of a top viewport; and
- determining a bottom frustum plane of a bottom viewport, wherein the plurality of frustum planes includes the left frustum plane, the right frustum plane, the top frustum plane and the bottom frustum plane.

20. The method of claim 16, wherein the rejecting the third primitive of the second plurality of primitives further comprises:
- determining that the third primitive will be rejected based on distances between vertices of the third primitive and each of a top frustum plane of the plurality of frustum planes, a bottom frustum plane of the plurality of frustum planes, a left frustum plane of the plurality of frustum planes and a right frustum plane of the plurality of frustum planes.

* * * * *